(12) United States Patent
Ishibashi et al.

(10) Patent No.: US 7,344,473 B2
(45) Date of Patent: Mar. 18, 2008

(54) HYDRAULIC TRANSMISSION VEHICLE

(75) Inventors: Fumio Ishibashi, Osaka (JP); Yukio Kubota, Osaka (JP); Yasuo Noma, Osaka (JP); Akifumi Kuroda, Osaka (JP)

(73) Assignees: Yanmar Agricultural Equipment Co., Ltd., Osaka (JP); Yanmar Co., Ltd., Osaka (JP)

( * ) Notice: Subject to any disclaimer, the term of this patent is extended or adjusted under 35 U.S.C. 154(b) by 0 days.

(21) Appl. No.: 11/391,492

(22) Filed: Mar. 29, 2006

(65) Prior Publication Data
US 2006/0172853 A1 Aug. 3, 2006

Related U.S. Application Data

(60) Division of application No. 10/805,561, filed on Mar. 22, 2004, now Pat. No. 7,037,236, which is a continuation of application No. PCT/JP02/10891, filed on Oct. 21, 2002.

(30) Foreign Application Priority Data

| Oct. 22, 2001 | (JP) | ............................. 2001-323495 |
| Oct. 22, 2001 | (JP) | ............................. 2001-323835 |
| Oct. 24, 2001 | (JP) | ............................. 2001-326136 |
| Oct. 24, 2001 | (JP) | ............................. 2001-326293 |
| Dec. 19, 2001 | (JP) | ............................. 2001-385496 |

(51) Int. Cl.
*F16H 61/38* (2006.01)
*F16H 61/40* (2006.01)

(52) U.S. Cl. .......................................... 477/52; 477/68
(58) Field of Classification Search .................. 477/52, 477/68; 475/72, 81
See application file for complete search history.

(56) References Cited

U.S. PATENT DOCUMENTS 3,988,893 A 11/1976 Bojas et al.
(Continued)

FOREIGN PATENT DOCUMENTS

| EP | 1 146 252 | 10/2001 |
| GB | 1 237 561 | 6/1971 |
| JP | 2199367 A | 8/1990 |
| JP | 5177679 A | 7/1993 |
| WO | WO 0025041 A | 5/2000 |

OTHER PUBLICATIONS

Patent Abstracts of Japan. Publication No. 56-127843, Date of Publication: Jun. 10, 1981; Title: Automatic Synchronizing Device of Direct Transmission.
(Continued)

*Primary Examiner*—Tisha Lewis
(74) *Attorney, Agent, or Firm*—Sterne, Kesler, Goldstein & Fox P.L.L.C.

(57) ABSTRACT

A hydraulic transmission (21) has an electric actuator (86) for changing its output/input rotation speed ratio. A controller (90) of the actuator memorizes a command current value to the actuator supposing that load is not applied on the hydraulic transmission, and calculates a value of load applied on the hydraulic transmission by calculating a difference between an actual command current value to the actuator and the memorized command current value. A command current value is compensated based on the value of load, and the actuator receives feedback to be controlled. A vehicle may have a differential mechanism (10), which combines rotation powers on input side and output side of the hydraulic transmission. A detector (82) detects rotation speed of a main speed change output shaft (27) serving as an output shaft of the differential mechanism. If the detected rotation speed differs from target rotation speed of the shaft (27) determined based on operation of a speed change operation tool, the actuator is forcedly controlled. This difference is supposed to be caused by load applied on the hydraulic transmission, whereby the load is calculated.

14 Claims, 59 Drawing Sheets

U.S. PATENT DOCUMENTS

| | | | |
|---|---|---|---|
| 4,489,552 A | 12/1984 | Watanabe et al. | |
| 4,606,313 A | 8/1986 | Izumi et al. | |
| 4,727,490 A | 2/1988 | Narita et al. | |
| 5,249,422 A | 10/1993 | Smith et al. | |
| 5,308,219 A | 5/1994 | Lee et al. | |
| 5,390,759 A | 2/1995 | Gollner | |
| 5,671,137 A * | 9/1997 | Ishino et al. | 701/61 |
| 5,823,072 A | 10/1998 | Legner | |
| 5,873,427 A | 2/1999 | Ferguson et al. | |
| 6,007,444 A * | 12/1999 | Kinokami | 475/81 |
| 6,010,309 A | 1/2000 | Takamura et al. | |
| 6,042,502 A | 3/2000 | Cronin et al. | |
| 6,272,950 B1 | 8/2001 | Braun et al. | |
| 6,616,559 B1 * | 9/2003 | Hori et al. | 475/23 |
| 6,918,850 B2 * | 7/2005 | Hasegawa et al. | 475/72 |

OTHER PUBLICATIONS

Patent Abstracts of Japan. Publication No. 63-022737, Date of Publication: Jan. 30, 1988; Title: Variable Speed Control Method For Continuously Variable Transmission For Vehicle.

Publication No. 63-33584, Date of Publication: Jul. 6, 1988.

Publication No. 2-130457, Date of Publication: Oct. 26, 1990.

Publication No. 2-130818, Date of Publication: Oct. 30, 1990.

Patent Abstracts of Japan. Publication No. 10-115357, Date of Publication: May 6, 1998; Title: Continuously Variable Transmission.

Patent Abstracts of Japan. Publication No. 2000-074213, Date of Publication: Mar. 14, 2000; Title: Method of Controlling Running Speed of Vehicle and Device Therefor.

Document No. WO00/25041, Date: Apr. 5, 2000; Title: Continuously Variable Transmission.

Patent Abstracts of Japan. Publication No. 2000-108698, Date of Publication: Apr. 18, 2000; Title: HST Control Device For Working Vehicle.

Patent Abstracts of Japan. Publication No. 2000-127781, Date of Publication: May 9, 2000; Title: Shift Control Method For Hydromechanical Transmission.

Patent Abstracts of Japan. Publication No. 2000-130558, Date of Publication: May 12, 2000; Title: HST Control Method For Hydro-Mechanical Transmission.

Patent Abstracts of Japan. Publication No. 2001-059573, Date of Publication: Mar. 6, 2001; Title: Swash Plate Angle Controlling Mechanism For Hydraulic Continuously Variable Transmission.

Patent Abstracts of Japan. Publication No. 2001-108061, Date of Publication: Apr. 20, 2001; Title: Traveling Speed Control Device.

Patent Abstracts of Japan. Publication No. 2002-139125, Date of Publication: May 17, 2002; Title: Drive Mode Switching Mechanism of Tractor With HMT Type Transmission.

European Search Report for European Appl. No. 02 80 2043, European Patent Office, Munich, mailed on Oct. 5, 2006, 6 pages.

* cited by examiner

| load applied on PTO shaft | = | load applied on engine | − | load applied on HST |

Fig. 19
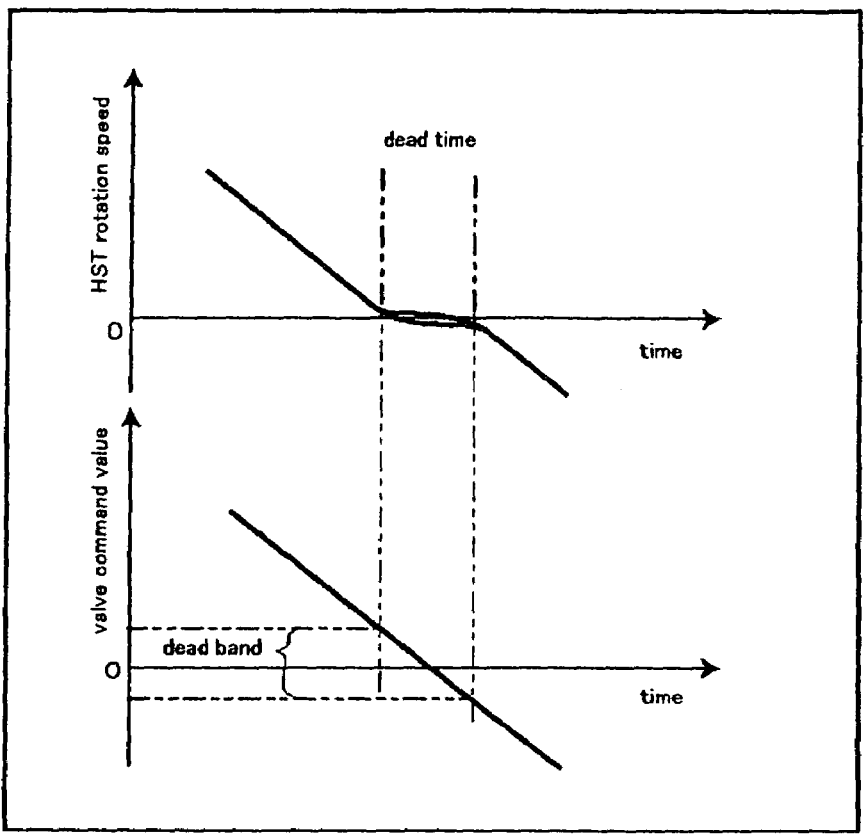
(a)
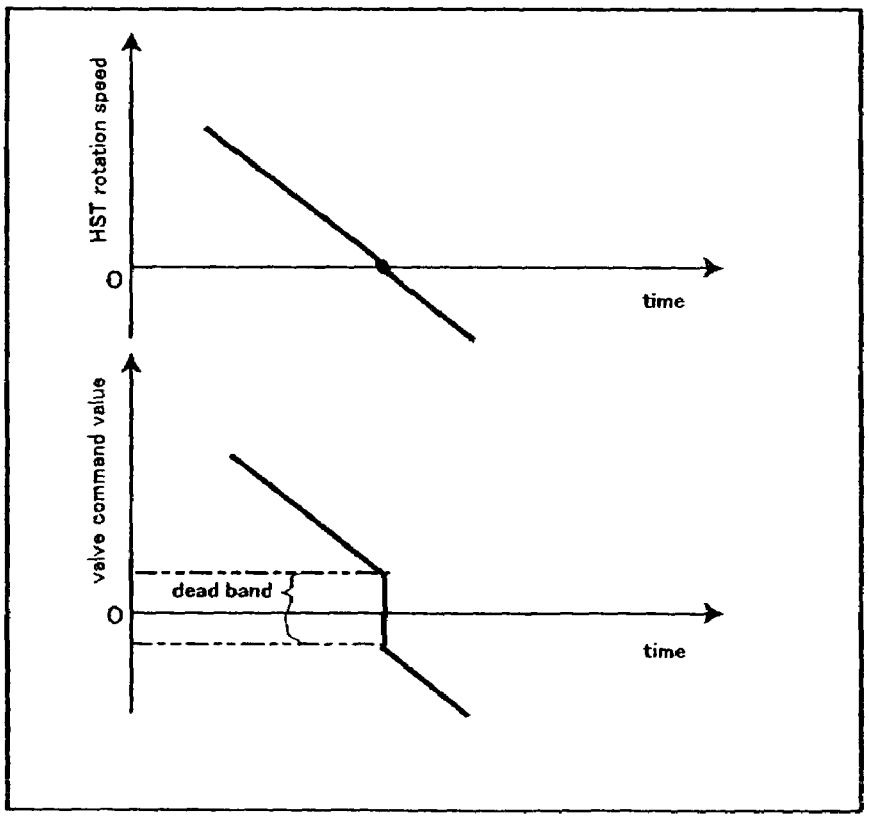
(b)

Fig. 24
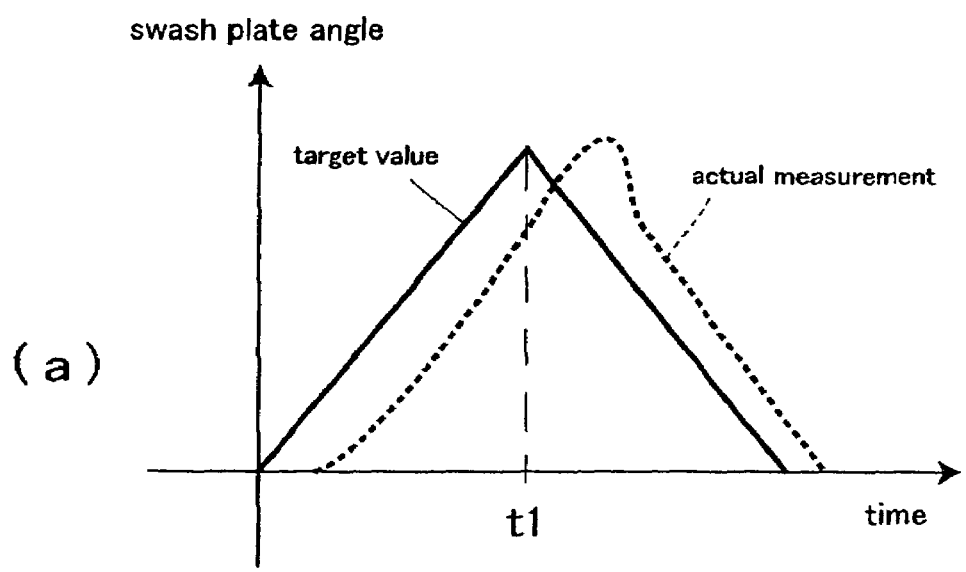
(a)
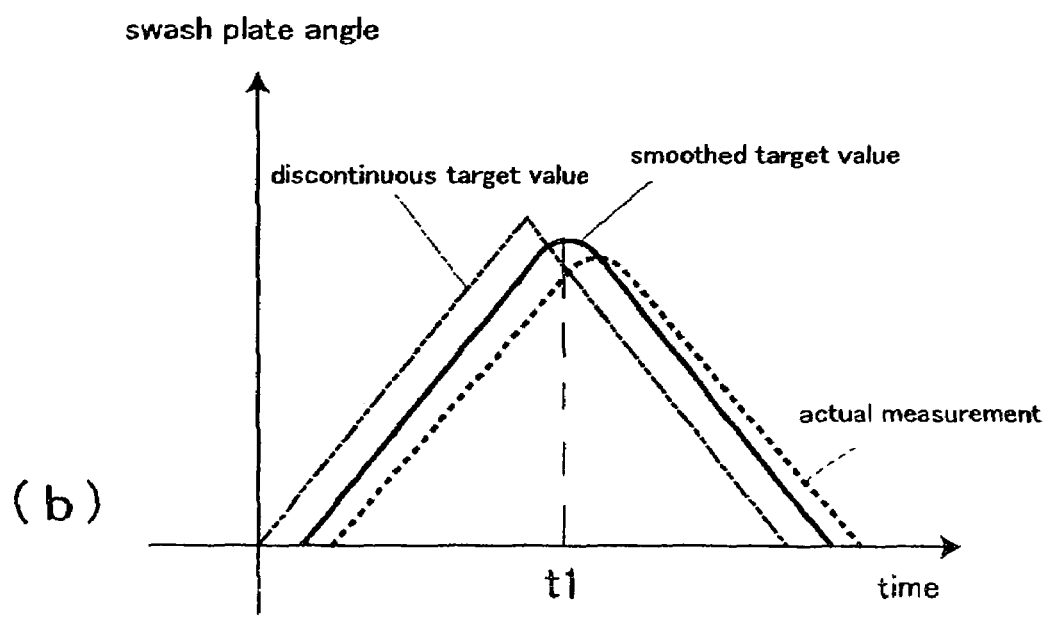
(b)

(a)

(b)

Fig. 54
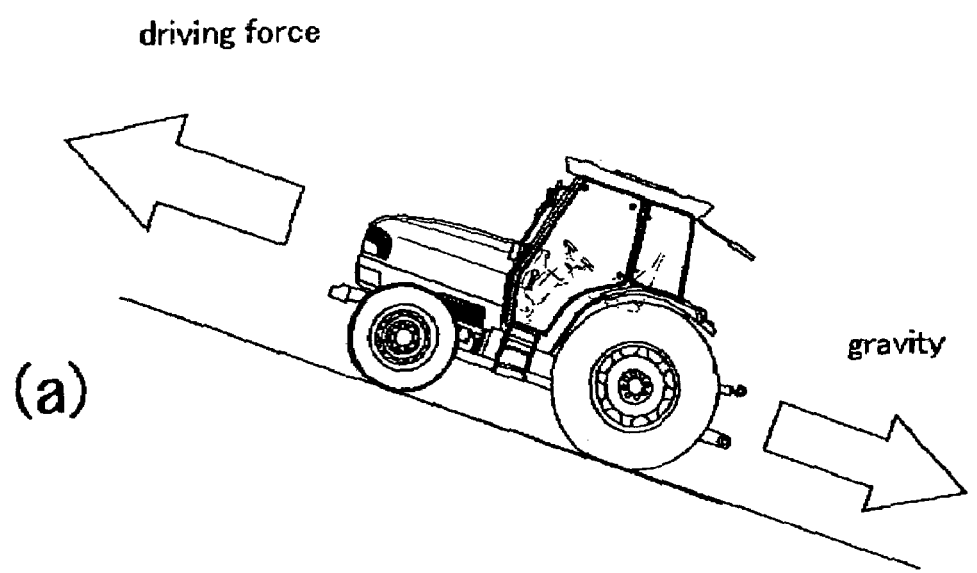
(a)
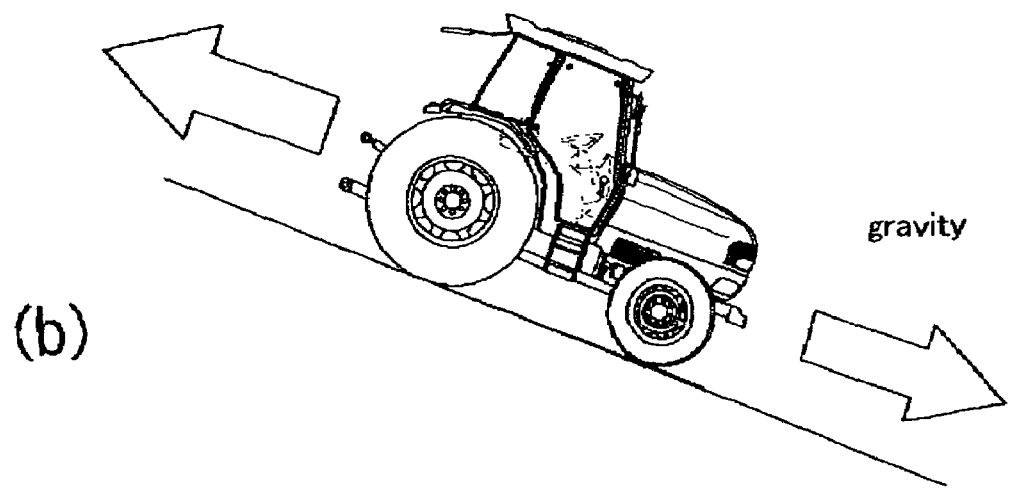
(b)

HYDRAULIC TRANSMISSION VEHICLE

CROSS-REFERENCE TO RELATED APPLICATIONS

This application is a Divisional of U.S. application Ser. No. 10/805,561; filed Mar. 22, 2004 now U.S. Pat. No. 7,037,236, the entire disclosure of which is incorporated herein by reference.

BACKGROUND OF THE INVENTION

1. Field of the Invention

The present invention relates to control of a hydraulic stepless transmission (hereinafter, referred to as HST) equipped on a vehicle.

2. Background Art

Conventionally, there is a well-known HST as a transmission for a vehicle, especially for a working vehicle such as a tractor. The International Publication WO00/25041 and the Japanese Patent Laid Open Gazette 2001-108061 indicate a hydro mechanical transmission (hereinafter, referred to as HMT) having a differential mechanism driven by rotation difference between input and output of the HST (for example, a planetary gear mechanism) as the transmission for a working vehicle. With regard to this transmission, at the time of traveling forward in low speed and traveling backward, driving wheels are driven by output of the HST. At the time of traveling forward in middle or high speed, the driving wheels are driven by output of the differential mechanism so as to obtain high output rotation speed with reducing loss of output of the HST. A state of the transmission set as the former is referred to as a HST mode, and a state of the transmission set as the later is referred to as a HMT mode. Specifically, a clutch device is operated to select either inputting the output of the differential mechanism to a driving shaft for transferring output to the driving wheels or inputting the output of the HST directly to the driving shaft without using the differential mechanism.

Furthermore, with regard to these cited technologies, output/input speed ratio of the HST (hereinafter, referred to as "HST speed change ratio") is controlled electronically. Namely, a hydraulic servomechanism or the like is used as an actuator for controlling the angle of a movable swash plate of the HST. Fundamentally, the actuator is controlled based on electric detection signals concerning operation of speed change means (a speed change pedal, a speed change lever or the like). The clutch device for switching between the HST mode and the HMT mode also electronically controlled in association with the control of the HST speed change ratio.

Moreover, with regard to both the cited documents WO00/25041 and 2001-108061, the output of the actuator is controlled with modifying an original target output value of the actuator based on the electric detection signals concerning operation of the speed change means corresponding to various conditions. For example, the International Publication WO00/25041 indicates compensational control of the HST output in consideration of engine load. The transmission published in the Japanese Patent Laid Open Gazette 2001-108061 is constructed so as to maintain setting speed by interlocking the swash plate actuator of the HST with an electronic governor disposed with the engine. Otherwise, such the transmission is mounted in a working vehicle such as a tractor, and the angle of the movable swash plate of a hydraulic pump disposed in the HST (HST swash plate angle) is controlled electronically by a controller, whereby the speed is controlled with considering rotation of a PTO shaft for driving a working machine (a rotary working machine, etc.).

However, there is no conventional transmission which controls output of the HST with considering load applied to the HST itself. The load applied to the HST appears with an aspect of raising oil pressure and temperature in a circuit. When oil pressure is raised, volume efficiency is decreased by leak and compression of oil according to characteristic of the HST, whereby rotation speed of an output shaft is changed even if the angle of the movable swash plate of the hydraulic pump is fixed. Namely, the speed change ratio of the HST is changed. Whether it is set in the HMT mode or the HST mode, rotation speed of the drive wheels depends on the HST speed change ratio. Therefore, unless the load applied to the HST is considered in the controlling, desired vehicle speed, speeding up and slowdown of the vehicle may not be obtained.

With regard to the control of the transmission with considering the load applied to the HST, a detection mean for the load applied to the HST must be considered firstly. Providing a detection mean of rising degree of oil pressure in the HST is handicapped in complexity of structure, cost and compactness of the HST, thereby being inexpedient.

With regard to feedback control of the HST swash plate angle controlling actuator with considering the load applied to the HST, the HST speed change ratio is set more highly, whereby action of the actuator becomes larger. With regard to the HST mode, the HST speed change ratio is increased by increasing the swash plate angle corresponding to the increase of the HST output rotation speed at the time of traveling forward. On the contrary, with regard to the HMT mode, the swash plate angle (the HST speed change ratio) is decreased against the increase of vehicle speed. Therefore, with regard to the speeding up operation requiring switching between the HST mode and the HMT mode, the change of the HST speed change ratio at the time of switching the mode becomes larger, whereby shock attendant upon the switch of the mode becomes larger.

Conventionally, with regard to the electronic control of HST swash plate angle, a dead band -3- for zeroing the swash plate angle is provided against command current, that is, at which the HST is kept in neutral is provided so as not to fail to keep a neutral position of the swash plate against few errors between the main speed changing operation and the HST swash plate angle. However, under the HMT mode, the timing that the HST is tuned into the neutral state is not limited to the timing for zeroing the vehicle speed, and the neutral state of the HST is equivalent to one of setting speeds. In this case, for example, when a operator does speed up operation, the dead band causes the vehicle to be kept in a certain speed during a fixed period far from being speeded up when the vehicle reaches the certain speed, whereby smooth speeding up is not obtained.

In many cases, individual electromagnetic valves for controlling the actuator have slightly different dead bands, whereby individual differences of action at the time of speed change may occur among vehicles.

Incidentally, a tractor equipped with a rotary cultivator or the like is an example of the vehicle driven by such the HST. Each field where the tractor performs rotary cultivation is not uniform in conditions such as hardness and viscosity, so that, while the vehicle advancing, the rotary cultivator passes one area requiring careful cultivation and another area which can be cultivated comparatively easily. If the field has such a spot requiring the careful cultivation, an operator decreases cultivation speed for cultivating the spot.

When the vehicle turns at a headland, the operator decreases rotation speed of the engine in consideration of two points, that is, safety at the time of decreasing rotation speed of the rotary working machine and prevention of breakage of a coupling member (universal joint) between the PTO shaft and the rotary working machine.

However, the operation of changing cultivation speed while checking the field condition is a burden to the operator and disturbs his/her concentration on steering operation.

Conventionally, the two points to be considered at the time of turning are dealt with by reducing rotation speed of the engine. Accordingly, cultivation speed can't be increased at the time of turning, thereby taking time.

Considering that the rotation speed and torque of the engine mounted in the tractor determine the fuel consumption efficiency of the engine, it is desirable to control the rotation speed and the torque of the engine so as to optimize the fuel consumption efficiency. However, the cultivation work with the tractor having the rotary cultivator may require the tractor to drive at a fixed speed (to keep a constant cultivation speed) so as to finish work within a predetermined time.

Further, the conventional working vehicle such as the tractor is parked by applying a parking brake after its traveling transmission is turned into neutral.

However, the conventional working vehicle such as the tractor may be stopped by actuating the parking brake without turning the traveling transmission into neutral, or may be started while the parking brake is still applied, thereby causing abrasion of a brake disk. When an operation part, such as a switch, for turning the vehicle into neutral is required, a parts count is increased.

BRIEF SUMMARY OF THE INVENTION

A first object of the present invention is to provide a vehicle having an HST whose output/input rotation speed ratio is changeable by an electronic actuator, wherein a load on the HST is detected effectively and the speed change ratio of the HST is set to correspond to the load.

To achieve the object, a controller of the actuator memorizes a command current value to the actuator supposing that load is not applied on the HST. A value of the load applied on the HST is calculated by calculating a difference between an actual command current value to the actuator and the memorized command current value.

Accordingly, the load on the HST can be calculated without special detection means (for example, a pressure sensor provided between a pump and a motor of the HST), thereby saving costs and ensuring compactness.

The actuator is controlled by such a feedback control method of compensating the command current value to the actuator based on the value of load on the HST calculated as the above. Therefore, the vehicle speed is prevented from falling temporarily under various conditions, thereby ensuring smooth and stable acceleration and deceleration.

Preferably, a load applied on a PTO shaft equipped on the vehicle can be calculated by the load on the HST calculated as the above and a load on an engine detected separately, thereby properly controlling the drive of a working machine driven by the PTO shaft.

The detection mean for detecting the load applied on the HST as mentioned above may be provided on a vehicle having a transmission with a differential for combining input rotation and output rotation of the HST, what is called an HMT. In the above-mentioned case of detecting the load on the HST by the rotation speed detection mean, the detection mean detects rotation speed of an output shaft of the differential mechanism.

If the vehicle equipped with the HMT according to the present invention can be switched between a mode (an HST mode) where the output of the hydraulic transmission without passing the differential mechanism serves as the drive power for traveling of the vehicle and a mode (an HMT mode) where the output of the differential mechanism serves as the drive power for traveling of the vehicle, the actuator is controlled so as to reduce a rate of positional change of a movable swash plate at the time of switching between the mode while moving the swash plate to a set target position of the swash plate. Accordingly, sudden speed change accompanying with the switching of the mode is prevented so as to remove shock to an operator and inhibit degradation of related parts.

If a vehicle according to the present invention is equipped with a hydraulic transmission having an electronic actuator for moving one of swash plates of its hydraulic pump and motor for changing an output/input rotation speed ratio of the transmission, and the actuator is provided with a dead band against a command current value thereto, the command current is changed with no time lag between upper and lower thresholds demarcating the dead band in the case of controlling the actuator across the dead band. Accordingly, the speed change accompanying with the speed change operation becomes smooth and the reaction of actual speed change to the speed change operation is improved. Also, the problem of individual difference of action among electromagnetic valves is solved.

With regard to the control of HST in association with the brake operation according to the present invention, the HST can be turned into neutral by depressing a brake pedal while the engine is idling. Therefore, instead of returning operation of a speed change lever to its neutral position, the HST can be automatically turned into neutral by only braking operation, thereby preventing the HST from being loaded by braking, and reducing noise when the vehicle stops.

Furthermore, in this construction, a switch is switched to select whether the HST is turned into neutral or not when the engine idles and the brake pedal is depressed. The switch is provided in the vicinity of the brake pedal so as to be operated simultaneously with the brake pedal.

Accordingly, instead of the speed-changing operation for changing the HST speed change ratio, only the depression of the accelerator pedal and brake pedal enables the vehicle to travel or be braked while ensuring the best HST speed change ratio.

According to the present invention, if a vehicle is equipped with an HST wherein an output/input rotation speed ratio of the HST is changed in proportion to rotation speed of an engine by detecting the rotation speed of the engine and the output rotation of the HST after its speed change operation, the HST is provided with a dead band for preventing its output/input speed ratio from changing regardless of the change of the rotation speed of the engine. Accordingly, a main speed change ratio (output/input rotation speed ratio of the HMT) is prevented from jittering against the change of the rotation speed of the engine, thereby obtaining smooth traveling of the vehicle.

A hydraulic drive vehicle according to the present invention controls output of an HST in association with engine control by an electronic governor.

In a first aspect, the vehicle is provided with an engine having an electronic governor, an engine rotation speed detector, an HST whose output/input rotation speed ratio can be changed by electronic control, and a controller for controlling the governor and the HST. The controller memorizes a map concerning torque and rotational speed of the engine for obtaining an optimal fuel consumption. The controller compares the engine torque detected by the governor and the engine rotation speed detected by the engine rotation speed detector with values on the map. When the detected values differ from the values on the map, the controller controls one or both of the governor and the HST so as to cancel the difference. Accordingly, the vehicle can travel with low fuel consumption while keeping predetermined traveling speed.

In a second aspect, the vehicle is provided with an engine having an electronic governor, an engine rotation speed detector, an HST whose output/input rotation speed ratio can be changed by electronic control, and a controller for controlling the output/input rotation speed ratio of the HST. The governor calculates an engine load, and the engine rotation speed detector detects engine rotation speed. The controller memorizes a map of maximum engine torque corresponding to the detected engine rotation speed. When the engine load detected by the governor is higher than engine load equivalent to the maximum engine torque corresponding to the engine rotation speed detected by the engine rotation speed detector, the controller reduces the output/input rotation speed ratio of the HST. Otherwise, the controller increases the output/input rotation speed ratio of the HST.

It is assumed that the vehicle is a tractor equipped with a working machine such as rotary cultivator. When the engine rotation speed is decreased by increase of the engine load, the controller considers that the field is hard. When the decreased engine rotation speed starts to increase by decrease of the engine load, the controller considers that the field can be easily cultivated, thereby controlling cultivation speed to change into the optimal cultivation speed for each state automatically. Based on such consideration, the cultivation speed is automatically controlled so as to suit the field condition. Consequently, the field can be evenly cultivated. Also, this automatic control of cultivation speed releases an operator from care about whether the field is hard or soft and from operation of a main speed change lever for controlling the cultivation speed, thereby ensuring easy cultivation work.

In a third aspect, a transmission of a vehicle to which a working machine is vertically movably connected is provided with an engine having an electronic governor, an engine rotation speed detector, an HST whose output/input rotation speed ratio can be changed by electronic control, and a controller for controlling the governor and the HST. When the vehicle starts turning and a command signal of pulling the working machine up is emitted, the controller controls the governor so as to reduce the engine rotation speed, and increases the output/input rotation speed ratio of the HST so as to compensate decrease of vehicle speed accompanying with decrease of the engine rotation speed. When the vehicle stops turning and a command signal of pulling the working machine down is emitted, the controller controls the governor so as to return the engine rotation speed to a set speed and decreases the output/input rotation speed ratio of the HST so as to restrict increase of vehicle speed accompanying with increase of the engine rotation speed.

Accordingly, the vehicle can quickly complete its turning because the vehicle is prevented from being slowed down against the decrease of engine rotation speed.

Also, the decrease of engine rotation speed causes the safe reduction of rotation speed of the rotary cultivator, thereby preventing a coupler (universal joint) between the PTO shaft and the rotary cultivator from being damaged.

These, further and other objects, features and advantages of the present invention will appear more fully from the following detailed description with reference to attached drawings.

BRIEF DESCRIPTION OF THE DRAWINGS/FIGURES

Figure 3:
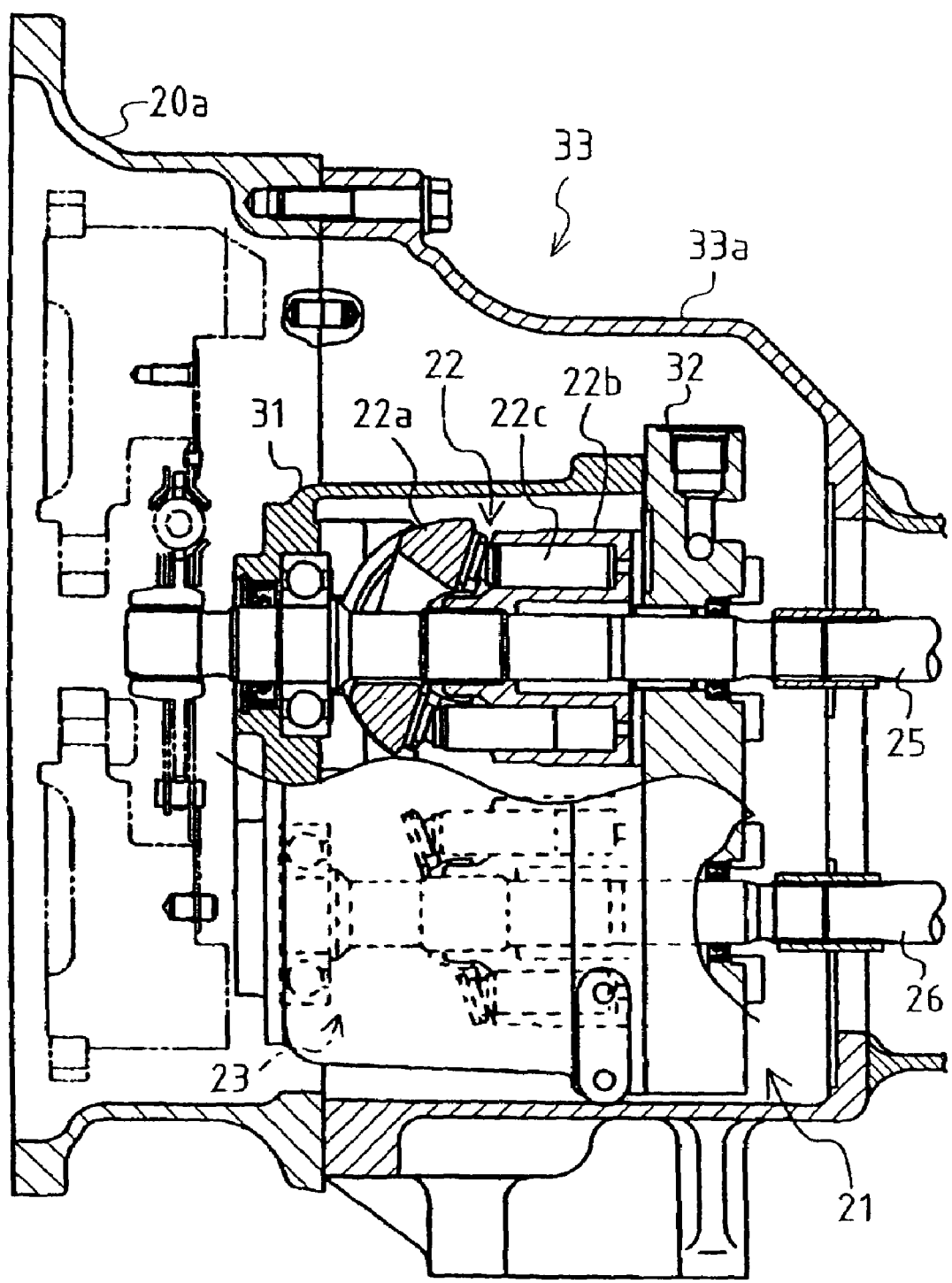

FIG. 3 is a sectional side view of a transmission casing front portion 33a of the first transmission 101, wherein the portion 33a contains an HST 21.

Figure 4:
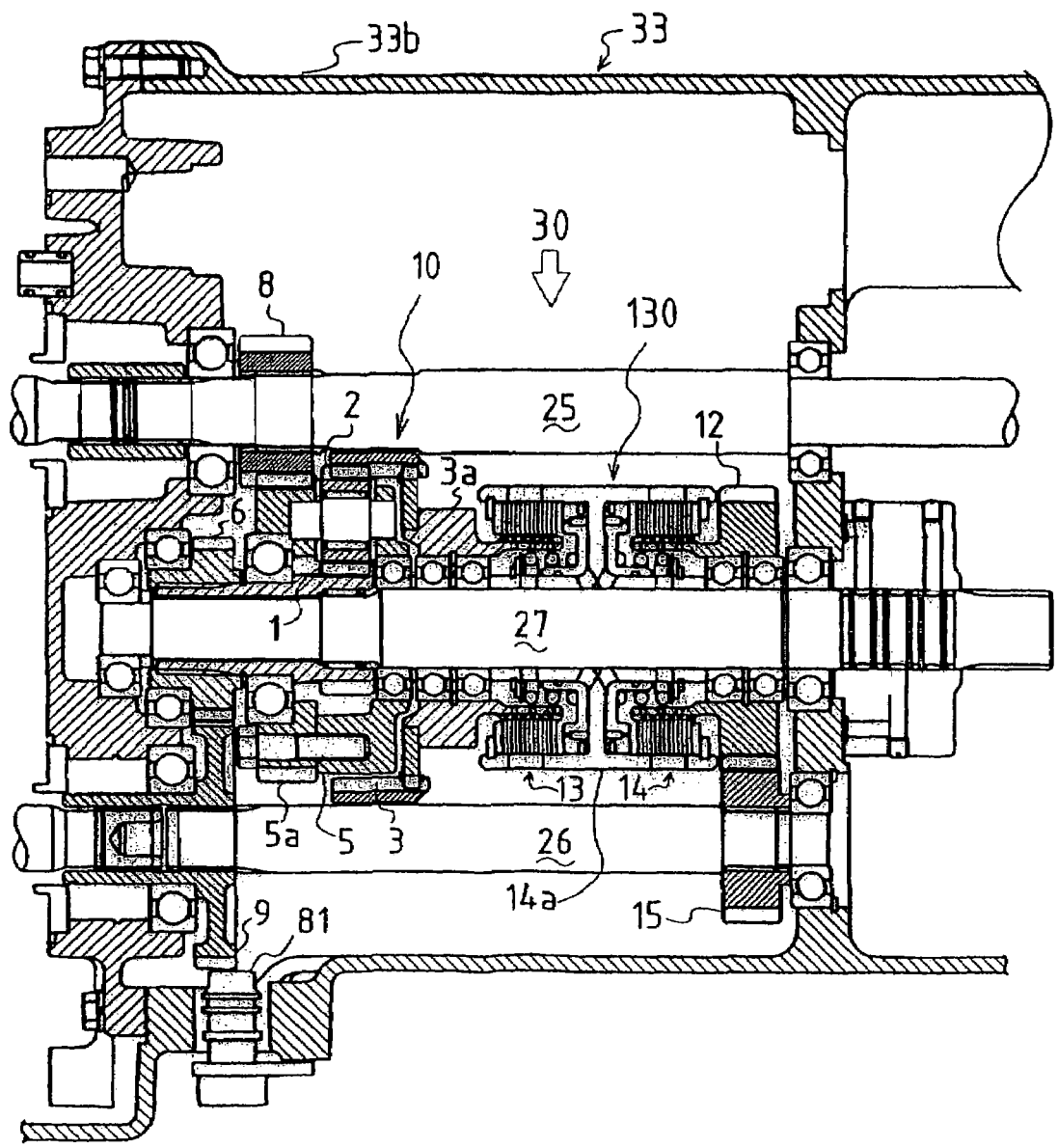

FIG. 4 is a sectional side development of a transmission casing middle portion 33b of the first transmission 101, wherein the portion 33b contains a mechanical transmission 30.

Figure 5:
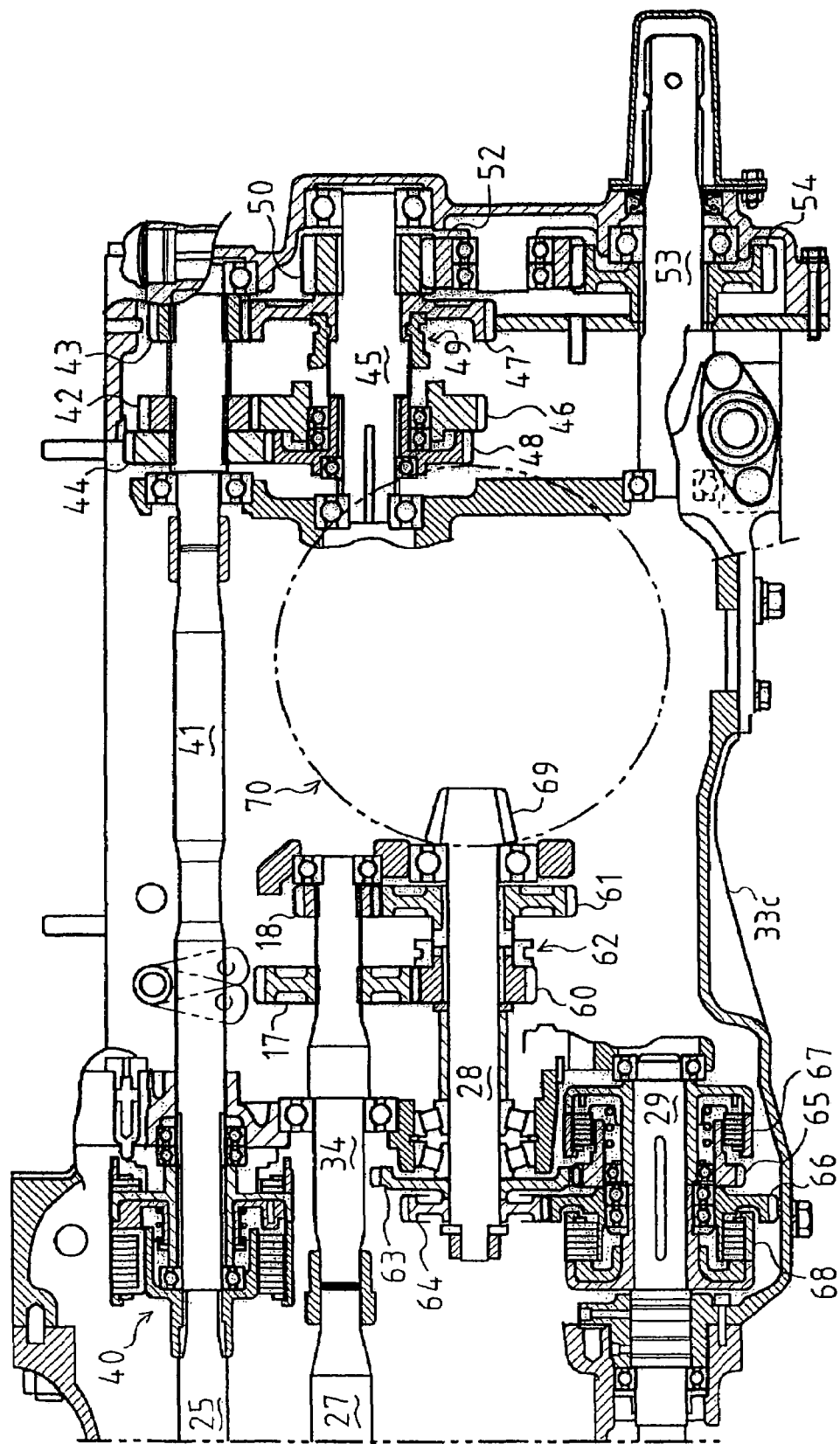

FIG. 5 is a sectional side development of a transmission casing rear portion 33c supporting rear-wheel-drive axles and a PTO shaft.

Figure 6:
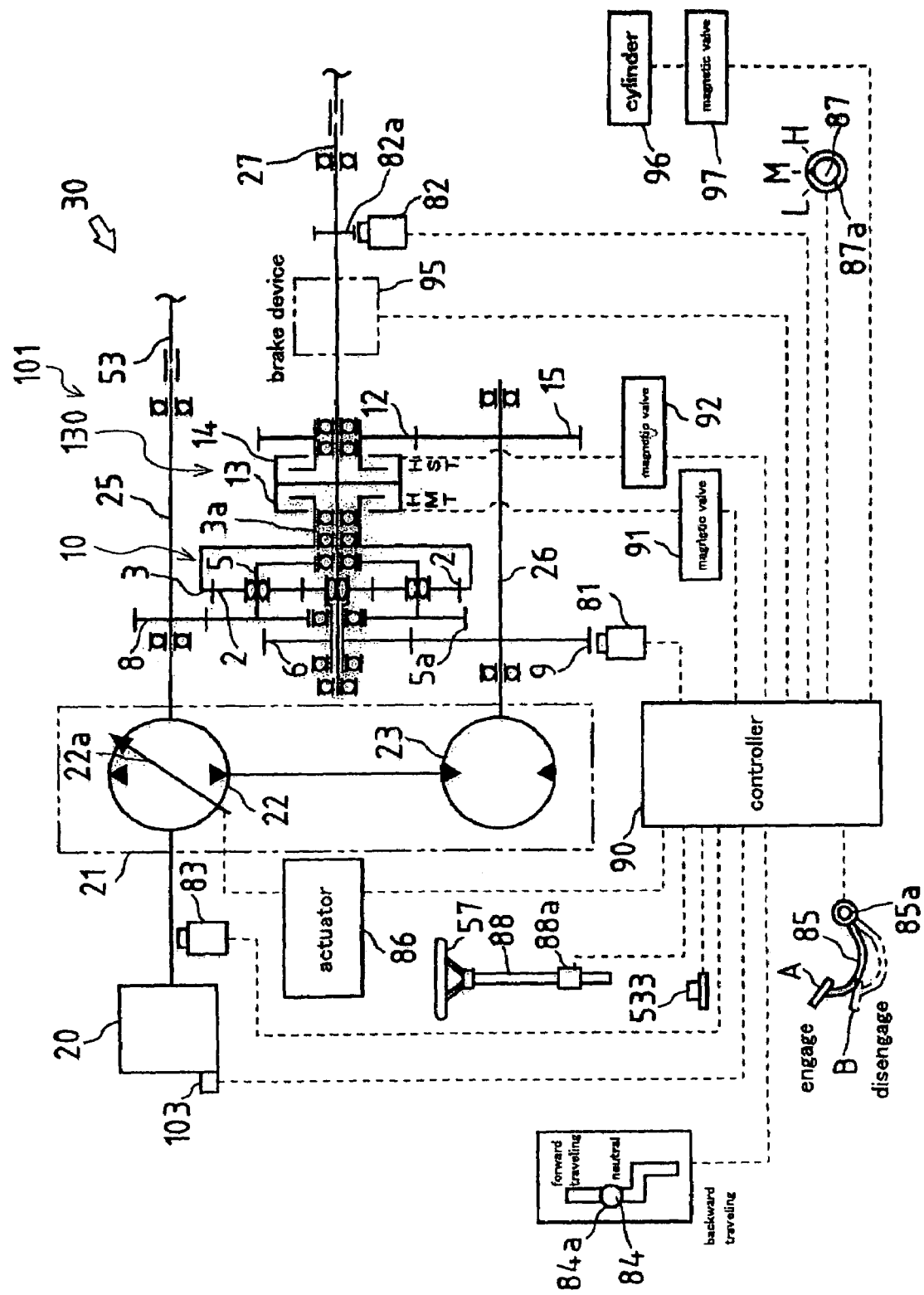

FIG. 6 is a diagram of a control system for controlling HST swash plate angle and switching HMT/HST mode, the system being used for the first transmission 101.

Figure 7:
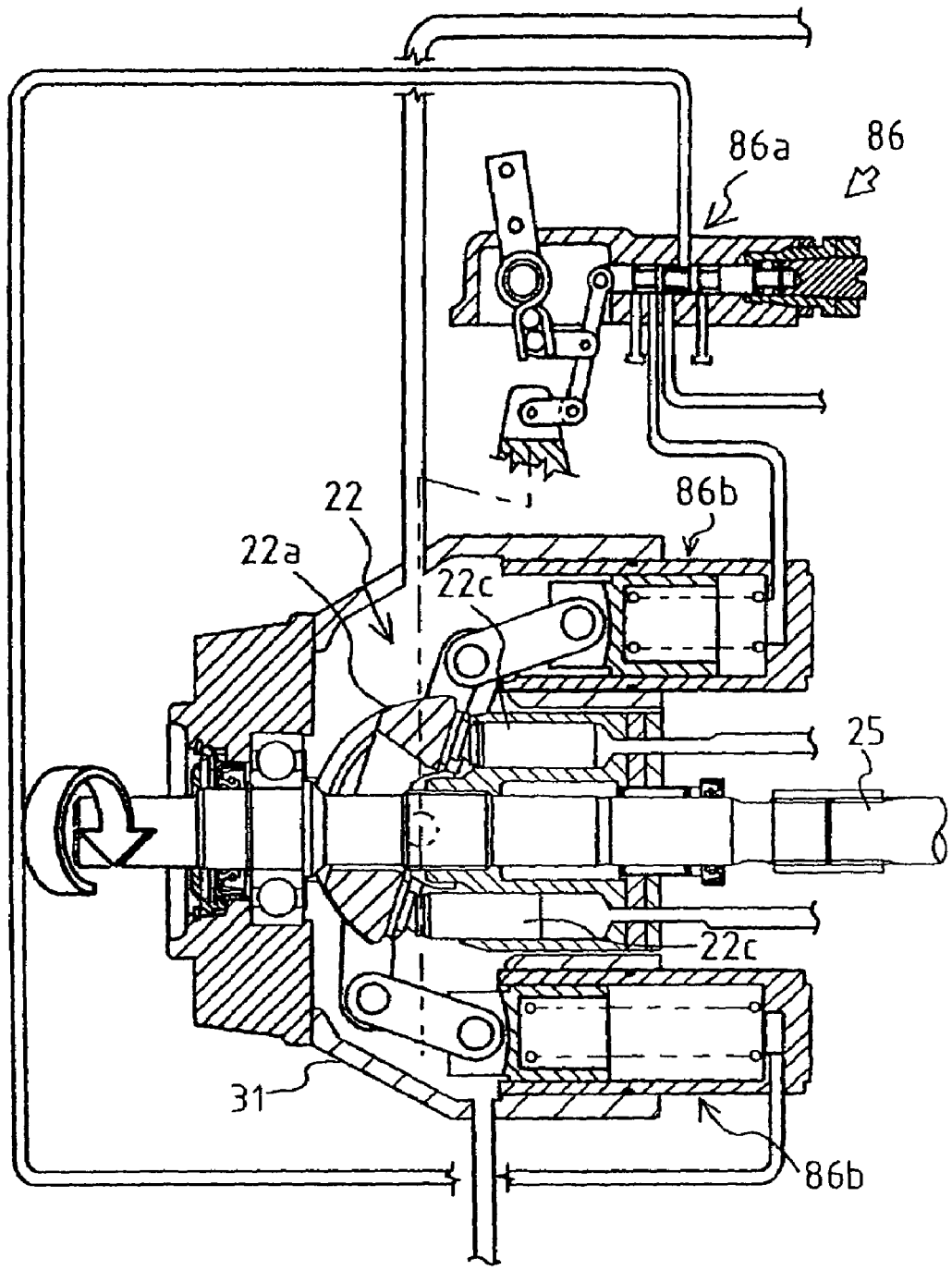

FIG. 7 is a sectional side view of an HST swash plate angle actuator together with a diagram of piping for hydraulic controlling the actuator.

Figure 8:
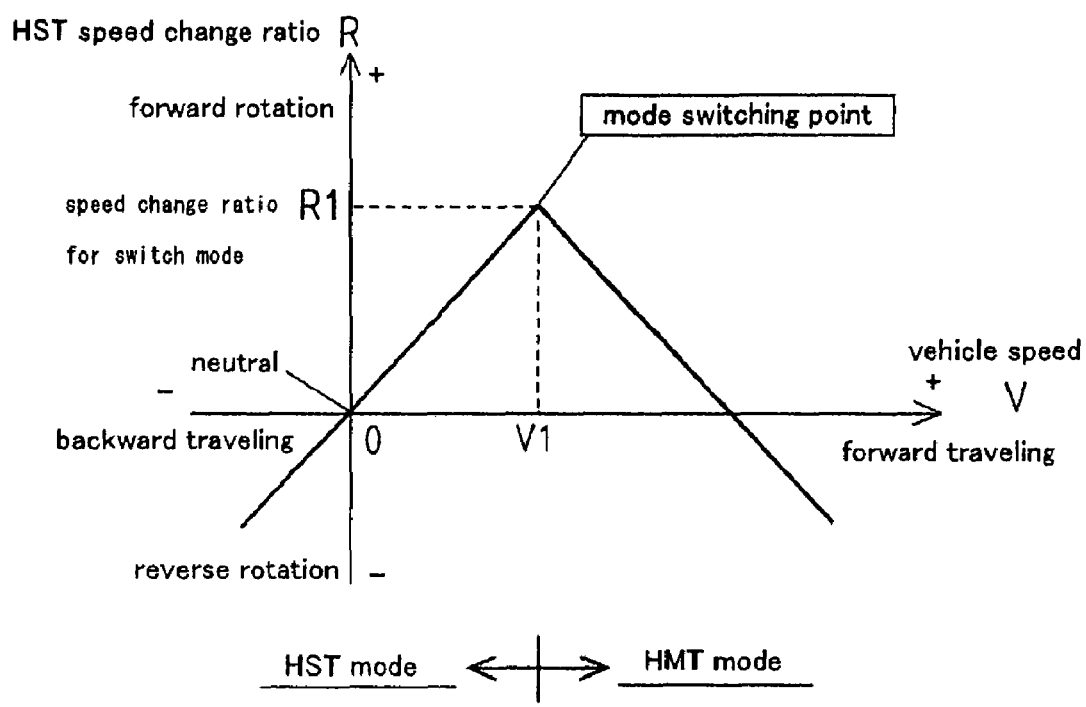

FIG. 8 is a graph showing fundamental correlation between vehicle speed and HST speed change ratio according to the first transmission 101.

Figure 9:
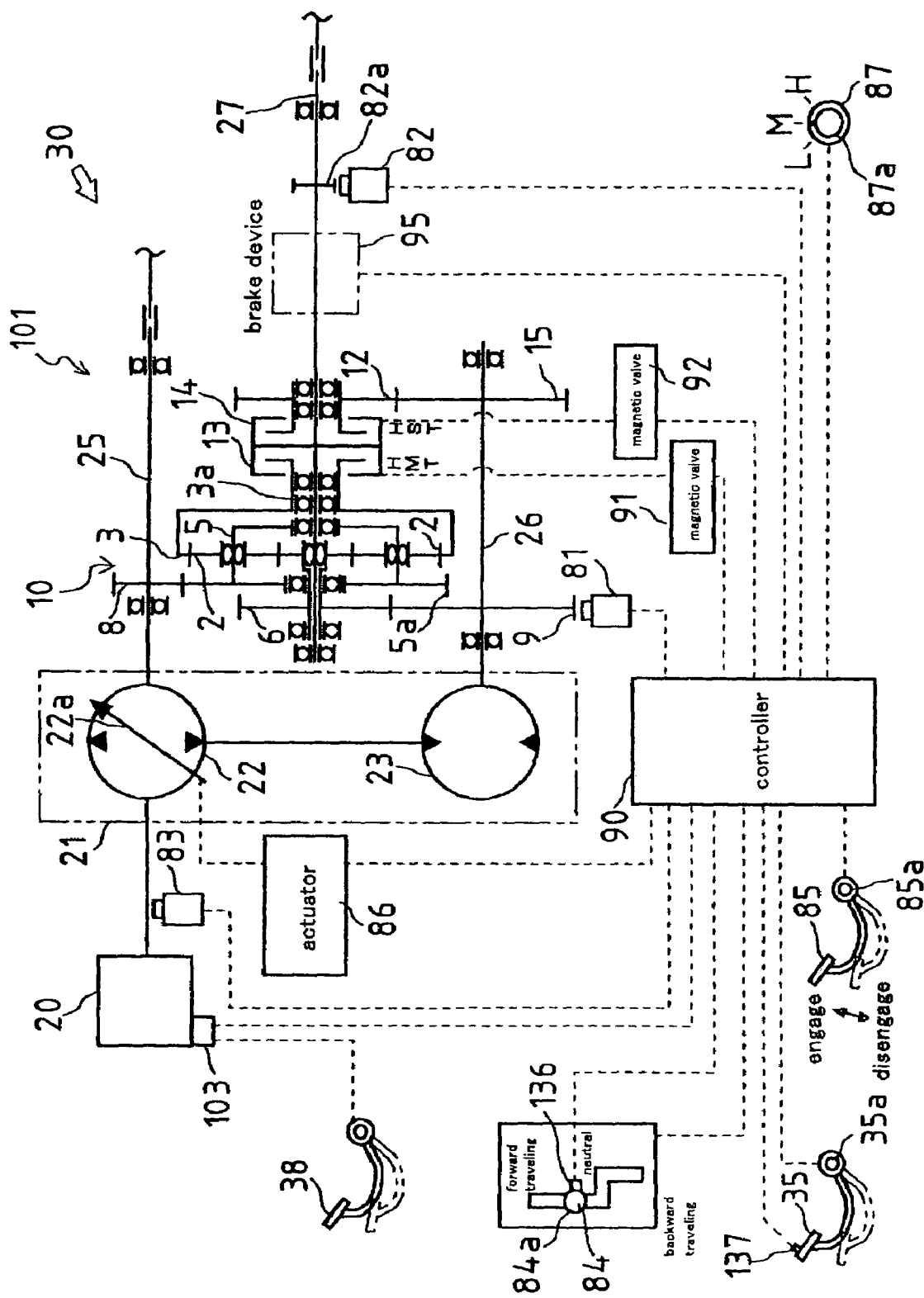

FIG. 9 is a diagram of control system of the first transmission 101 similar to FIG. 6, wherein a mode switch 136 is provided on a main speed change lever 84 so that the HMT mode can be set arbitrarily at the time of low speed traveling, and wherein a switch 137 for selecting set/unset of HST neutral control is provided to a brake pedal 35.

Figure 10:
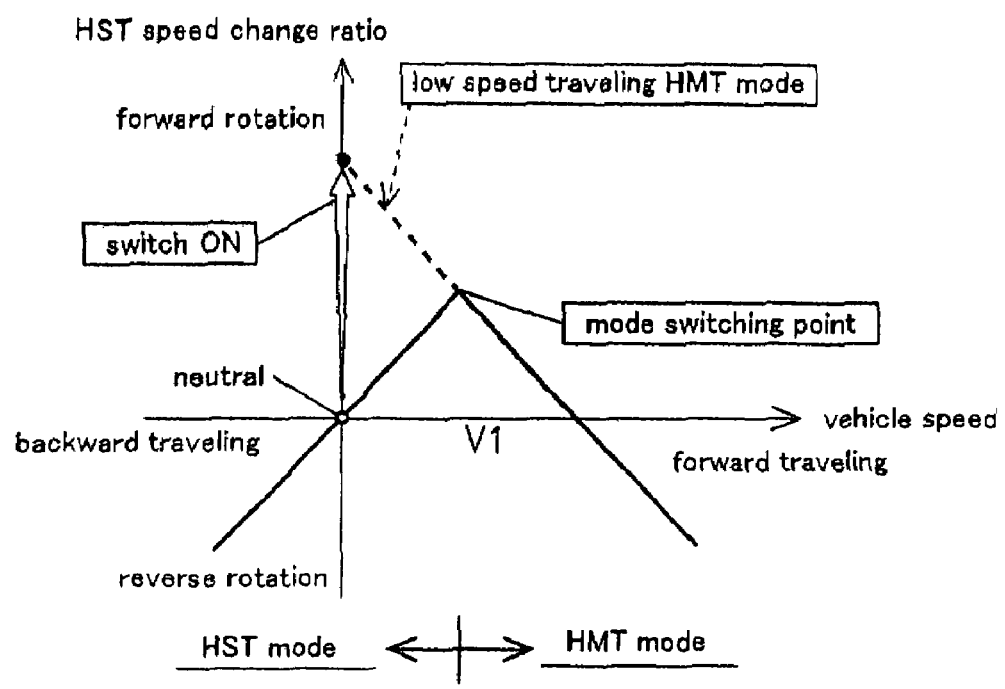

FIG. 10 is a graph similar to FIG. 8 in the case where the first transmission 101 is provided with the switch 136 of FIG. 9 for enabling selection of a low speed forward traveling HMT mode.

Figure 11:
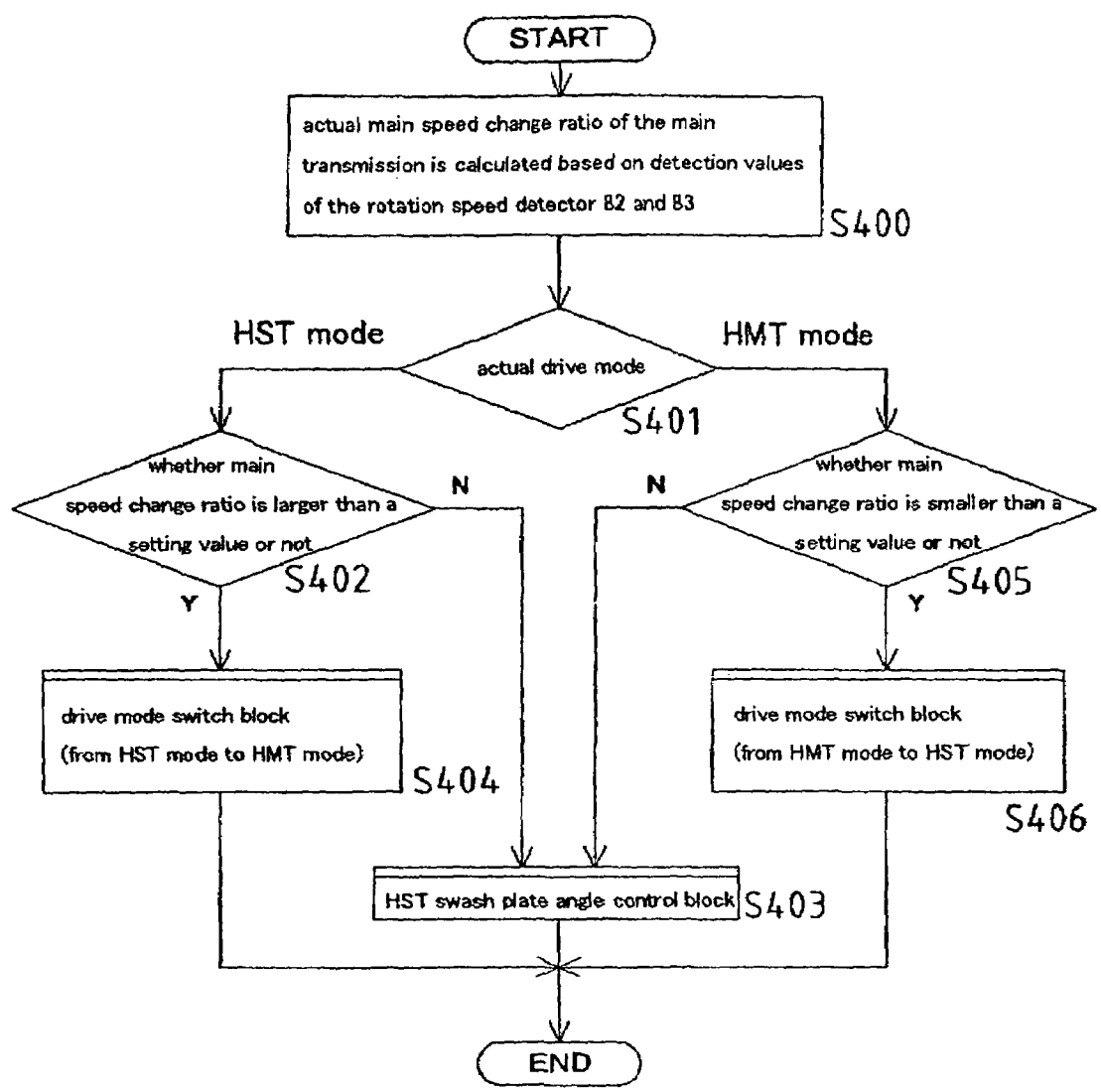

FIG. 11 is a flow chart of basic control of the HST speed change ratio and a main speed change clutch in the first transmission 101.

Figure 12:
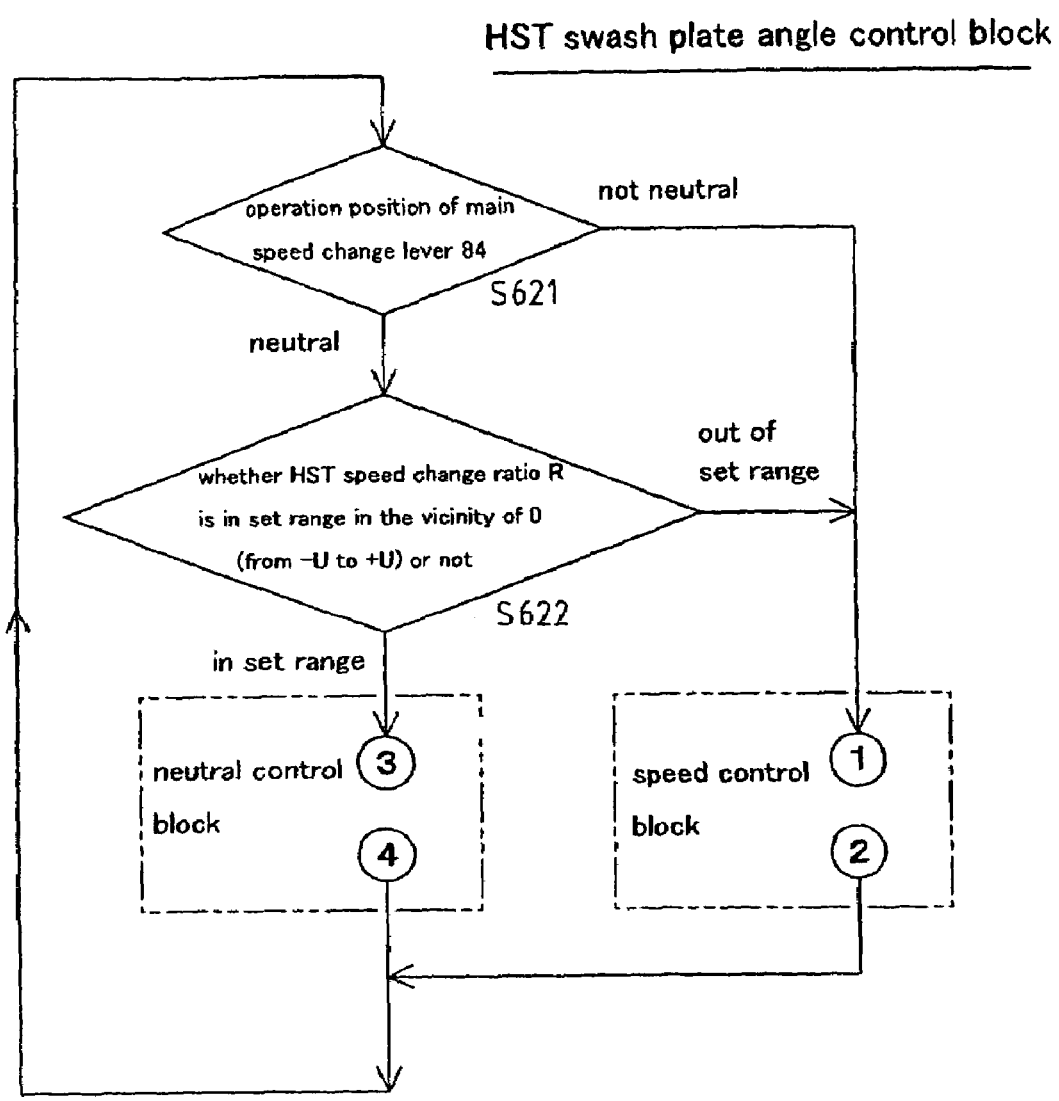

FIG. 12 is a flow chart of a HST swash plate control block in FIG. 11.

Figure 13:
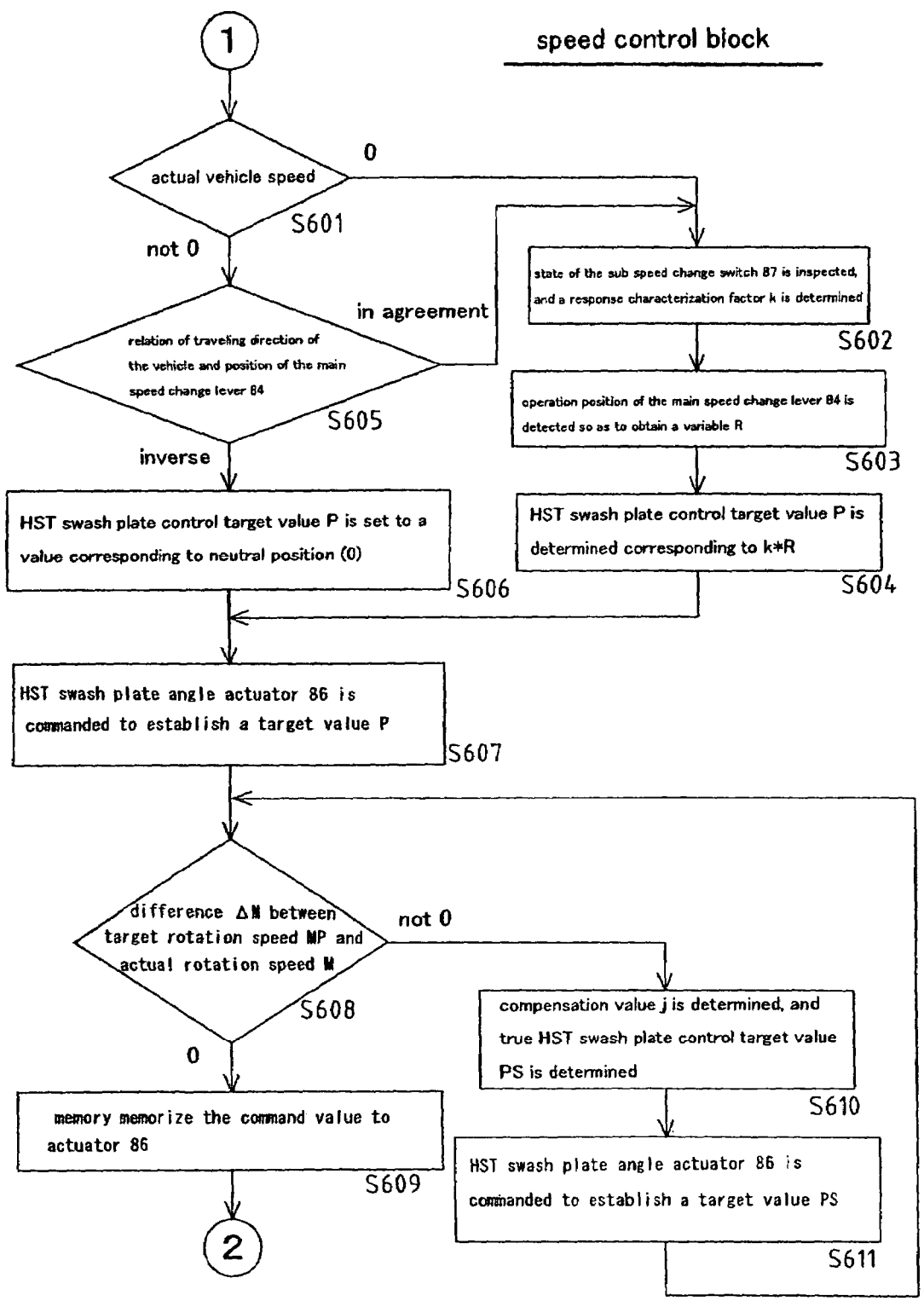

FIG. 13 is a flow chart of a speed control block in FIG. 12.

Figures 14, 15:
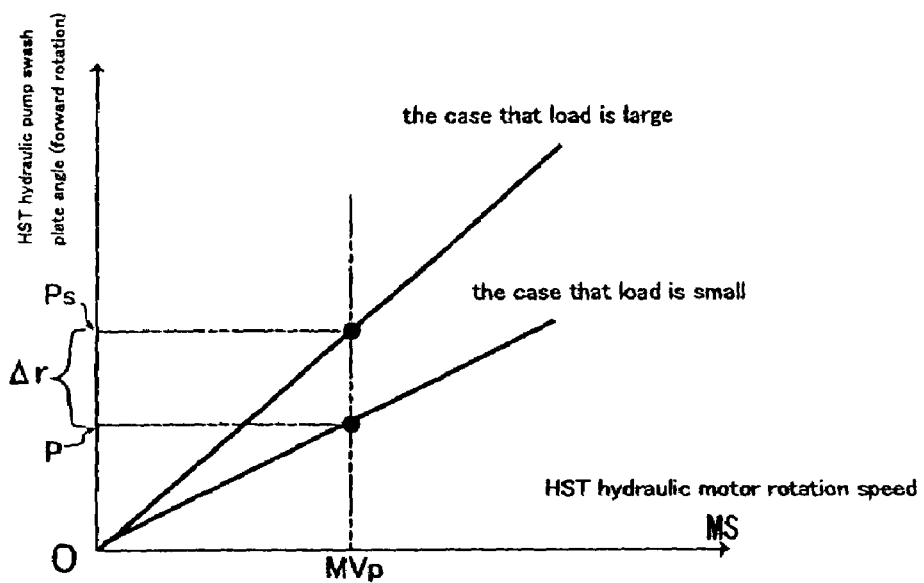

FIG. 14 is a correlation diagram of HST swash plate angle against HST motor rotation speed in each of cases of small load and large load applied on the HST, showing an effect of HST swash plate angle control by the speed control block of FIG. 13.

FIG. 15 is a diagram of expression showing calculation method of load of the PTO shaft based on engine load and HST load.

Figure 16:
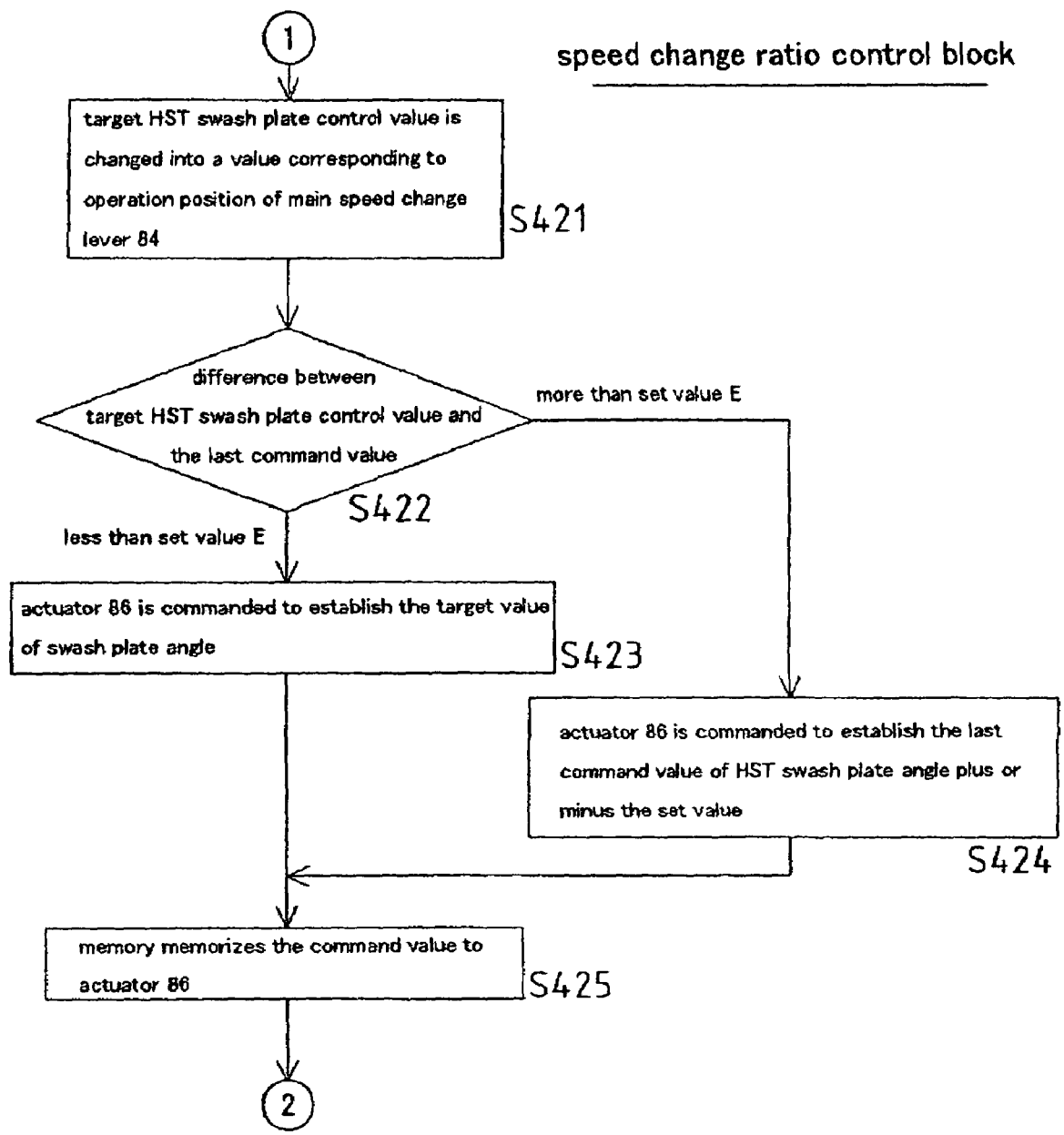

FIG. 16 is a flow chart of another speed control block used in the flow chart of FIG. 12.

Figure 17:
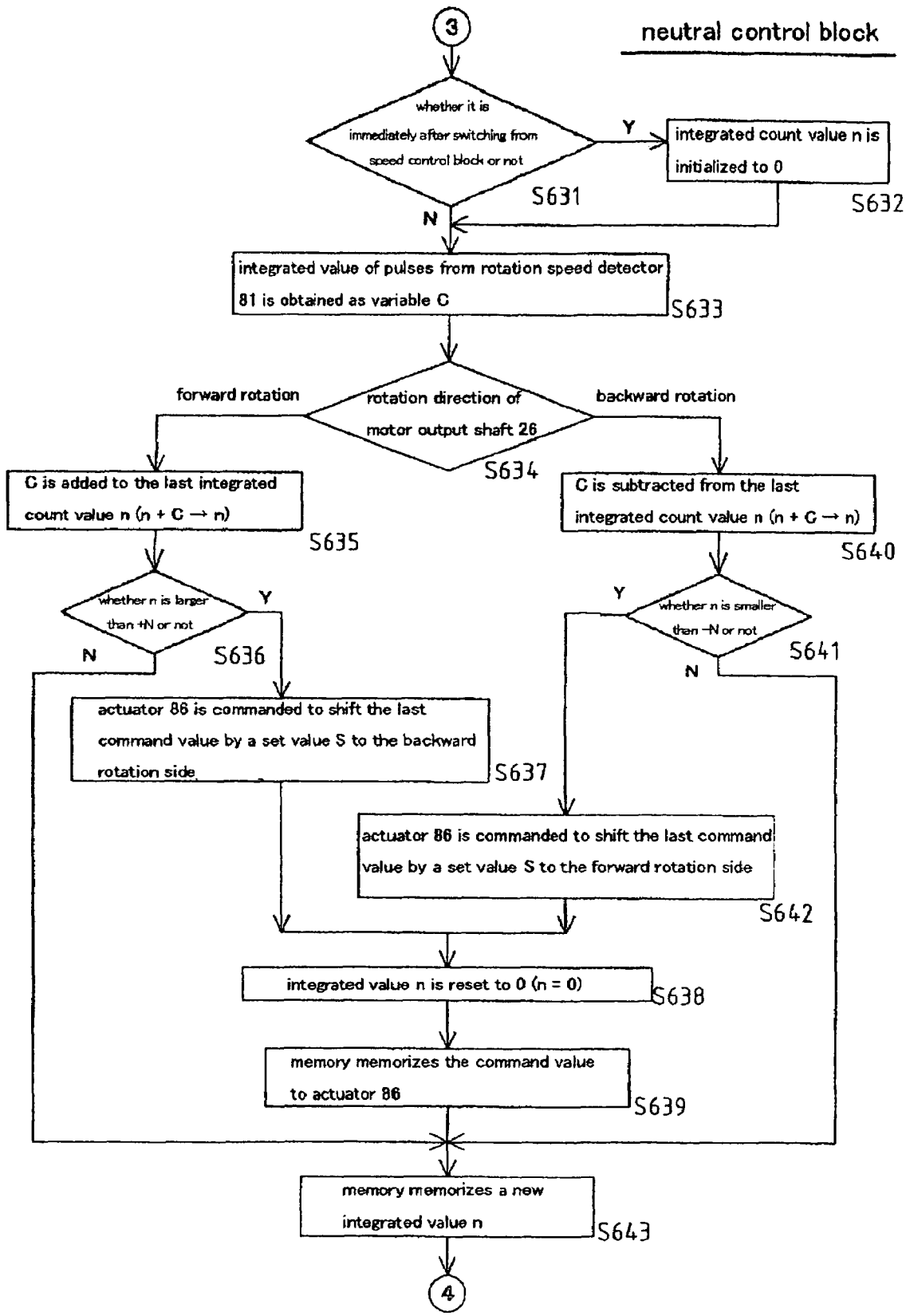

FIG. 17 is a flow chart of neutral control block in FIG. 12.

Figure 18:
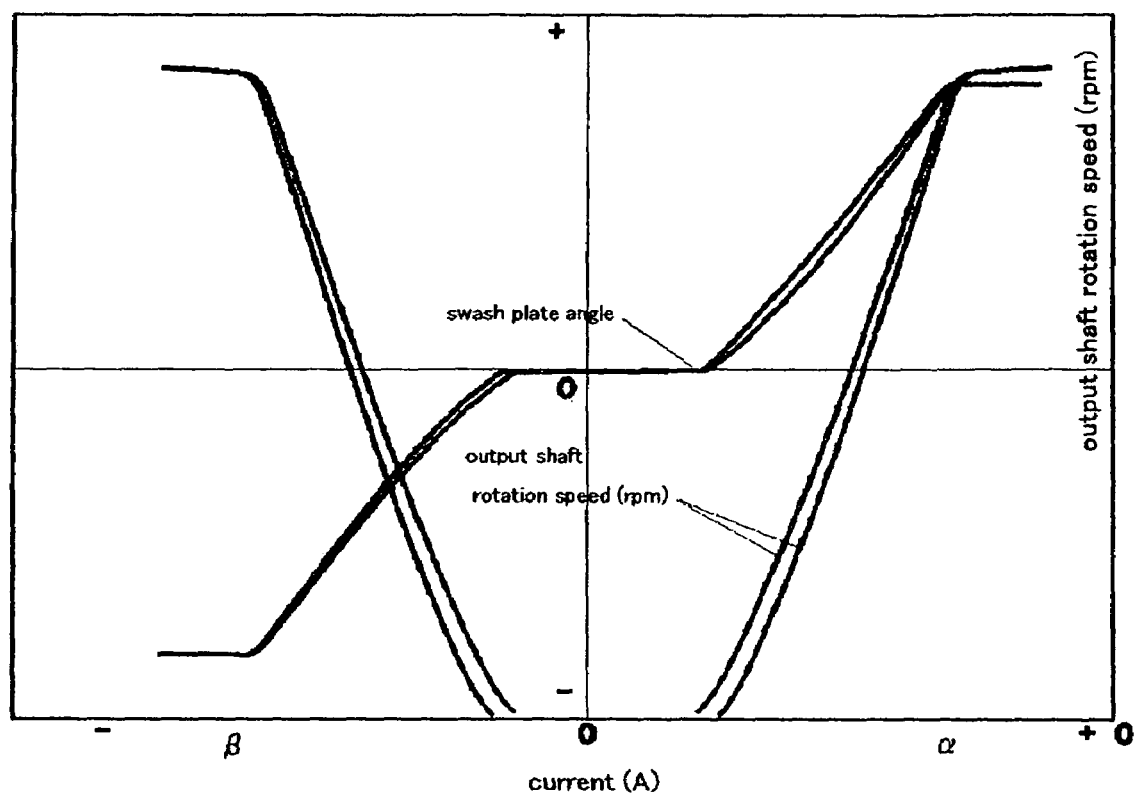

FIG. 18 is a correlation diagram of the swash plate angle and output rotation speed against command current value to the HST swash plate actuator, showing that a dead band of the command value for keeping the HST in neutral state is provided.

FIG. 19 (a) is a time series diagram of the HST output rotation speed and the command value, showing a dead time caused by the dead band for keeping neutrality at the time of acceleration in the HMT mode.

FIG. 19 (b) is a time series diagram of the HST output rotation speed and the command value at the time of acceleration in the HMT mode, wherein the command value is controlled so as to change across the dead band without a time lag.

Figure 20:
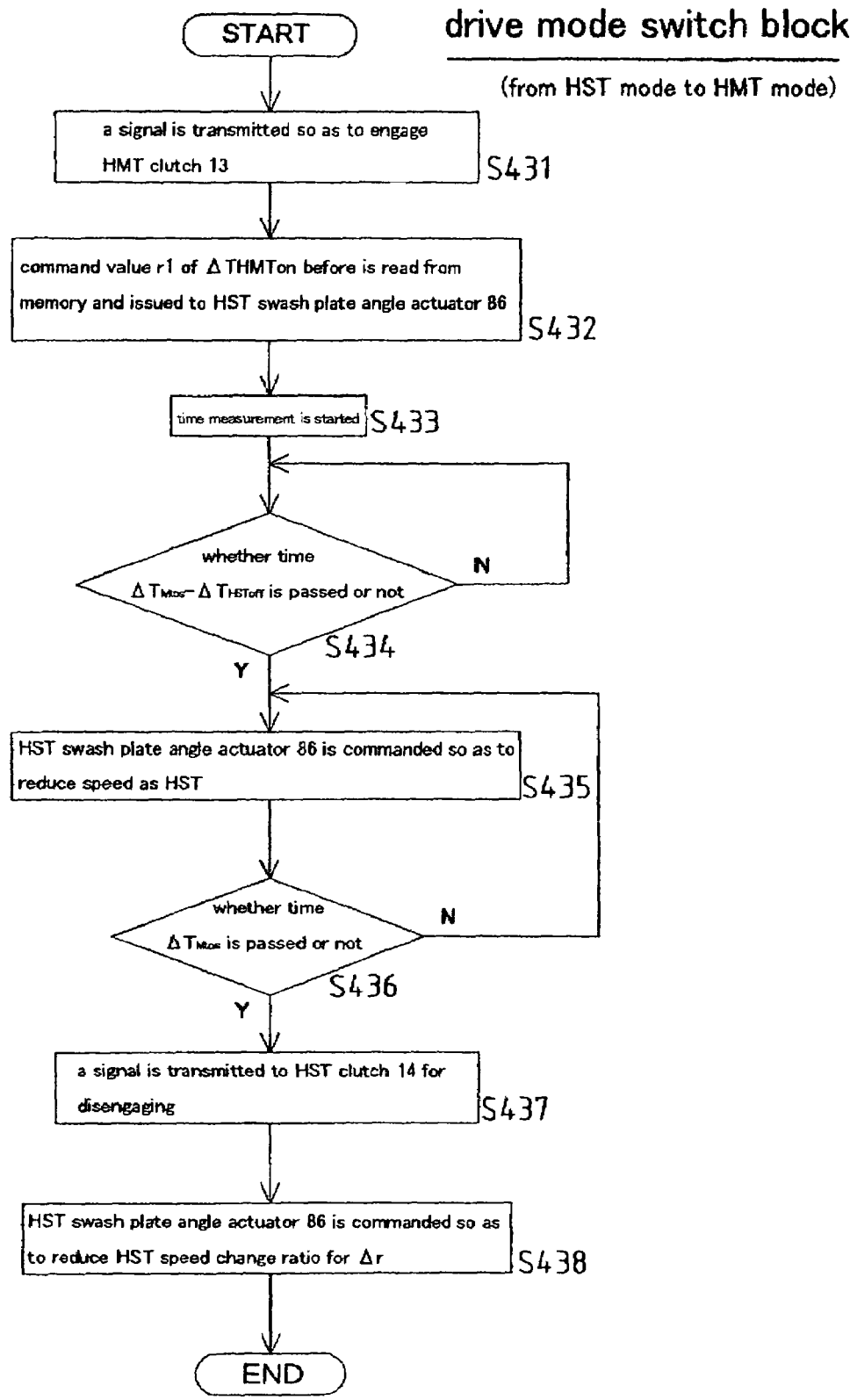

FIG. 20 is a flow chart of a drive mode control block in FIG. 11.

Figure 21:
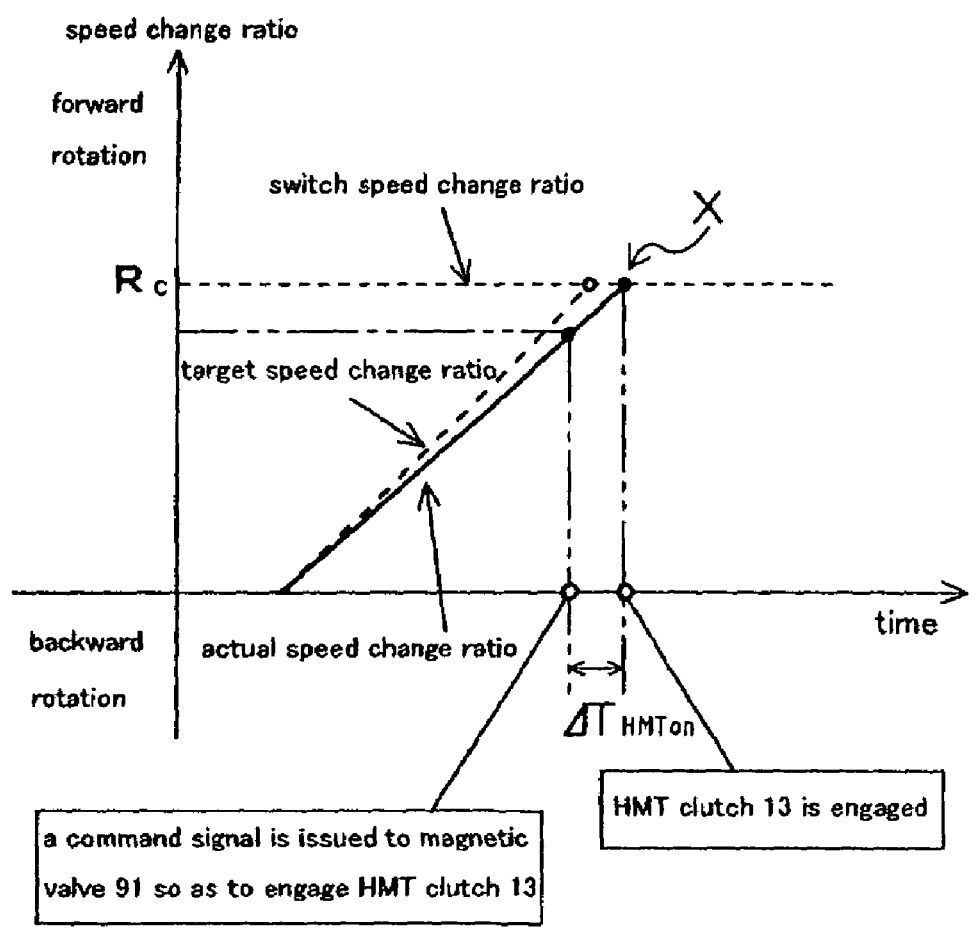
Figure 2:
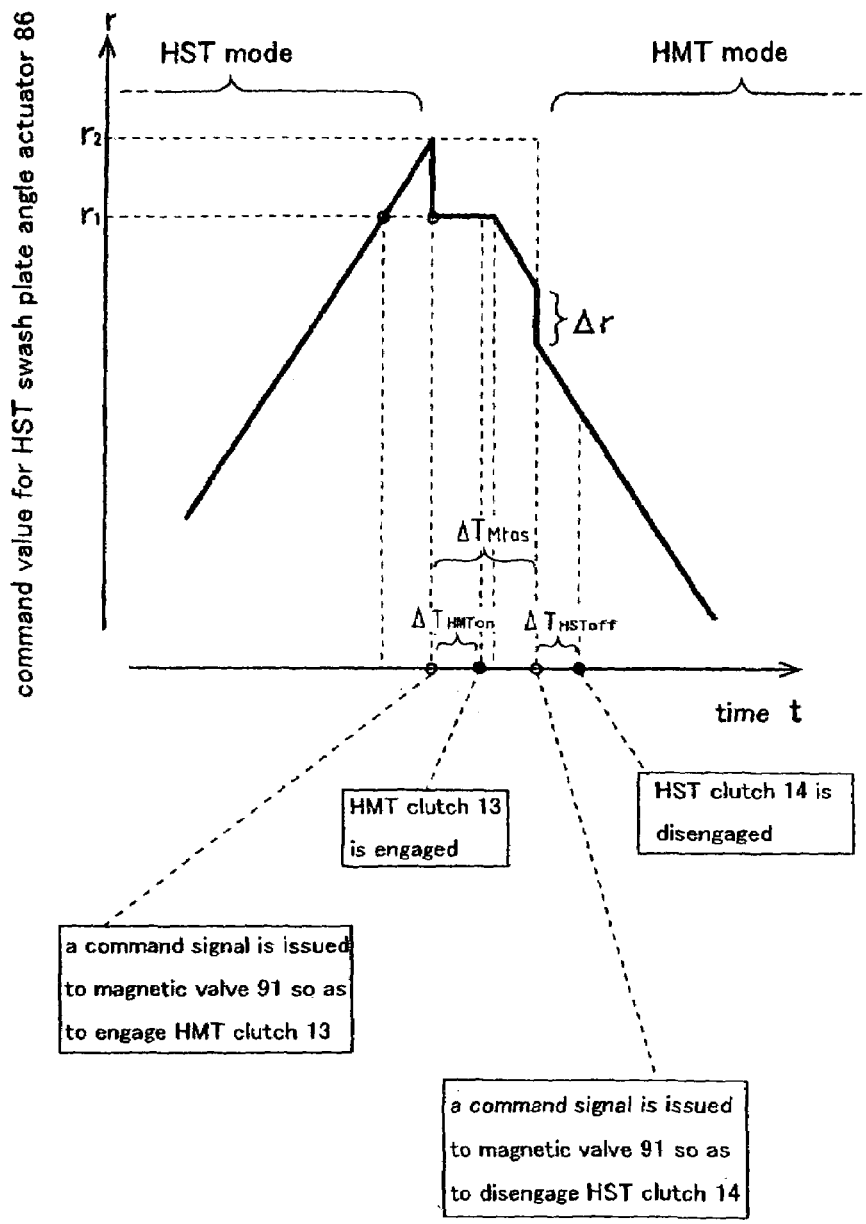

FIG. 21 is a time series diagram of the set value of HST speed change target ratio and the timing of engaging an HMT clutch 13 when the HST speed change ratio is increased so as to switch the drive mode from the HST mode to the HMT mode.

FIG. 22 is a time series diagram of the command value to the HST swash plate actuator, showing the clutch timing and the HST speed change ratio control when the transmission is speed-changed from a speed in the HST to a speed in the HMT mode in consideration of time lag and change of load accompanying with the switch of the drive mode.

Figure 23:
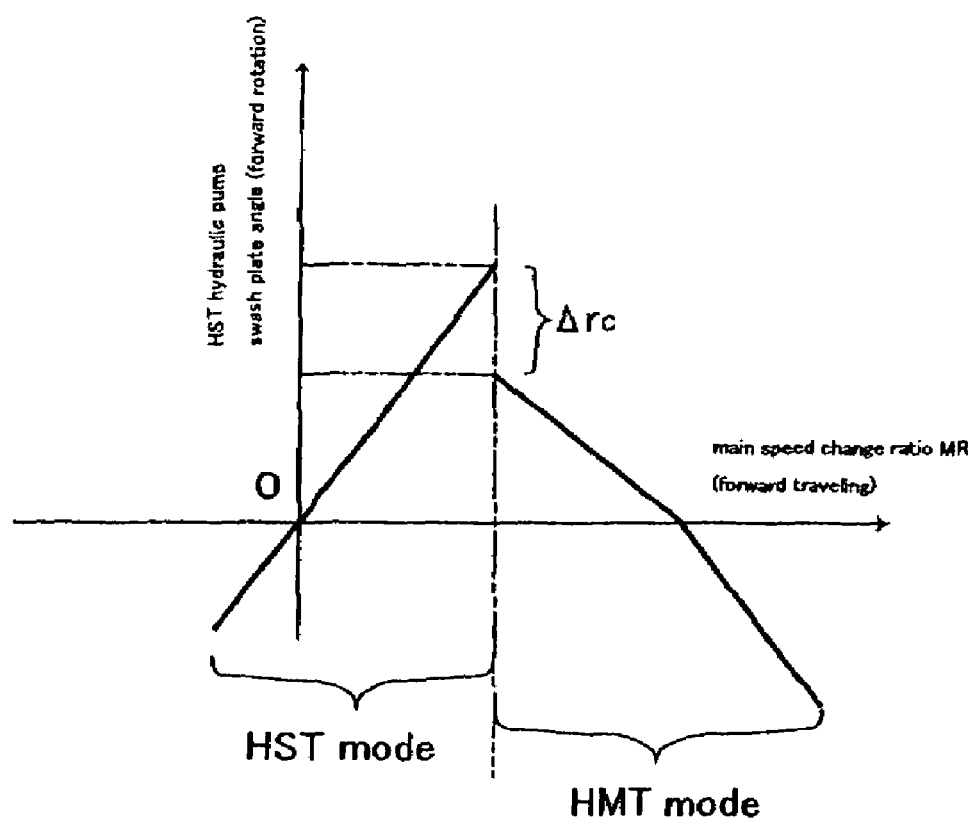

FIG. 23 is a correlation diagram of the HST swash plate angle relative to the main speed change ratio, showing the control of the HST speed change ratio when the transmission is speed-changed from a speed in the HST mode to a speed in the HMT mode in consideration of change of load accompanying with the switch of the drive mode.

FIG. 24 illustrates time series diagrams showing the swash plate angle control avoiding unstable change of the main speed change ratio at the time of change of the drive mode: (a) is a diagram of actual value based on conventional target value setting; and (b) is a diagram of actual value based on target value setting according to the present invention.

Figure 25:
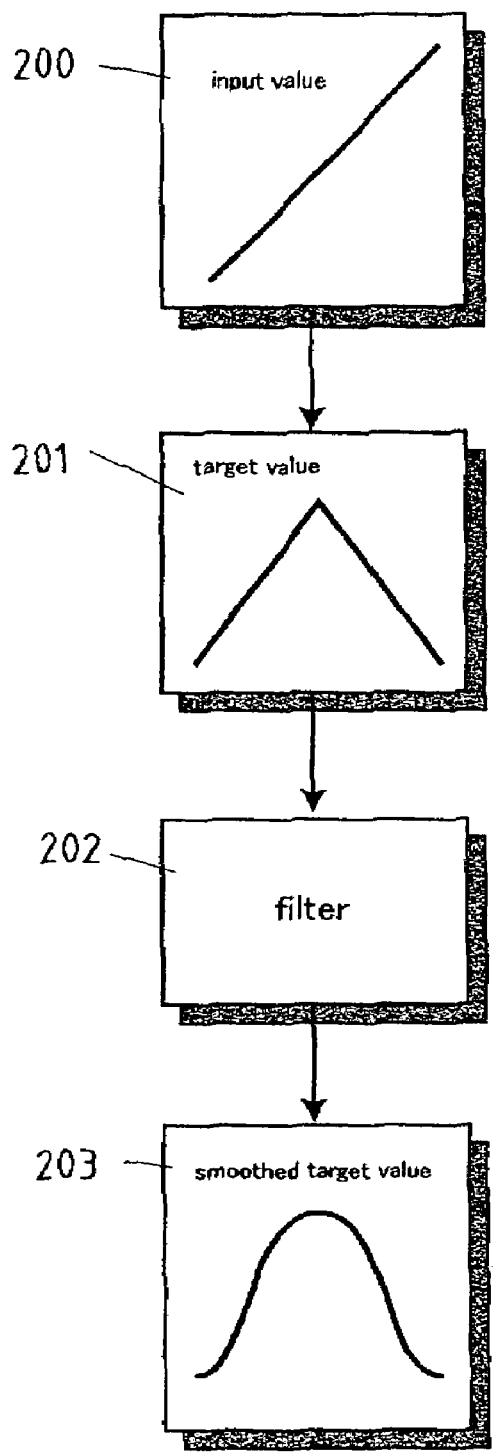
Figure 2:
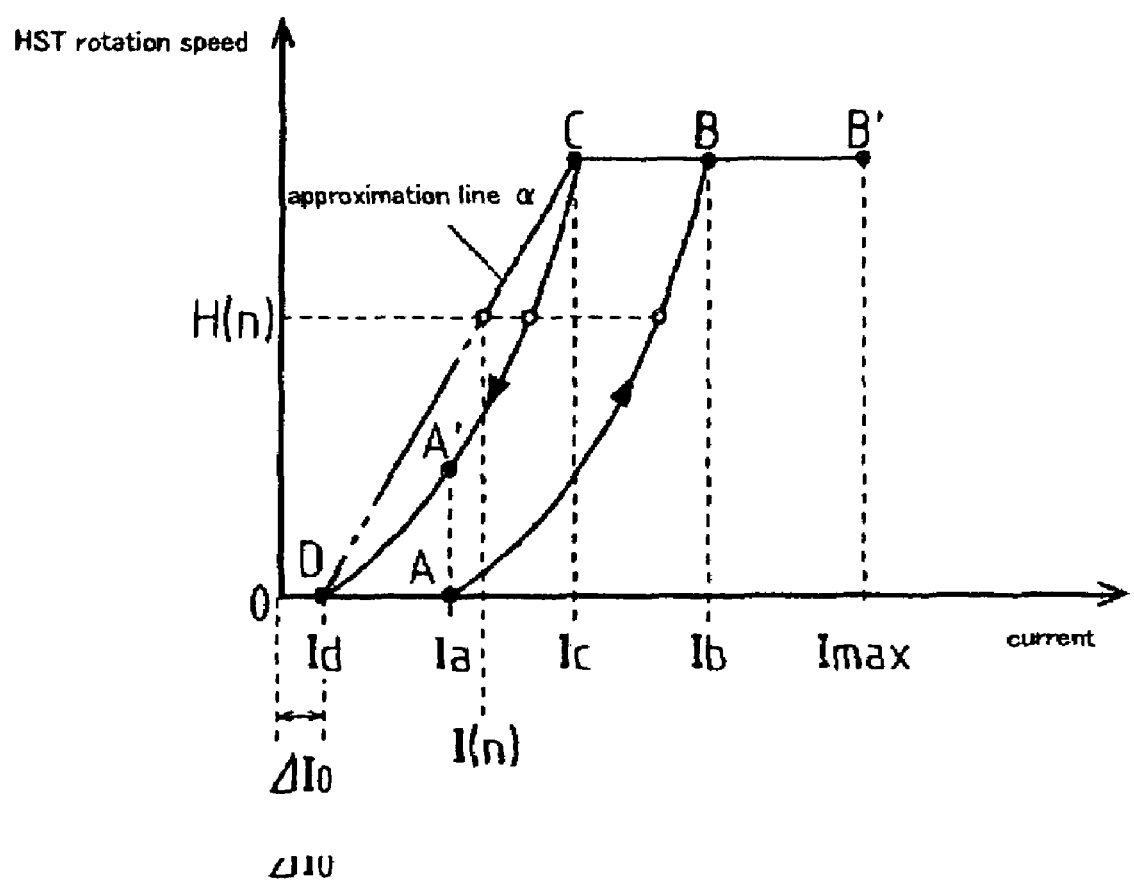

FIG. 25 is a drawing showing a filter optimizing a target value map of the current command value to the swash plate actuator accompanying change of the drive mode.

FIG. 26 is a correlation diagram of the HST (output) rotation speed relative to the current value to the HST swash plate angle actuator.

Figure 27:
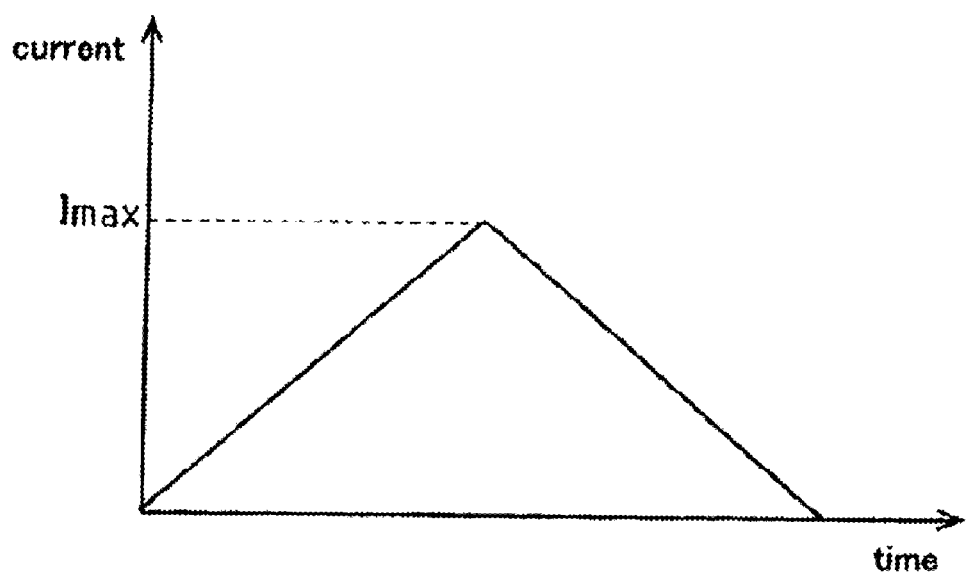

FIG. 27 is a diagram showing a sweeping change of the current for controlling HST swash plate angle at the time of acceleration in forward traveling.

Figure 28:
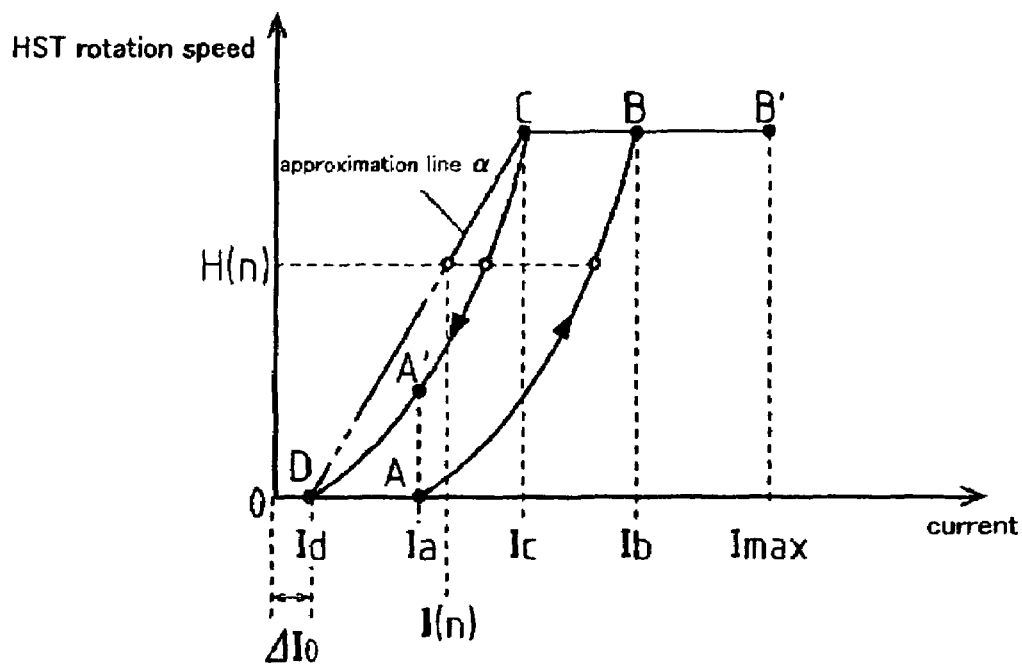

FIG. 28 is a correlation diagram of the HST rotation speed relative to the command current value, explaining a first method for determining the command current value to the HST swash plate angle actuator.

Figure 29:
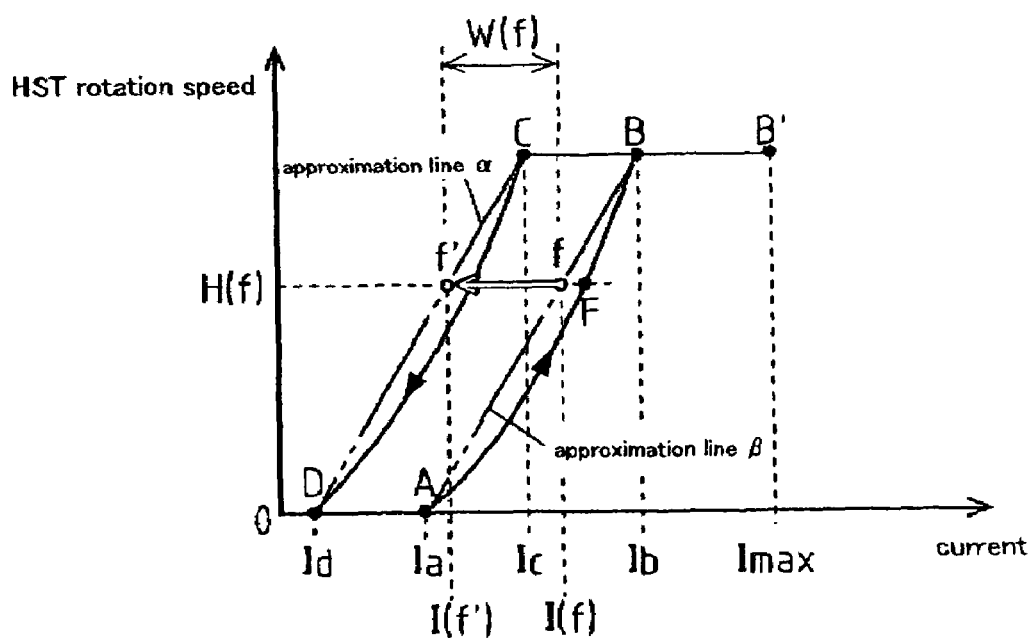
Figure 28:
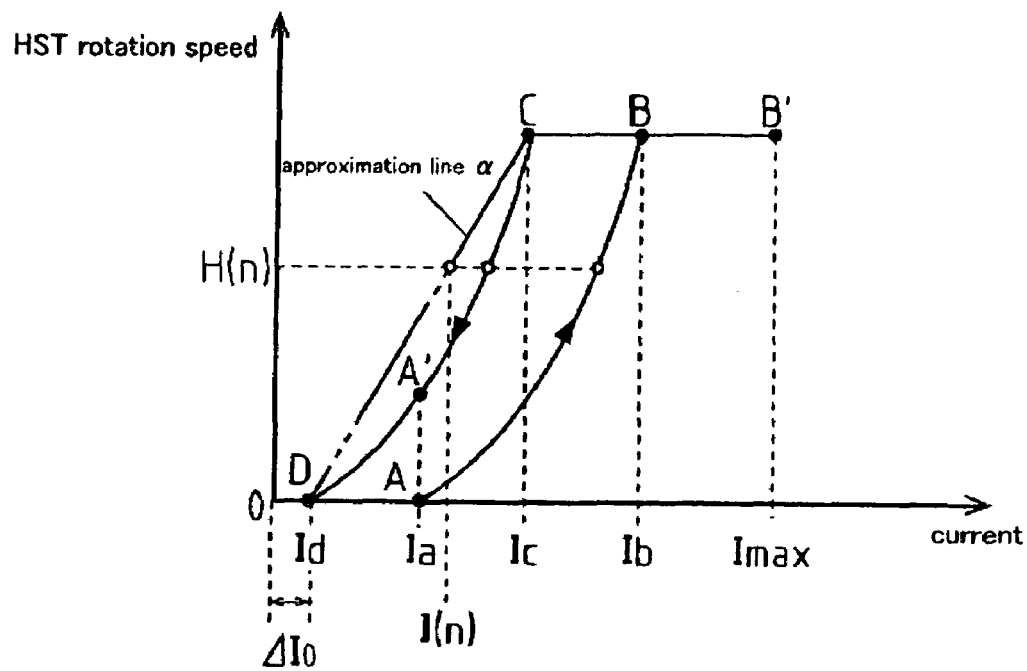
Figure 29:
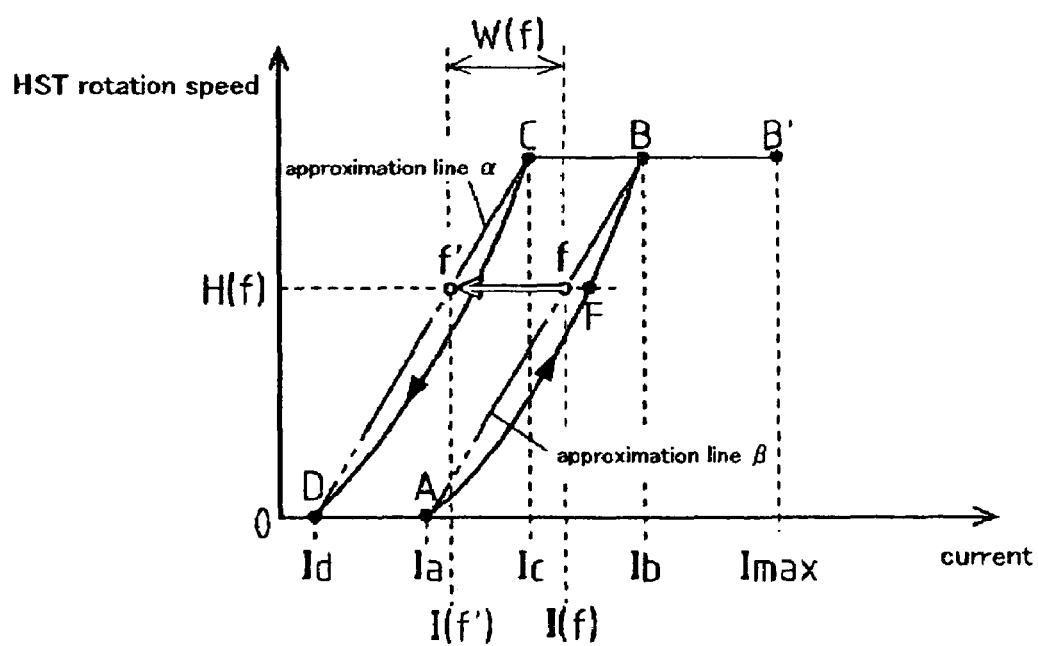

FIG. 29 is a correlation diagram of the above, explaining a second method for determining the command current value to the HST swash plate angle actuator.

Figure 30:
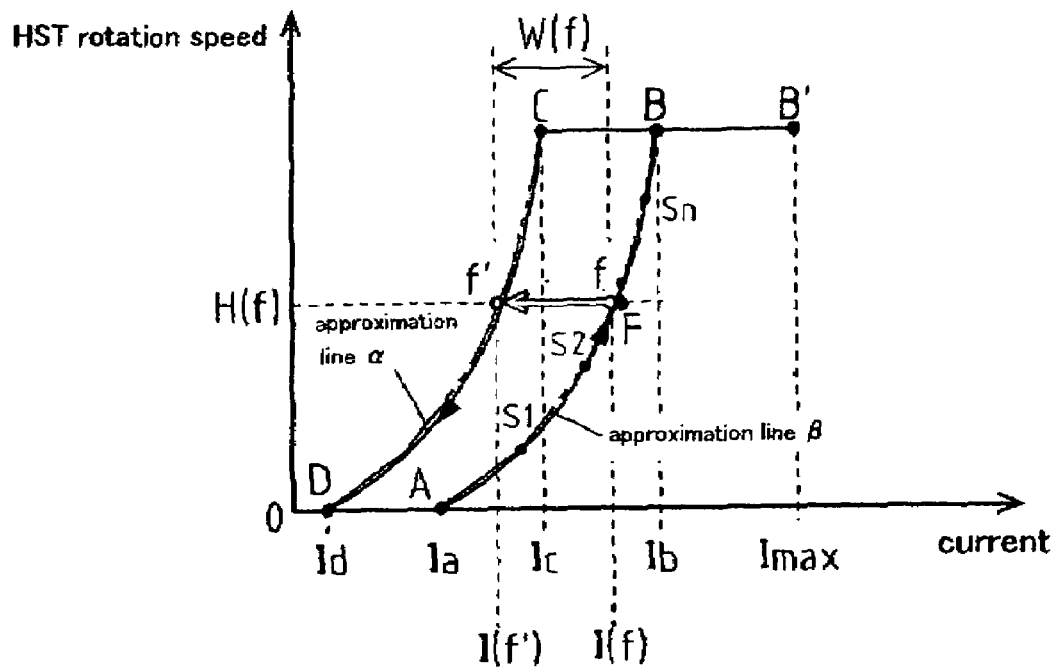

FIG. 30 is a correlation diagram of the above, explaining a third method for determining the command current value to the HST swash plate angle actuator.

Figure 31:
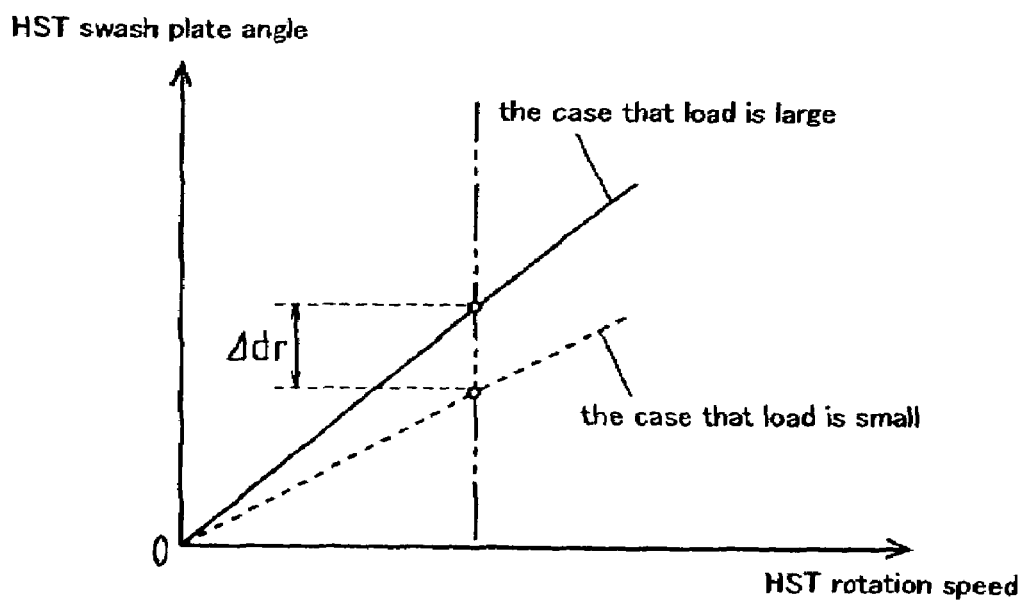

FIG. 31 is a diagram showing change of HST swash plate angle relative to the HST rotation speed depending on whether load is applied to the HST or not.

Figure 32:
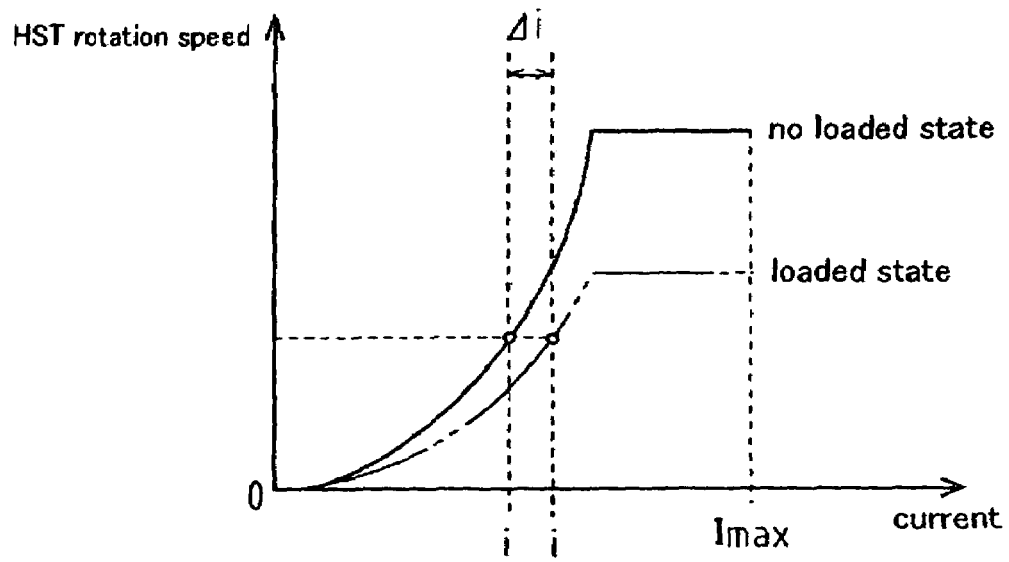

FIG. 32 is a diagram showing change of the HST rotation speed relative to the command current value to the HST swash plate angle actuator depending on whether load is applied to the HST or not.

Figure 33:
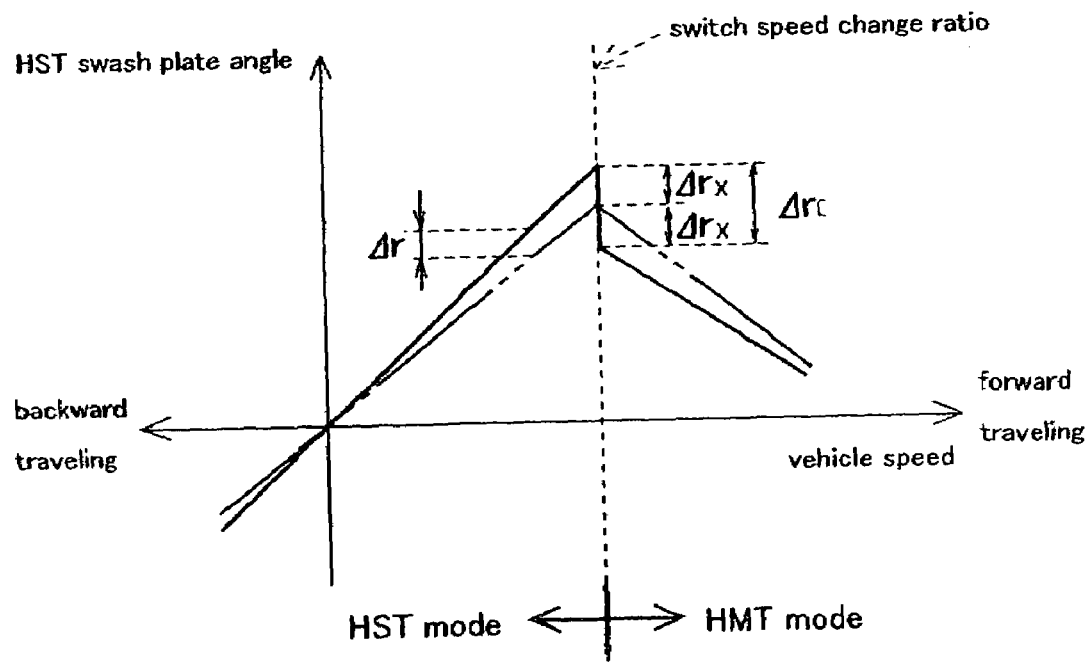

FIG. 33 is a diagram showing change of HST swash plate angle relative to the vehicle speed, explaining compensation of HST swash plate angle at the time of the switch of the drive mode.

Figure 34:
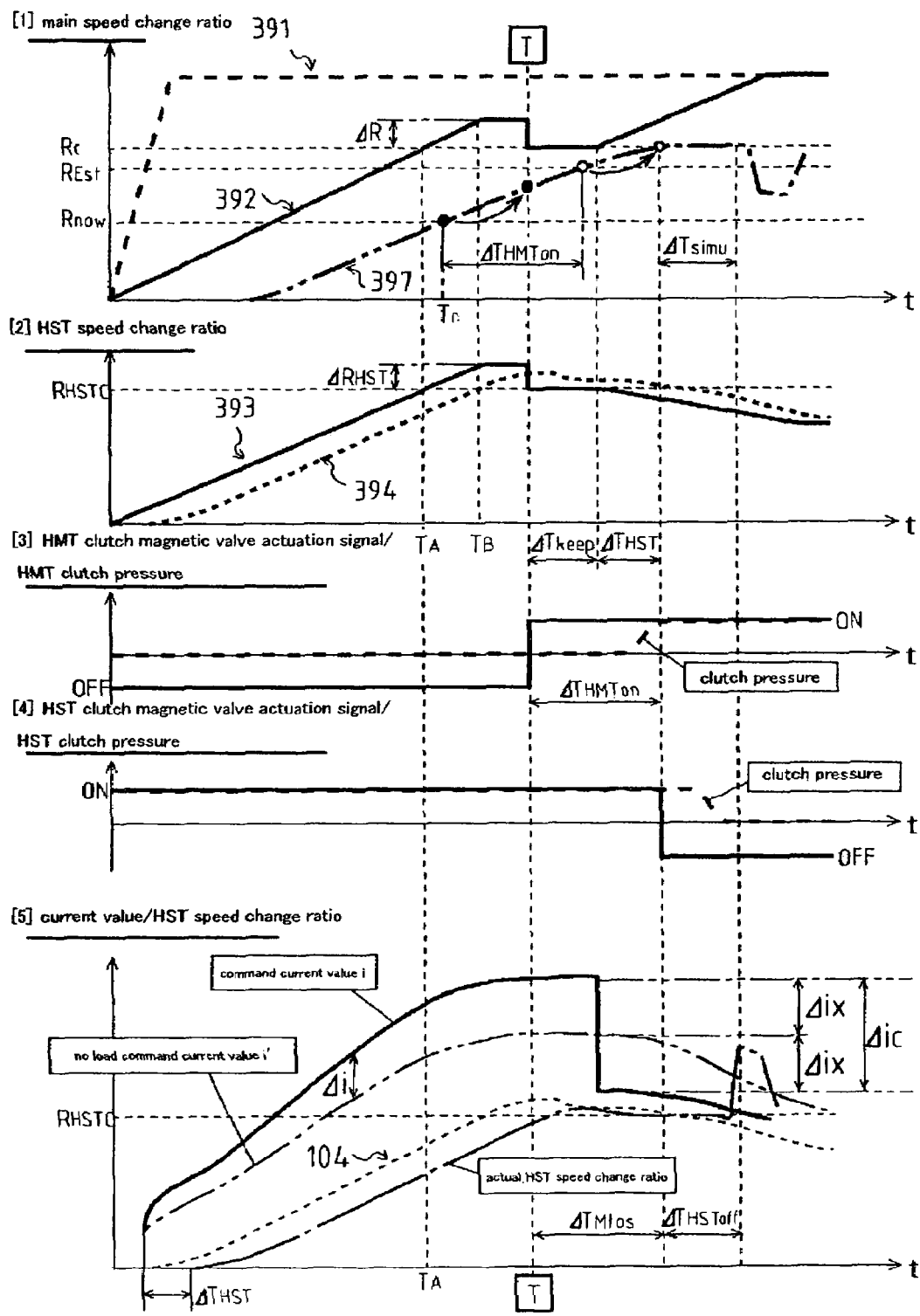

FIG. 34 is a time chart for determining the command current value to the HST swash plate angle actuator at the time of the switch of the drive mode.

Figure 35:
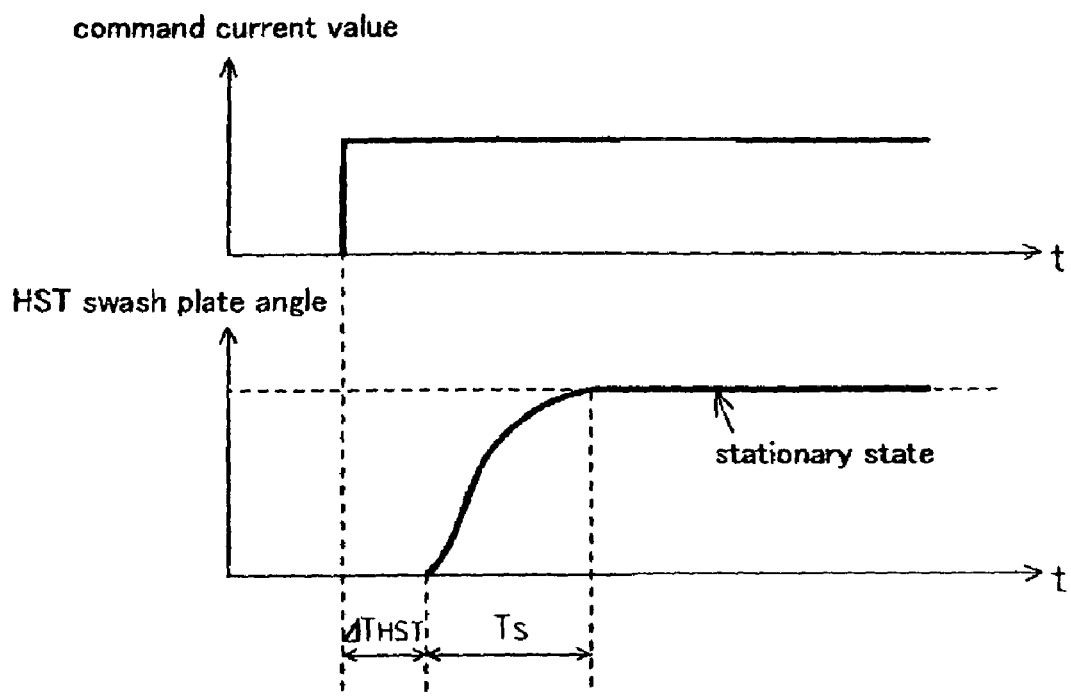

FIG. 35 is a time chart of HST swash plate angle in response to the command current value to the HST swash plate angle actuator.

Figure 36:
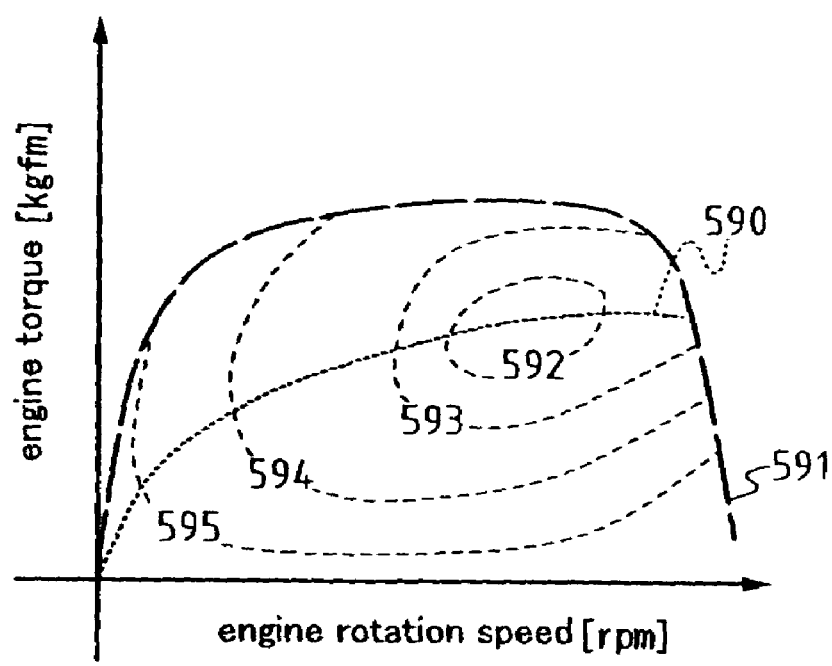

FIG. 36 is a diagram showing an iso fuel consumption curve of the engine.

Figure 37:
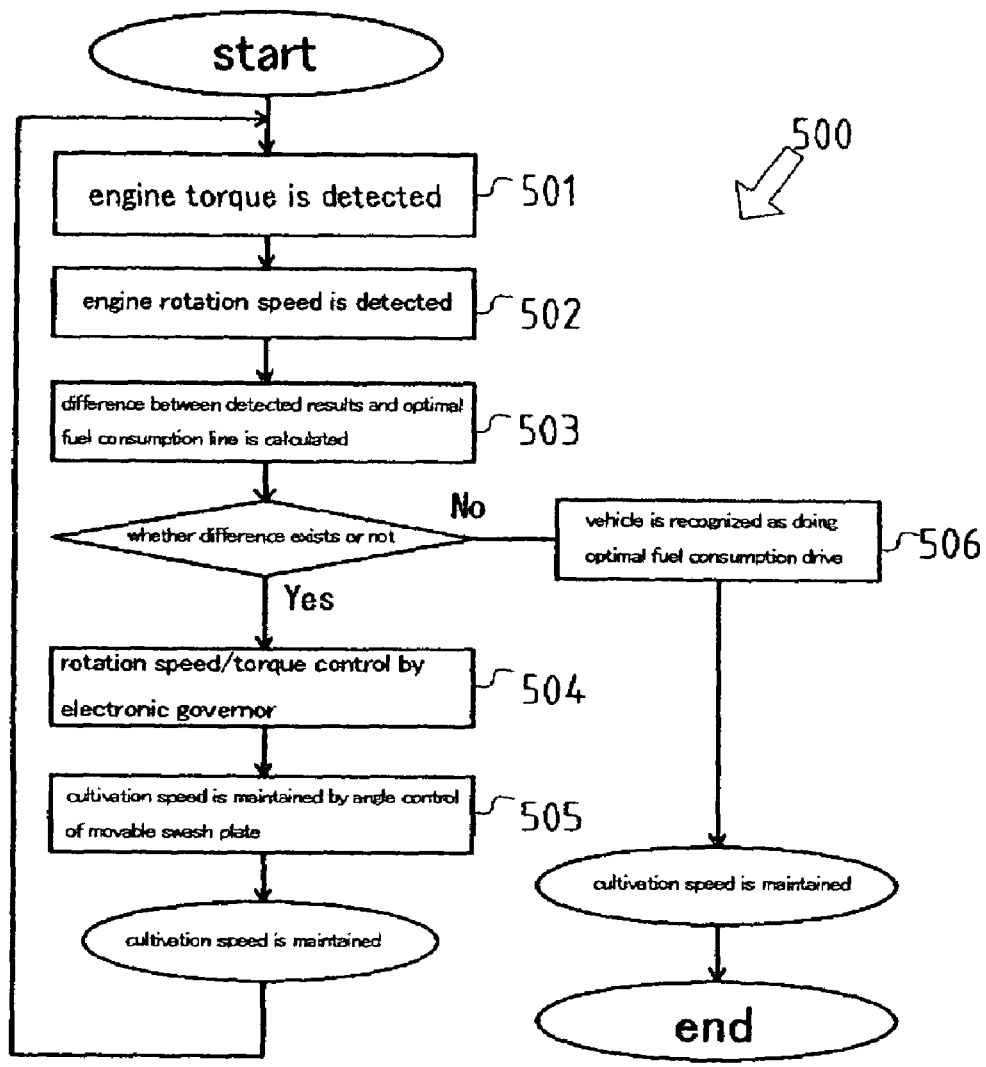

FIG. 37 is a flow chart of control of HST swash plate angle in association with control of the governor of the engine.

Figure 38:
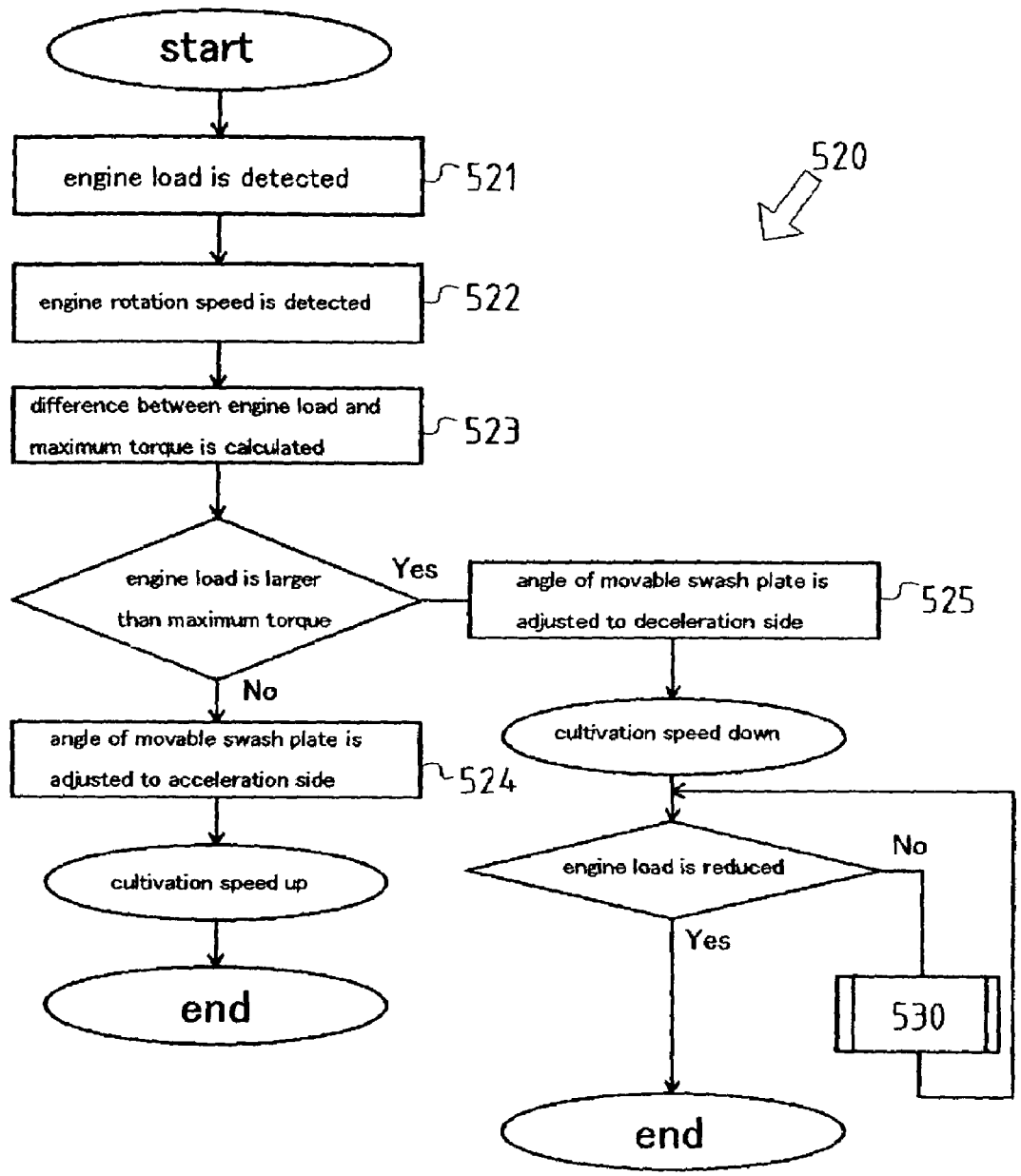

FIG. 38 is a flow chart of the above control of HST swash plate angle in association with control of the governor of the engine, expressing a control block corresponding to high load caused by the working machine.

Figure 39:
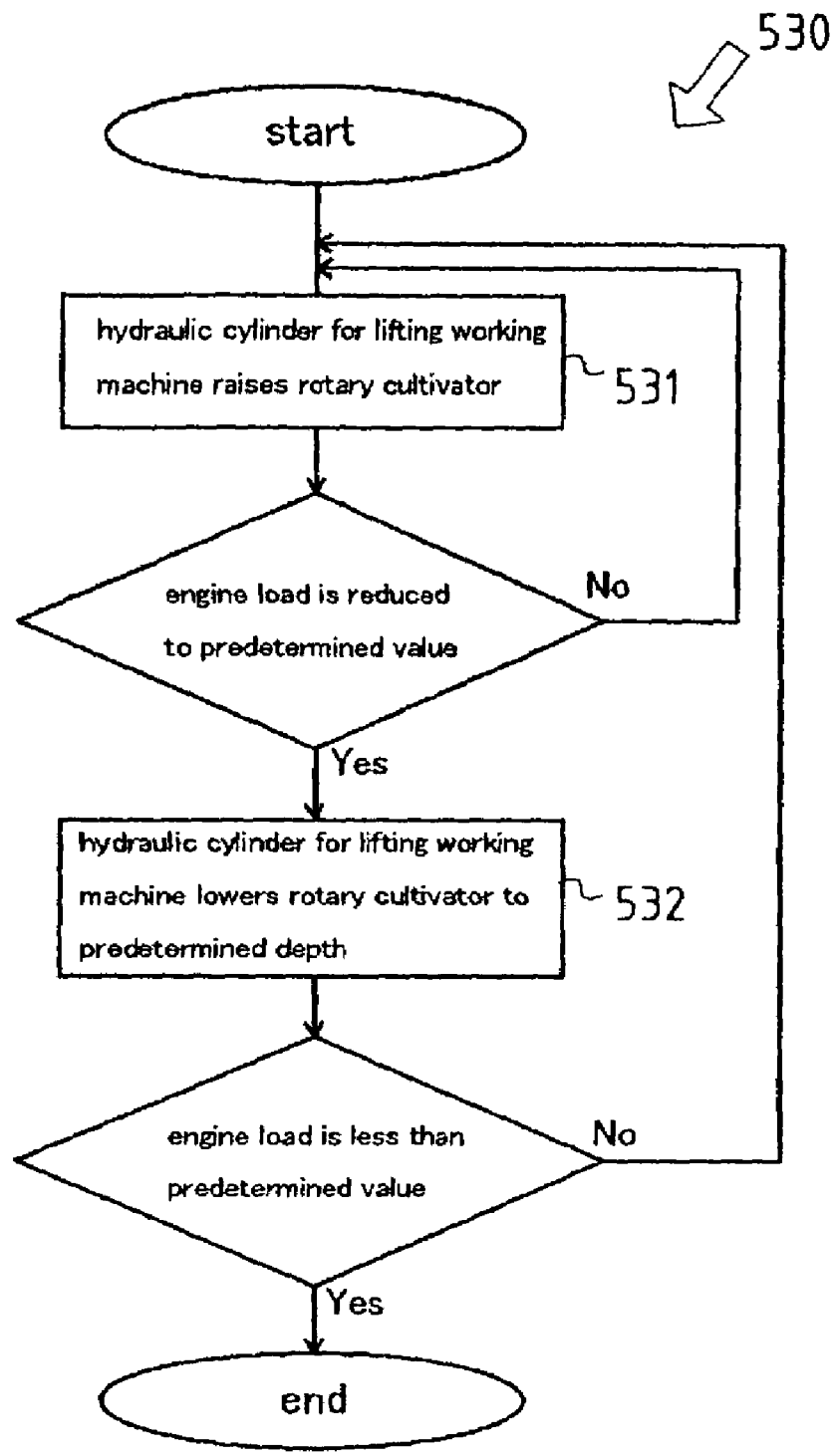
Figure 4:
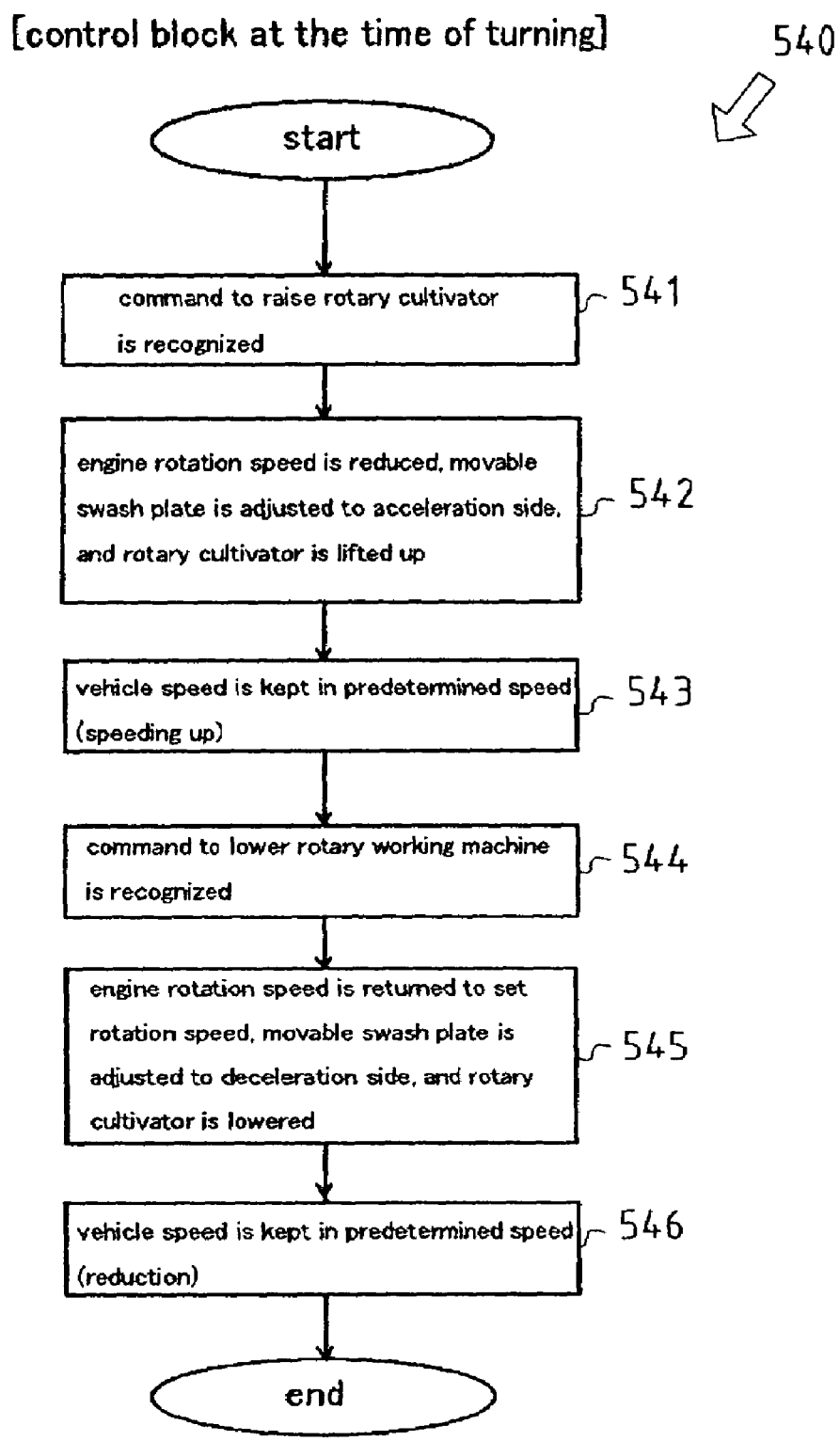

FIG. 39 is a flow chart of the above control of HST swash plate angle in association with control of the governor of the engine, expressing a cultivation depth control block.

FIG. 40 is a flow chart of the above control of HST swash plate angle in association with control of the governor of the engine, expressing a control block at the time of turning of the vehicle.

Figure 41:
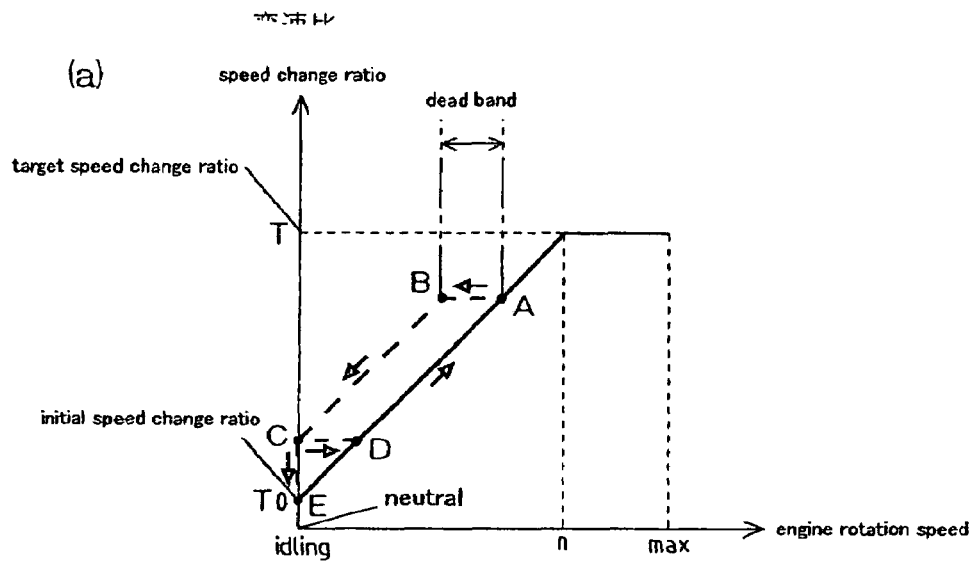

FIG. 41 is a correlation diagram of the HST speed change ratio relative to the engine rotation speed, wherein the HST speed change ratio in response to change of the engine rotation speed is provided with a dead band while the transmission is speed-changed.

Figure 42:
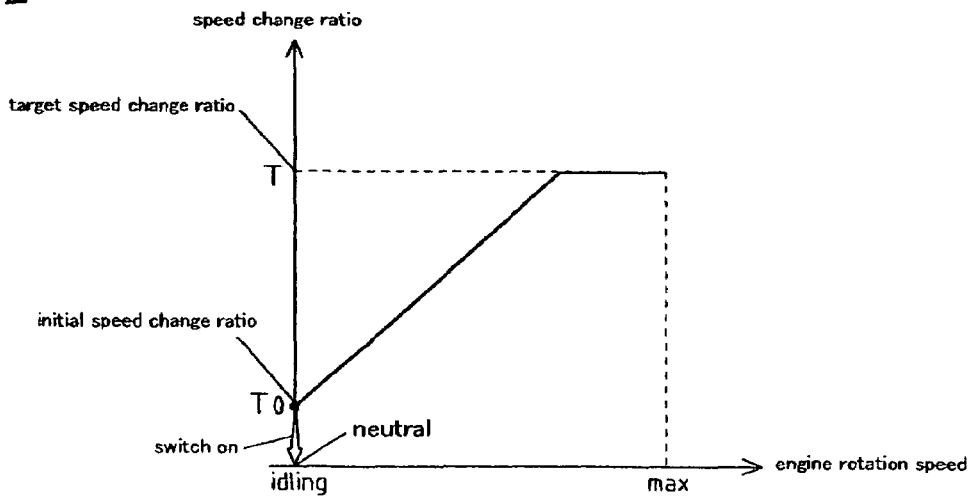

FIG. 42 is a correlation diagram of the HST speed change ratio relative to the engine rotation speed when the HST is controlled to neutral when the engine rotation reaches an idling value.

Figure 43:
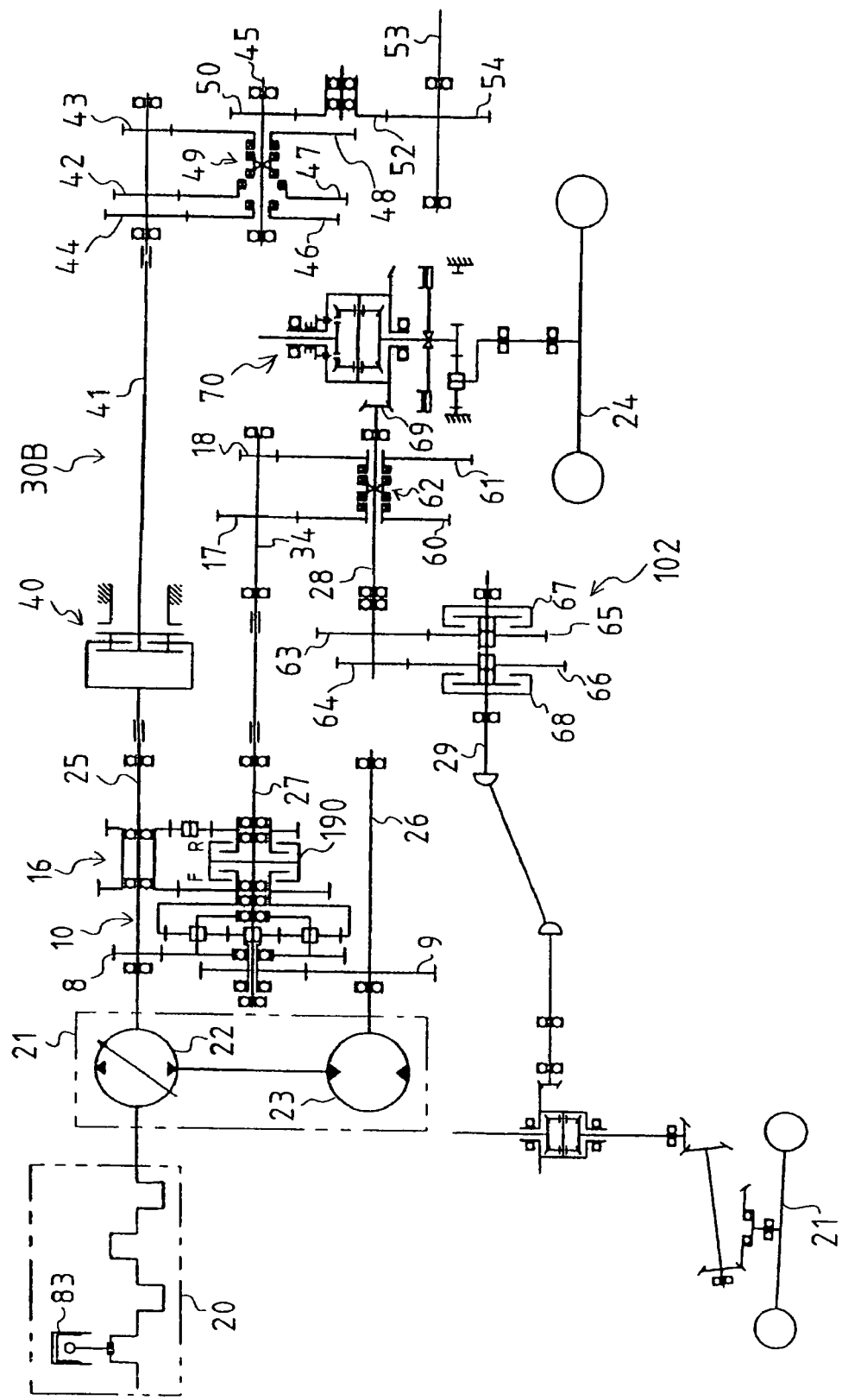

FIG. 43 is a skeleton drawing of a hydro-mechanical type second transmission 102, having a slide type clutch switched between forward traveling mode and backward traveling mode.

Figure 44:
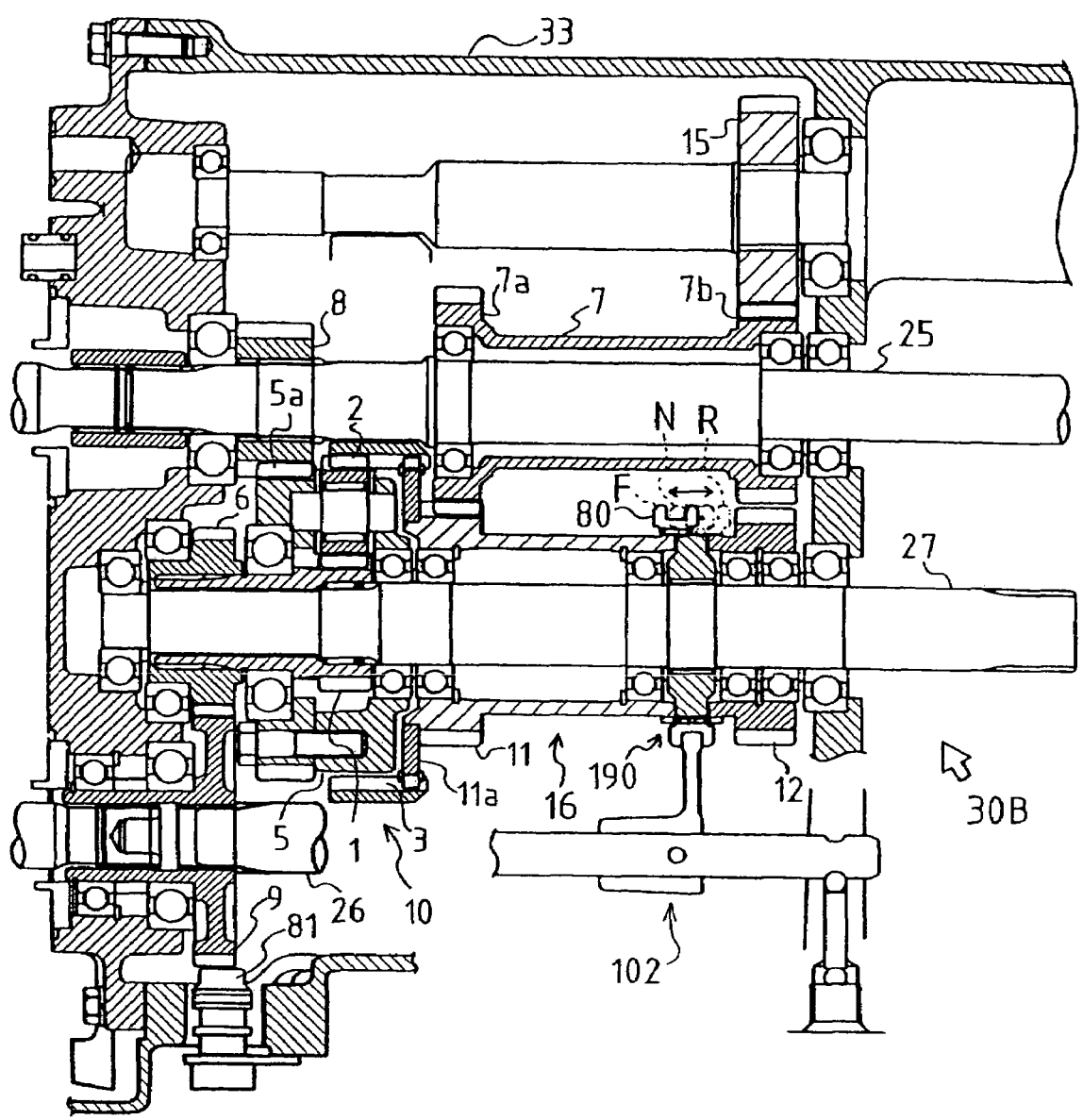

FIG. 44 is a sectional development of a front portion of the second transmission 102.

Figure 45:
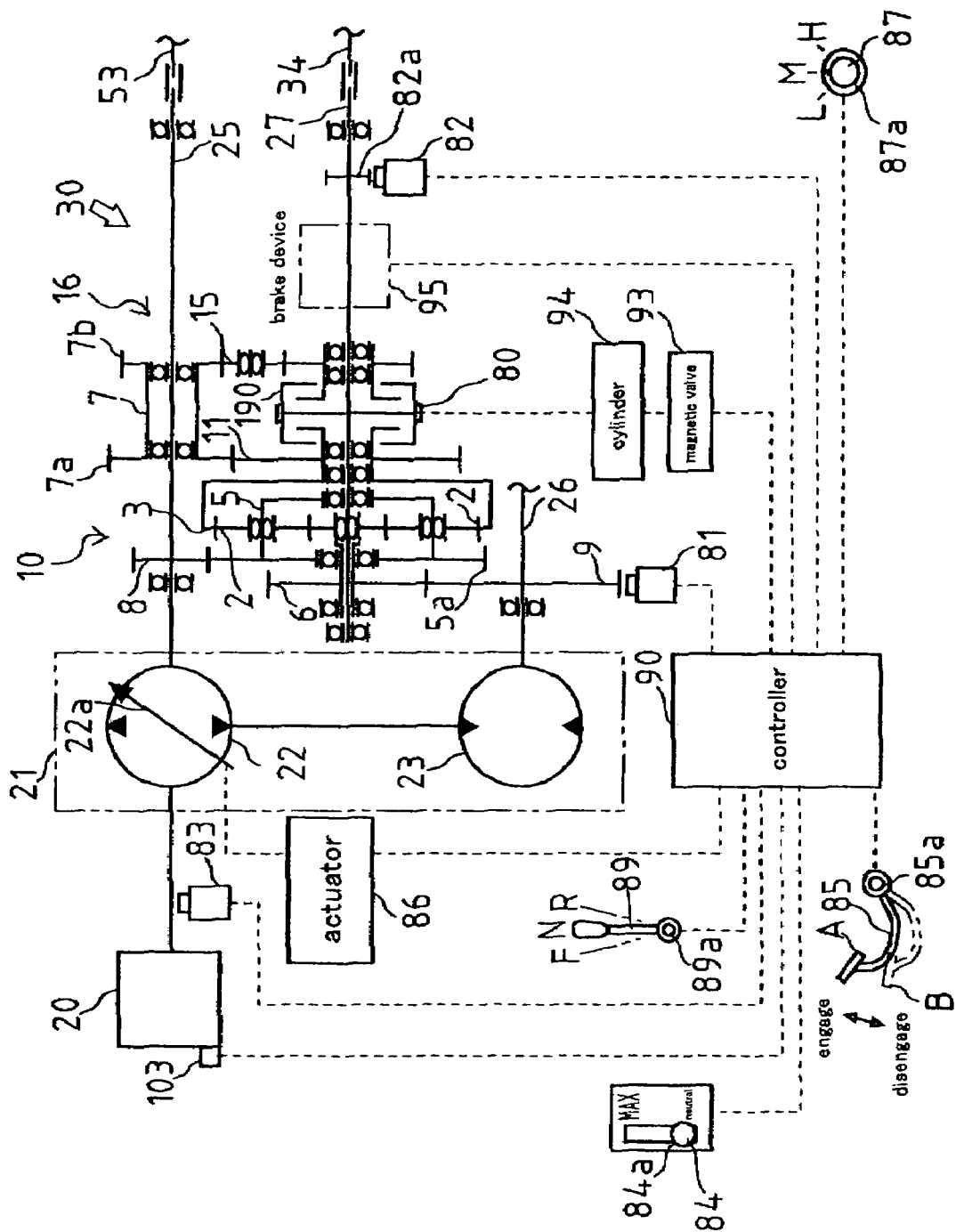

FIG. 45 is a block and skeleton drawing showing a control construction of the HST swash plate of the second transmission 102.

Figure 46:
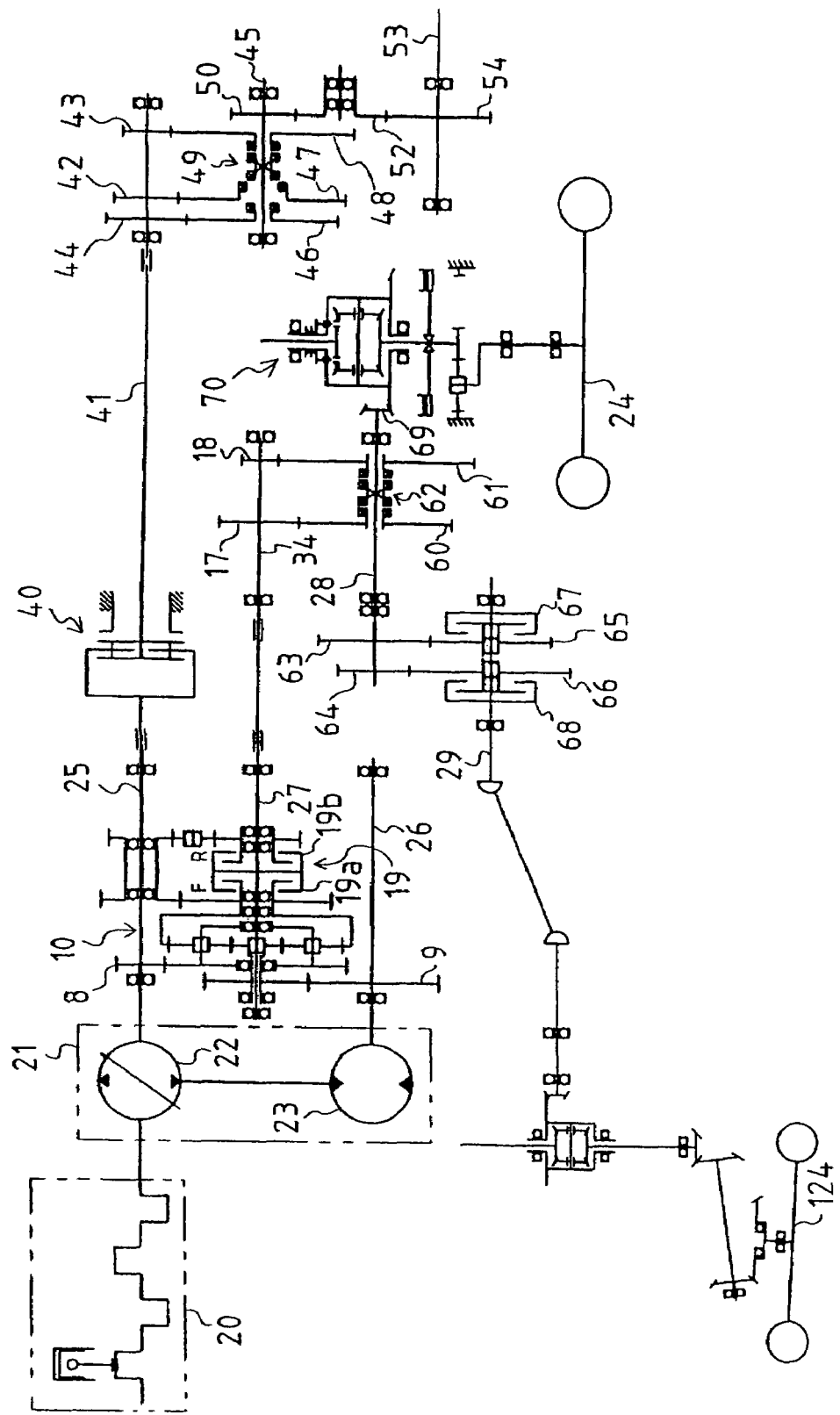

FIG. 46 is a skeleton drawing of the hydro mechanical type second transmission 102, having a hydraulic clutch switched between forward traveling mode and backward traveling mode.

Figure 47:
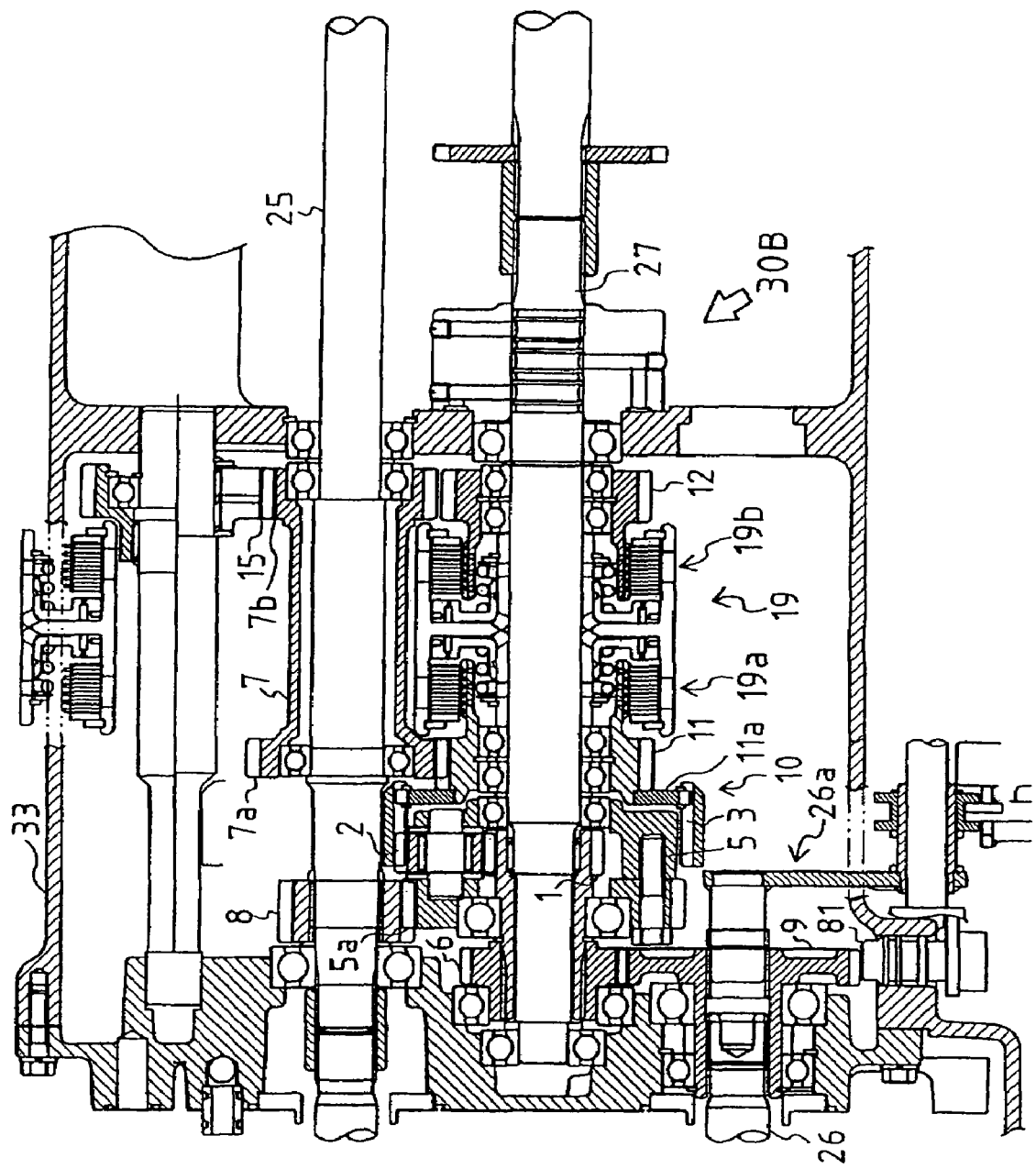

FIG. 47 is a sectional development of a front portion of the second transmission 102.

Figure 48:
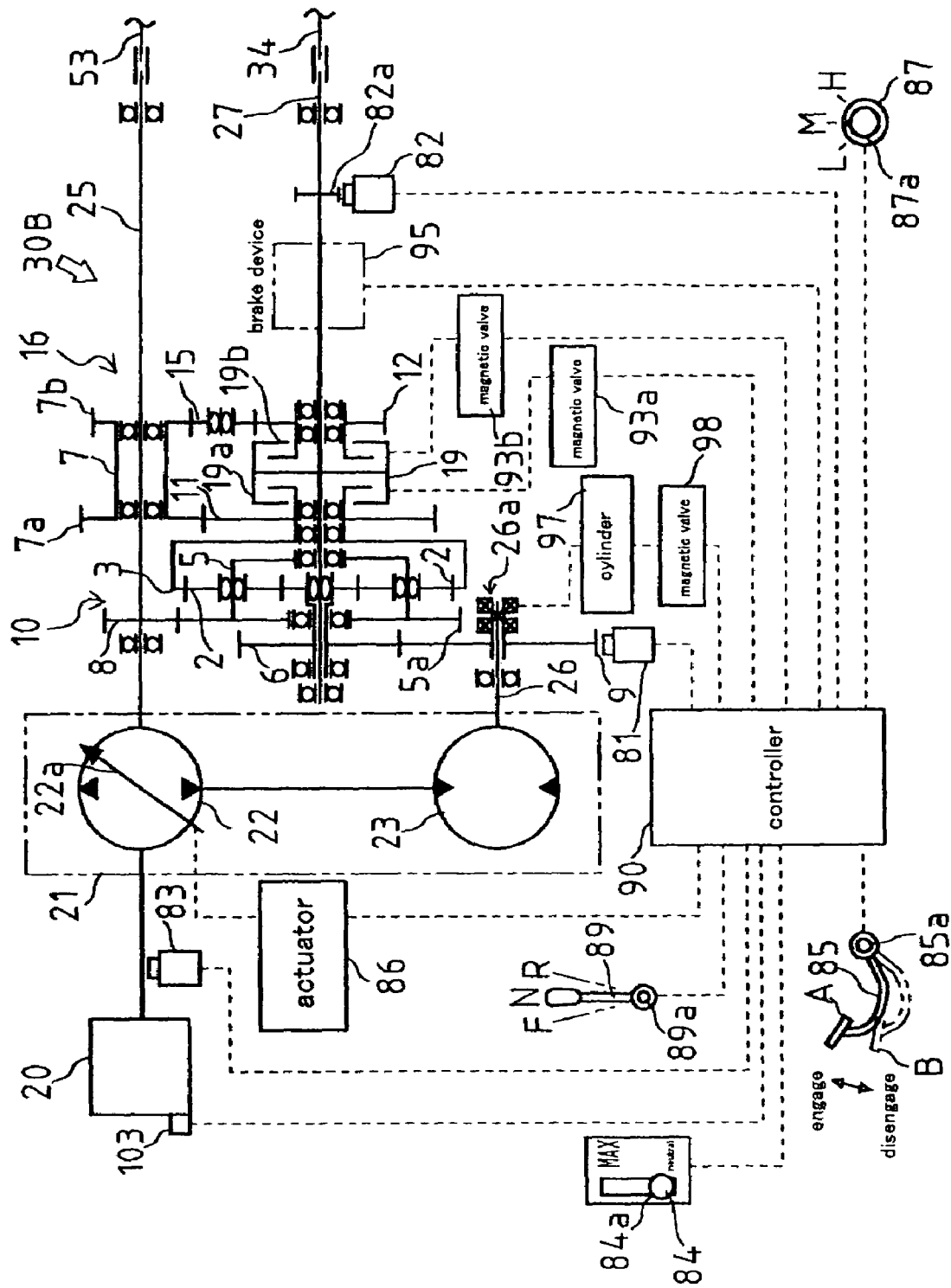

FIG. 48 is a block and skeleton drawing showing a control construction of the HST swash plate of the second transmission 102.

Figure 49:
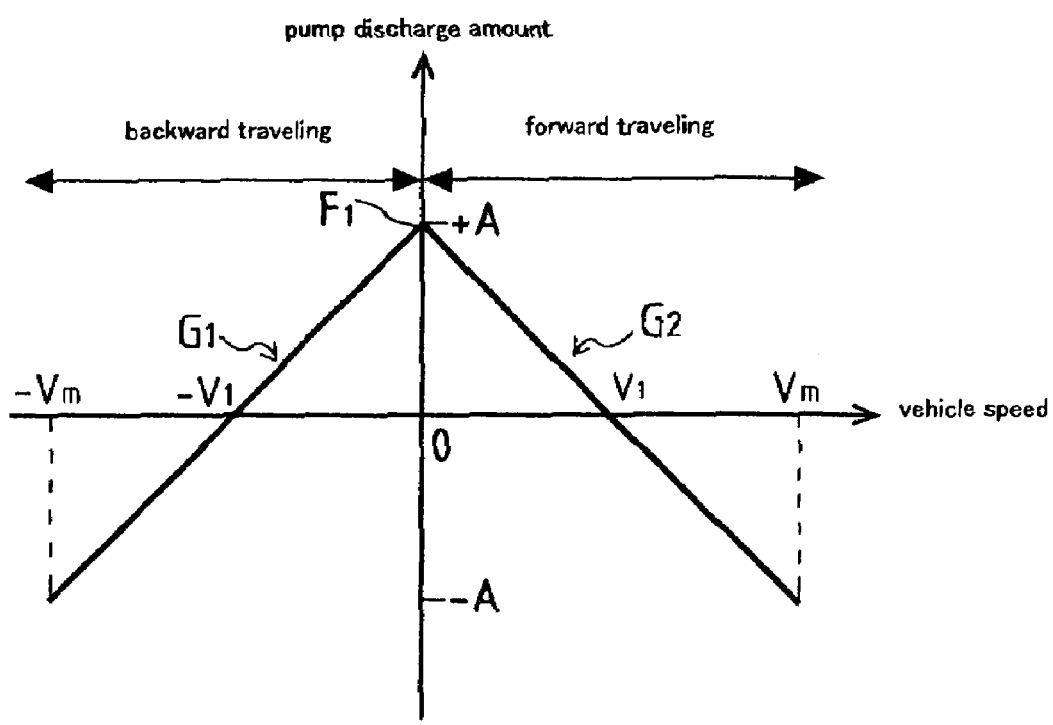

FIG. 49 is a drawing showing a map of pump discharge (HST output) relative to the vehicle speed for controlling the HST swash plate of the second transmission 102.

Figure 50:
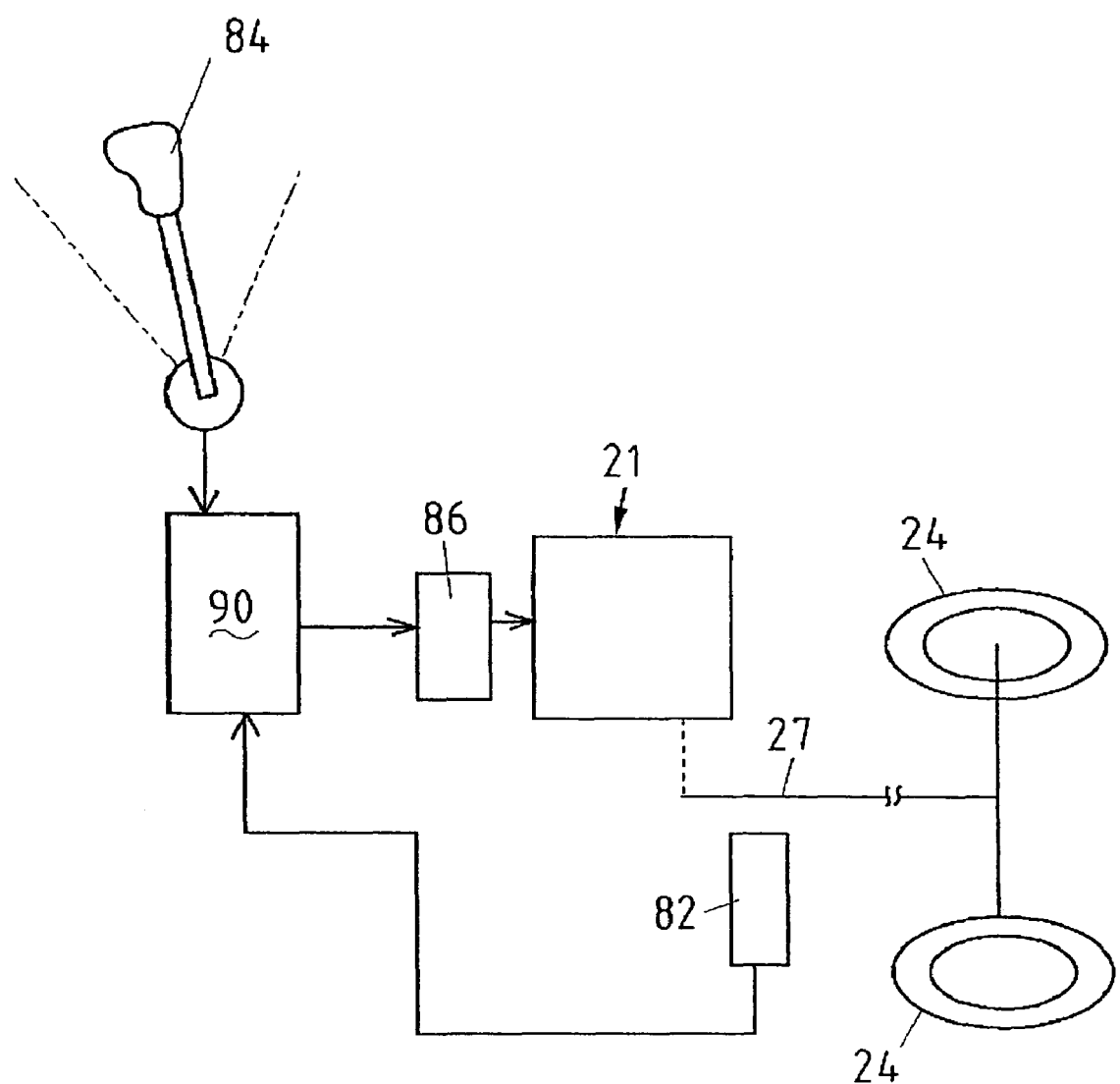

FIG. 50 is a schematic diagram showing a speed change control mechanism with operation of the main speed change lever of the vehicle.

Figure 51:
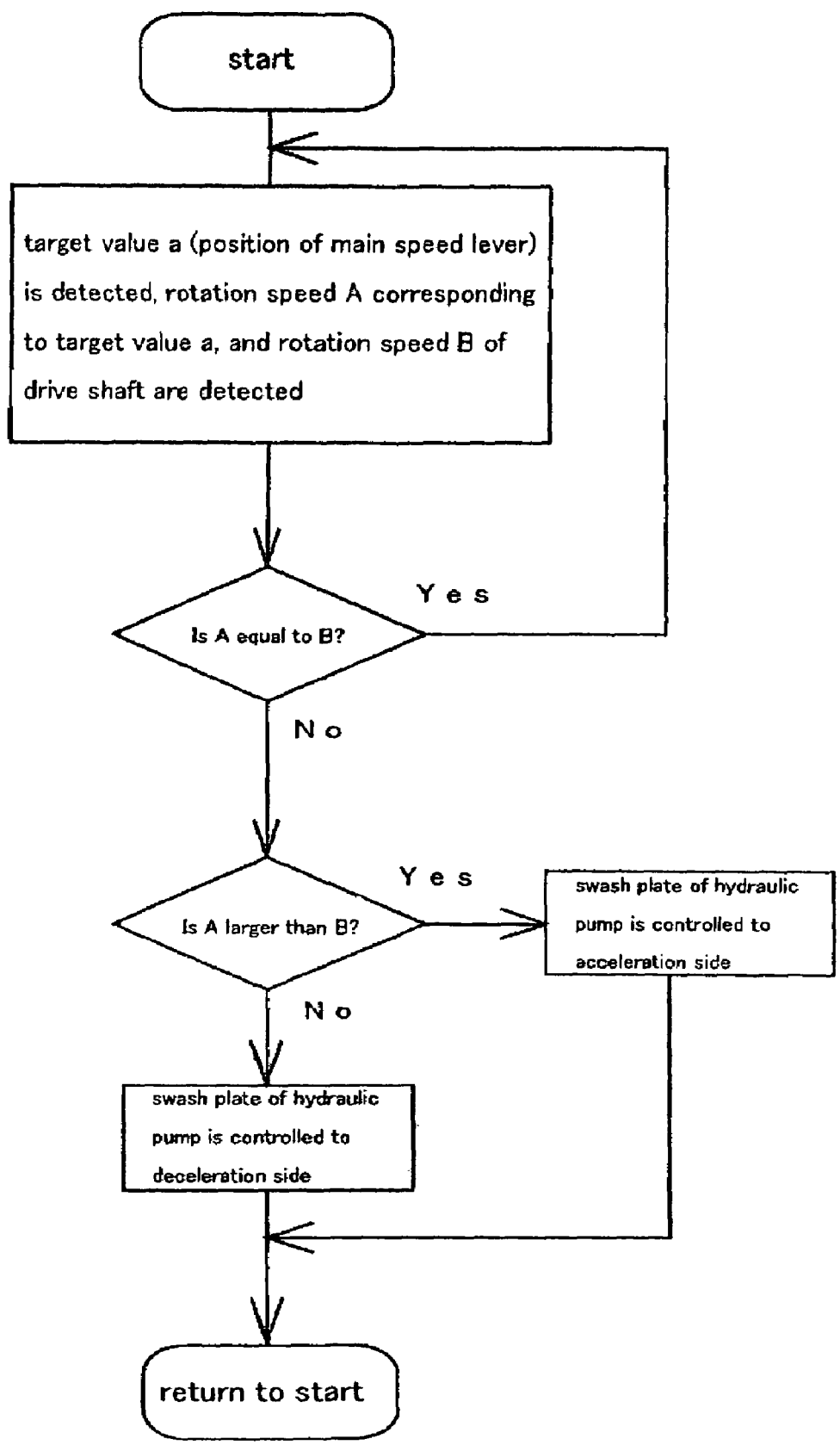

FIG. 51 is a flow chart of control of the HST speed change ratio based on the operation of the main speed change lever with regard to the second transmission 102.

Figure 52:
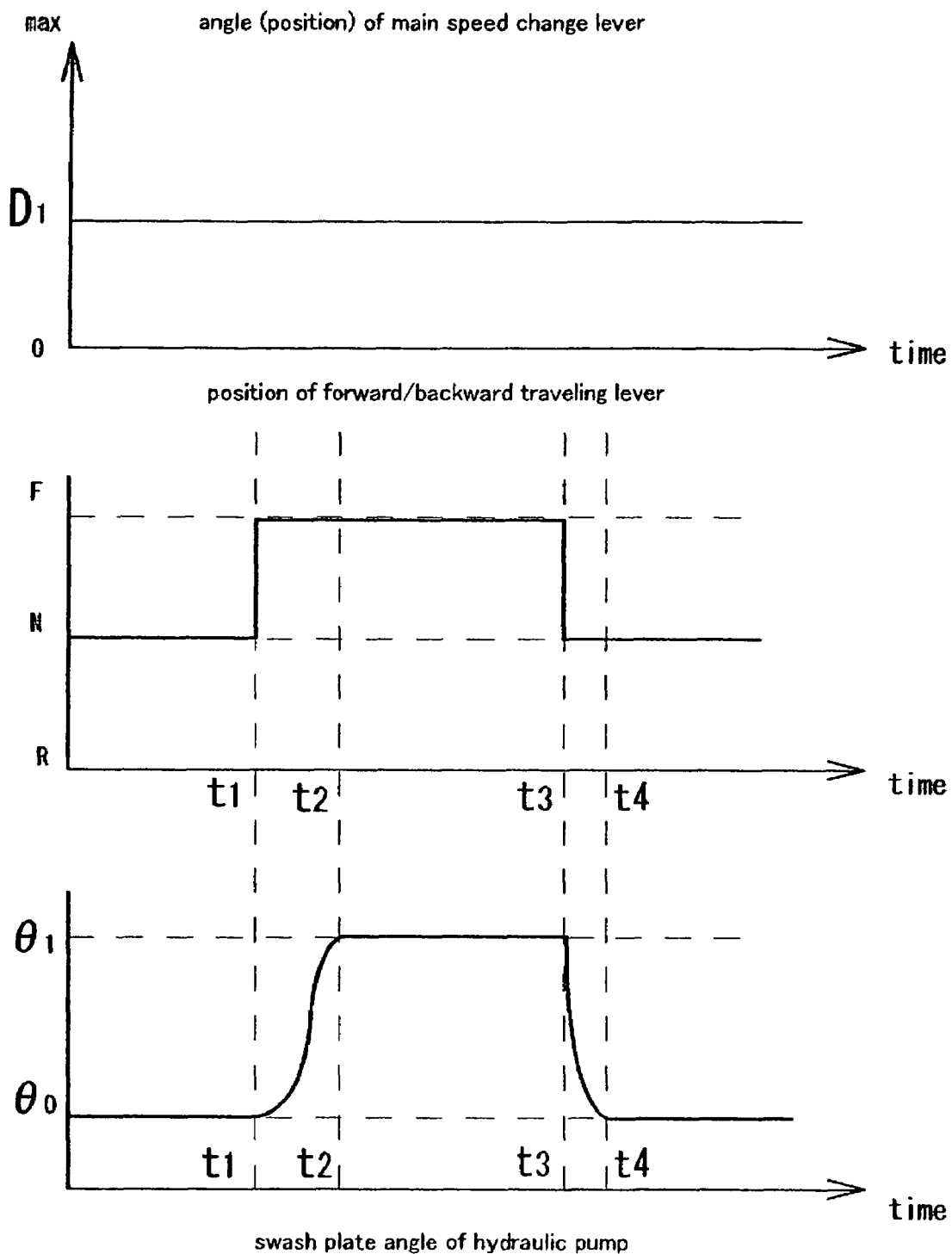

FIG. 52 is a time chart showing change of HST swash plate angle when a forward/backward travel switch lever 89 is switched between a forward position and a neutral position under constant speed setting.

Figure 53:
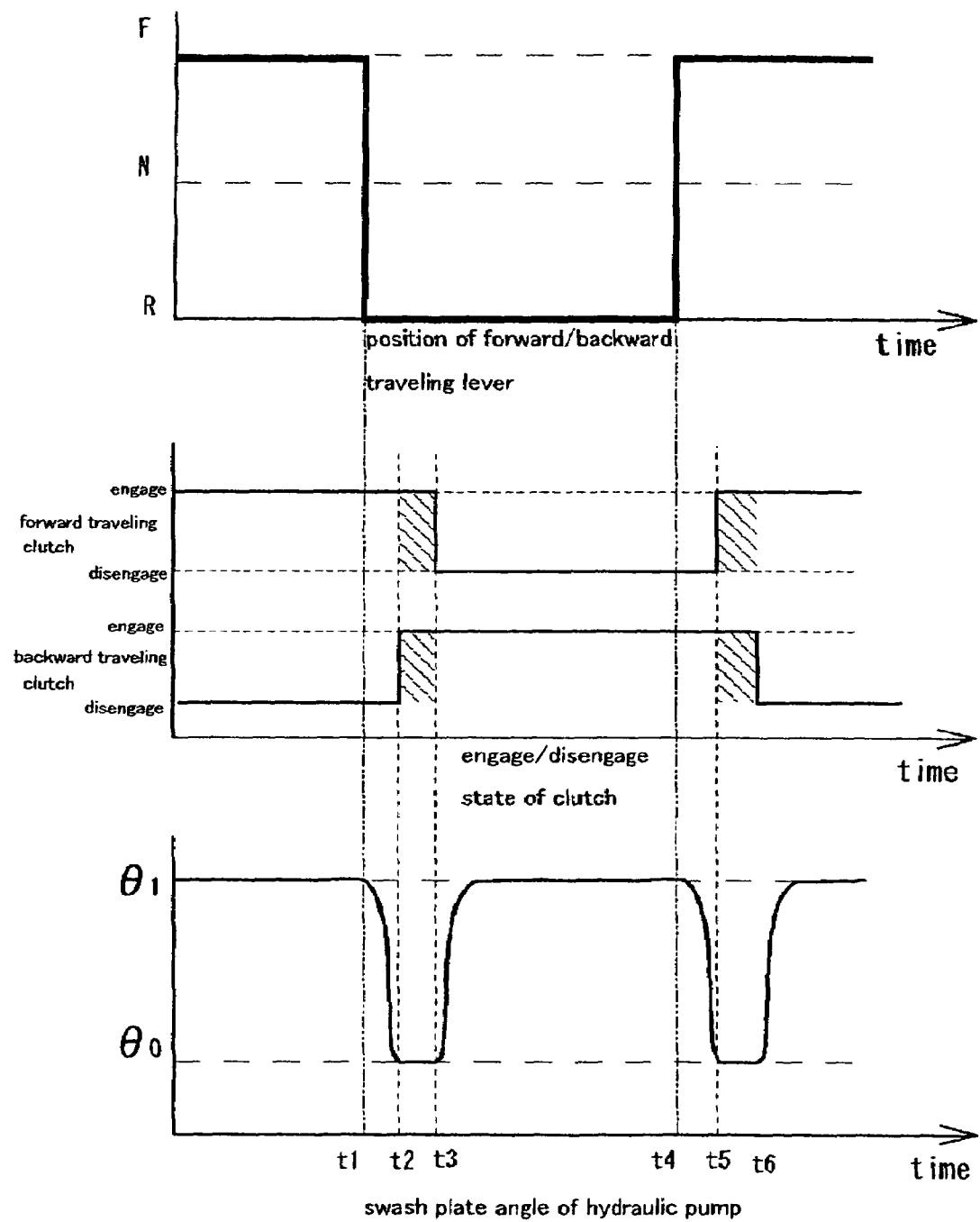

FIG. 53 is a time chart showing change of HST swash plate angle when the forward/backward travel switch lever 89 is switched between the forward position and a backward position under constant speed setting.

FIG. 54 is a drawing showing a force applied on the vehicle staying on a slope.

Figure 55:
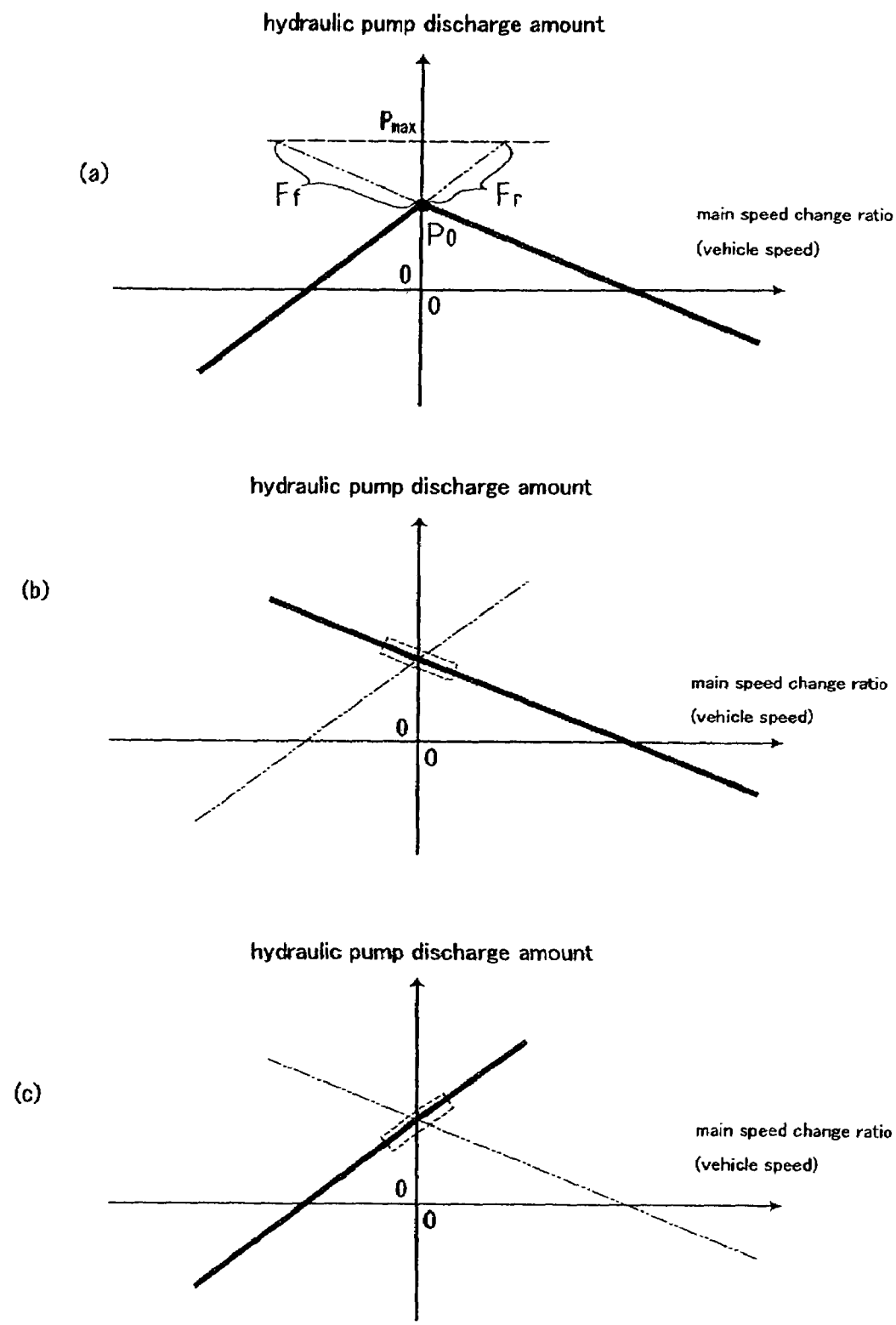

FIG. 55 is a correlation diagram of the hydraulic pump discharge relative to the main speed change ratio, showing a control construction of the hydraulic pump when the vehicle is stationary on a slope.

Figure 56:
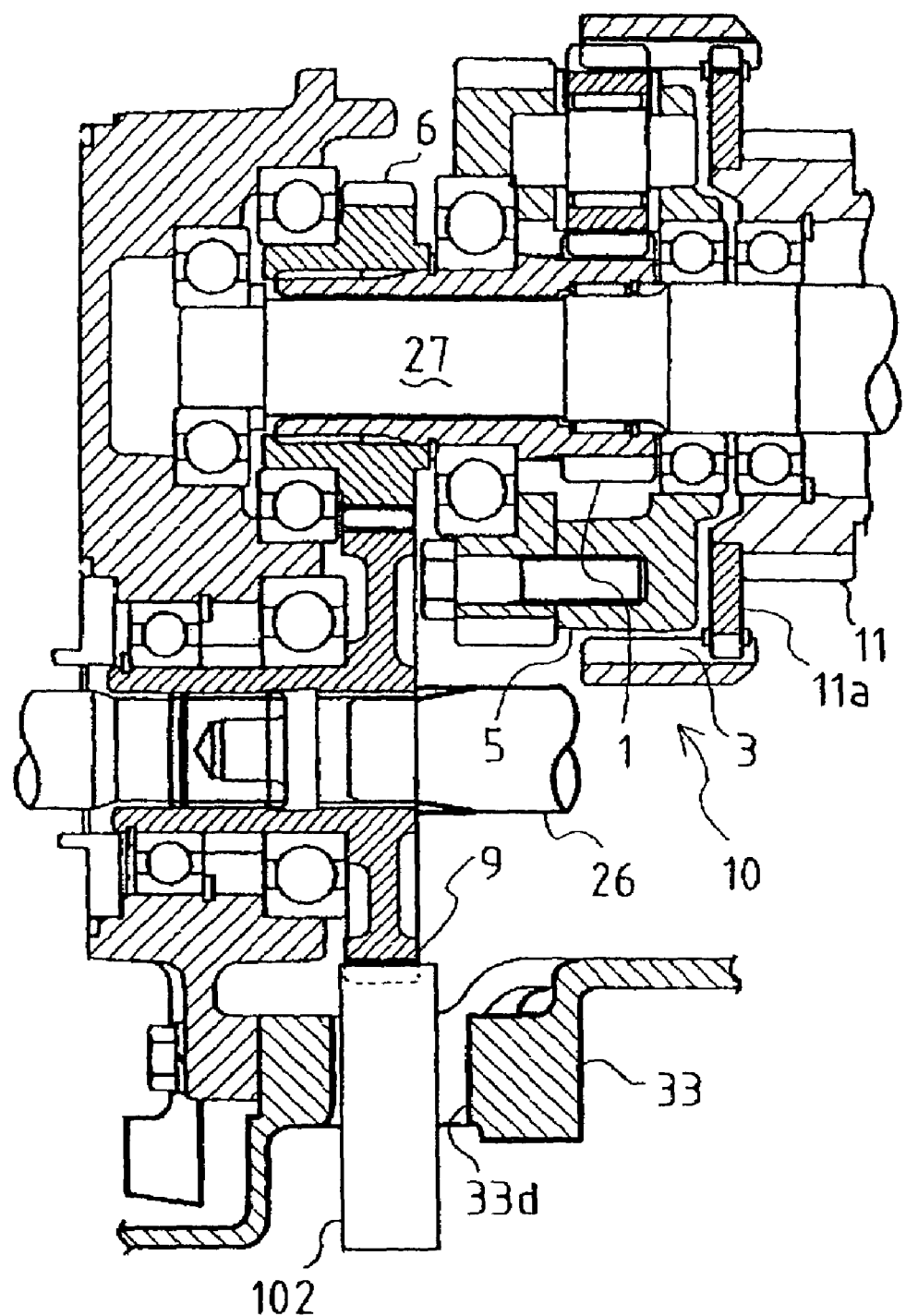

FIG. 56 is a sectional view showing a part of the second transmission 102 provided with emergency means for stopping an HST motor shaft.

Figure 57:
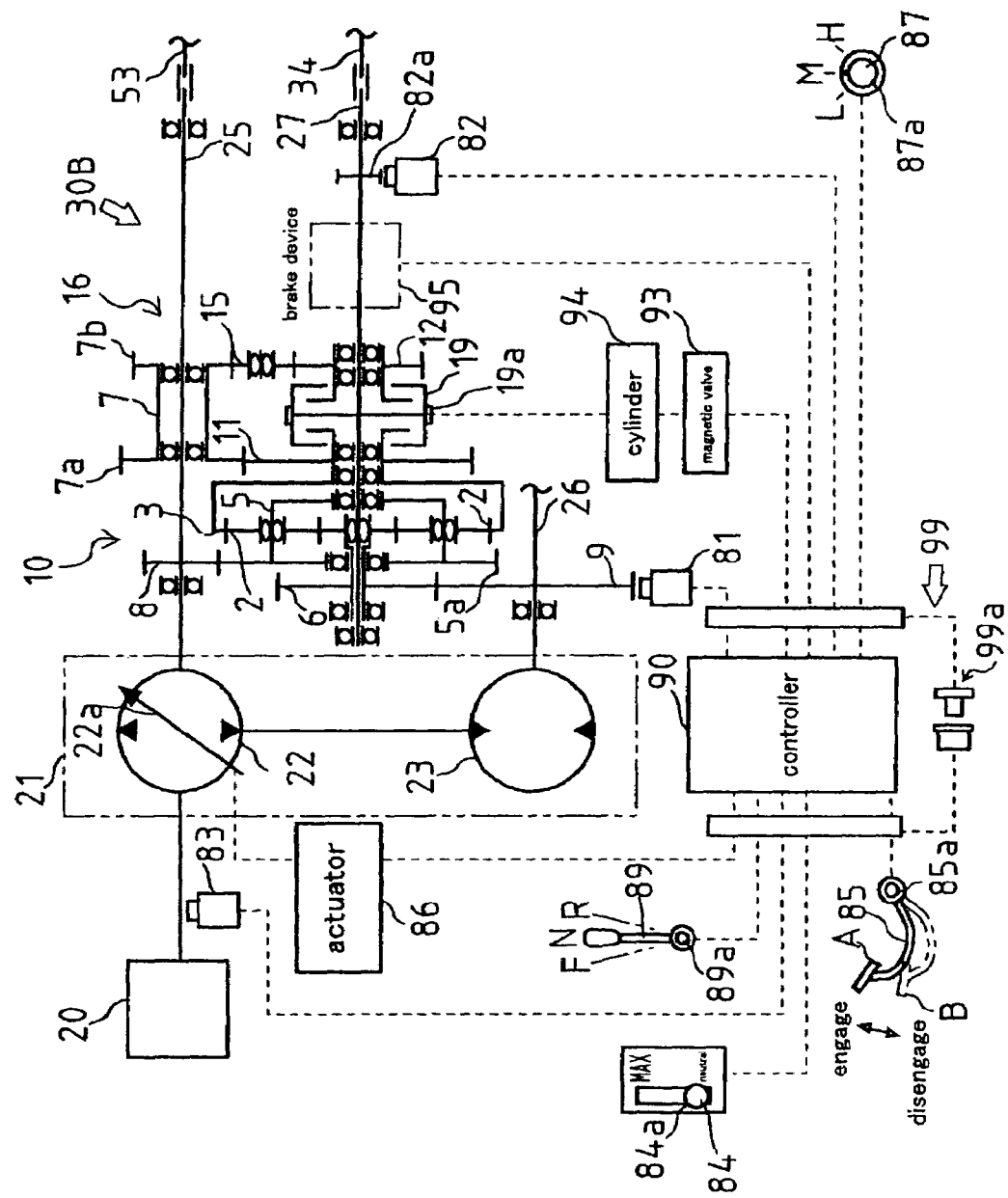

FIG. 57 is a block and skeleton drawing of the second transmission 102, showing a construction for controlling the HST swash plate in association with the emergency means.

Figure 58:
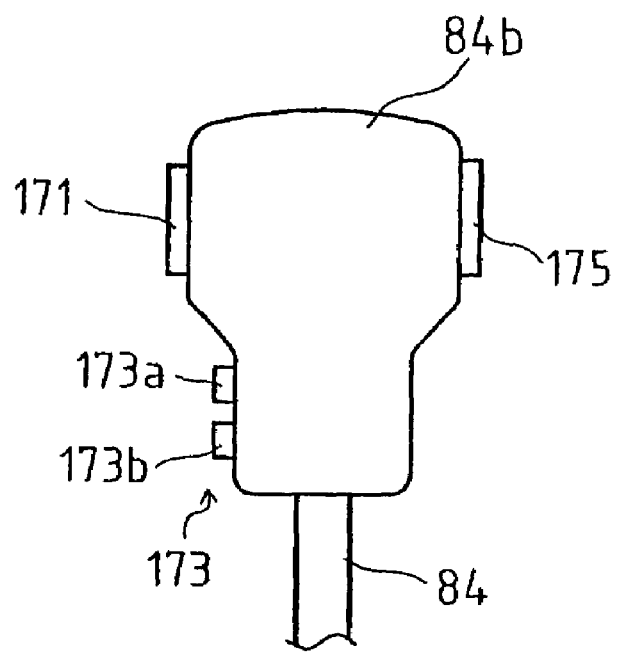

FIG. 58 is a front view of the main speed change lever 84 disposed with a speed setting switch and various mode switches.

Figure 59:
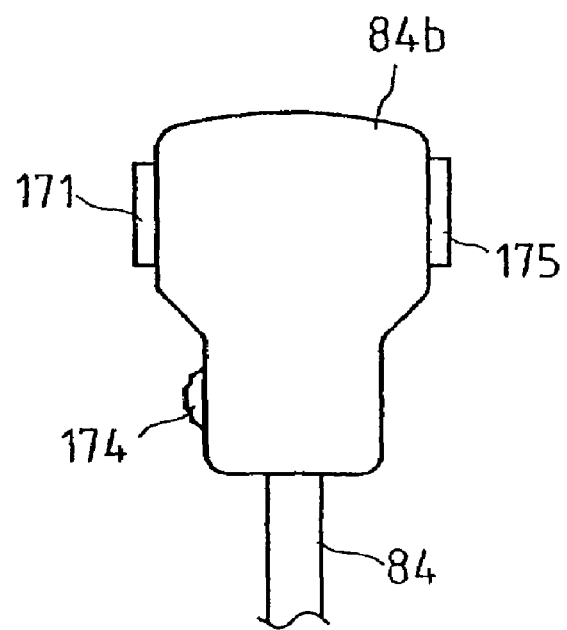

FIG. 59 is a front view of the main speed lever 84 according to another embodiment.

Figure 60:
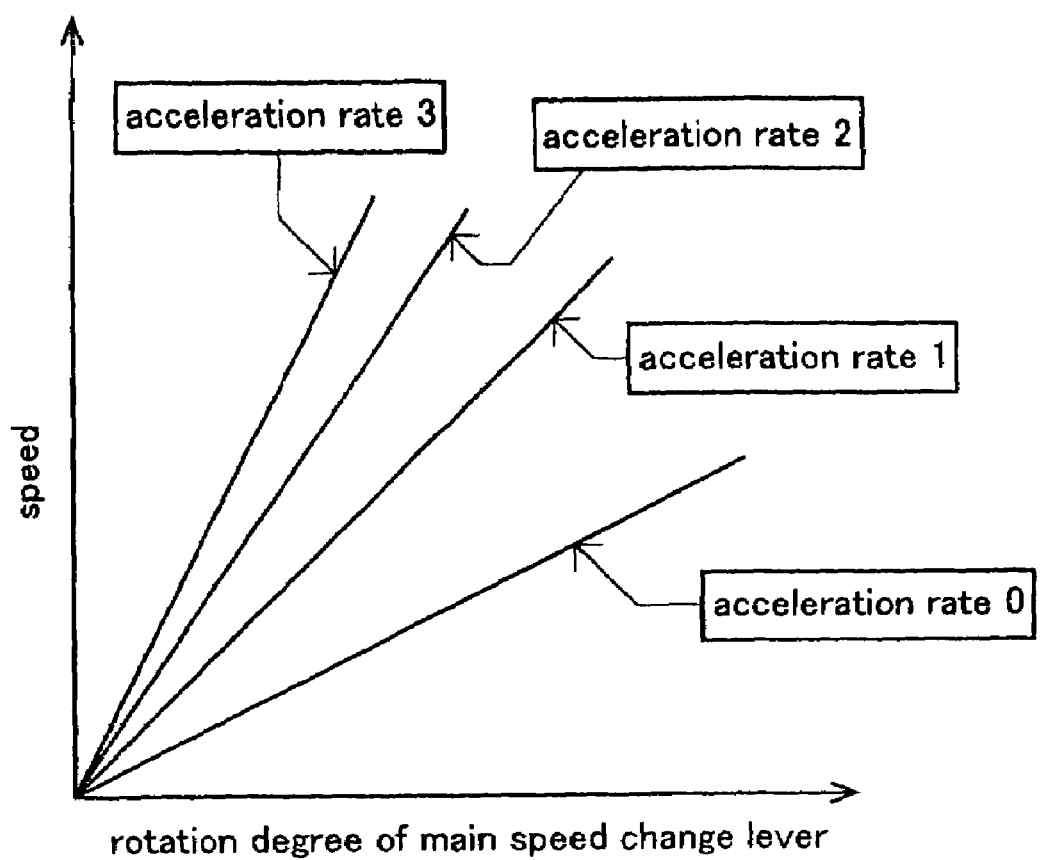

FIG. 60 is a correlation diagram of the vehicle speed relative to the rotation degree of the main speed change lever 84 corresponding to setting of the speed setting switch against.

Figure 61:
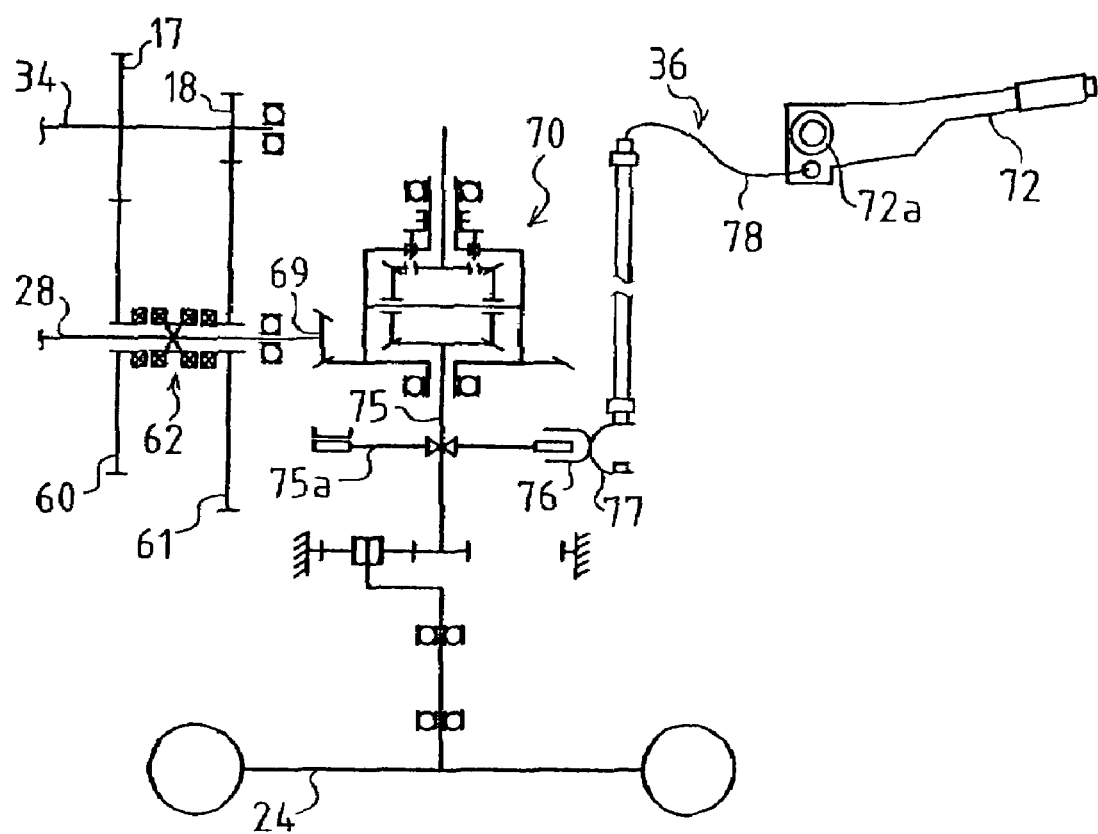
Figure 6:
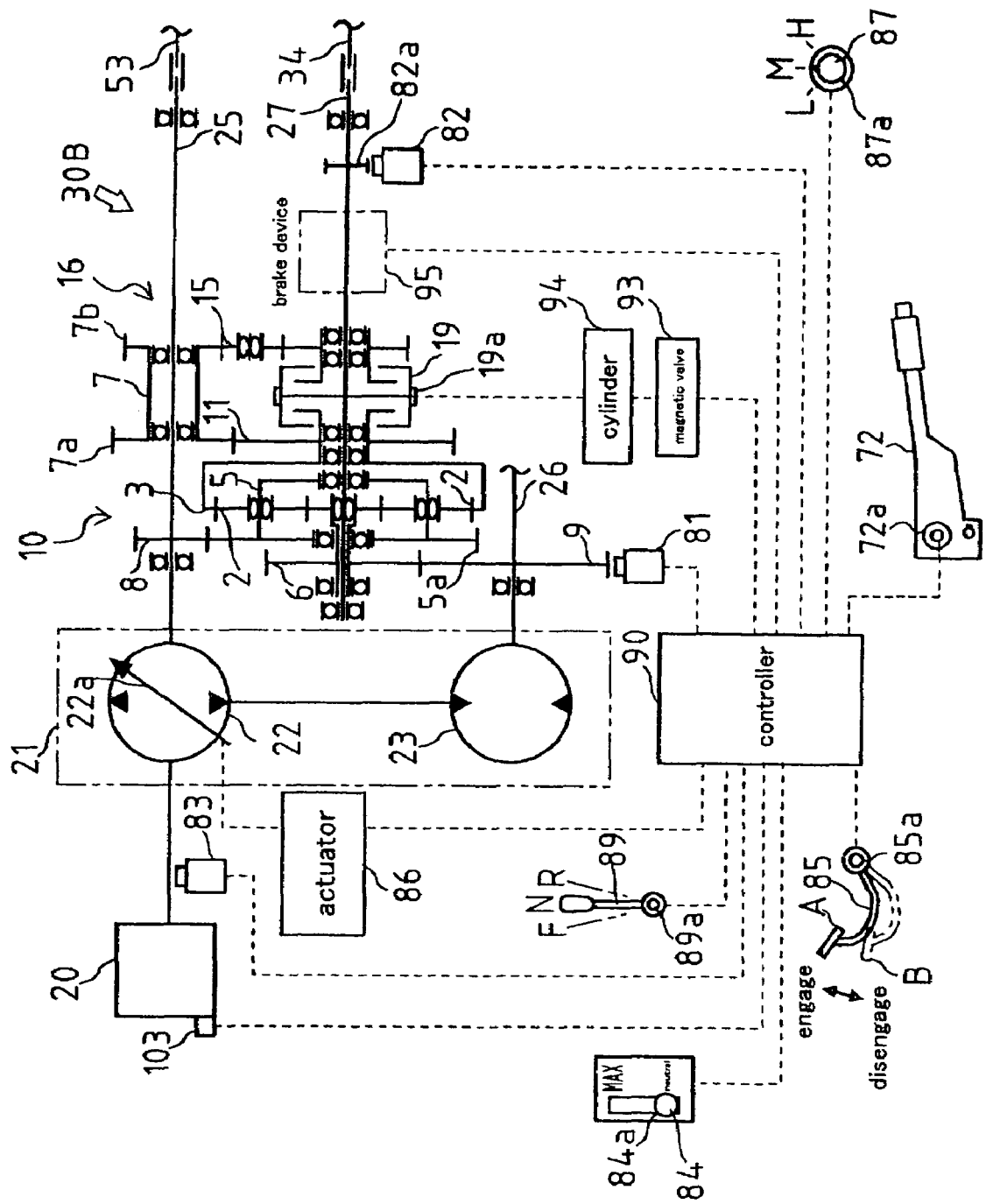

FIG. 61 is a skeleton drawing showing relation between a parking brake and a parking brake lever.

FIG. 62 is a block and skeleton drawing of the second transmission 102, showing a construction for controlling the HST swash plate in association with a parking brake mechanism.

Figure 63:
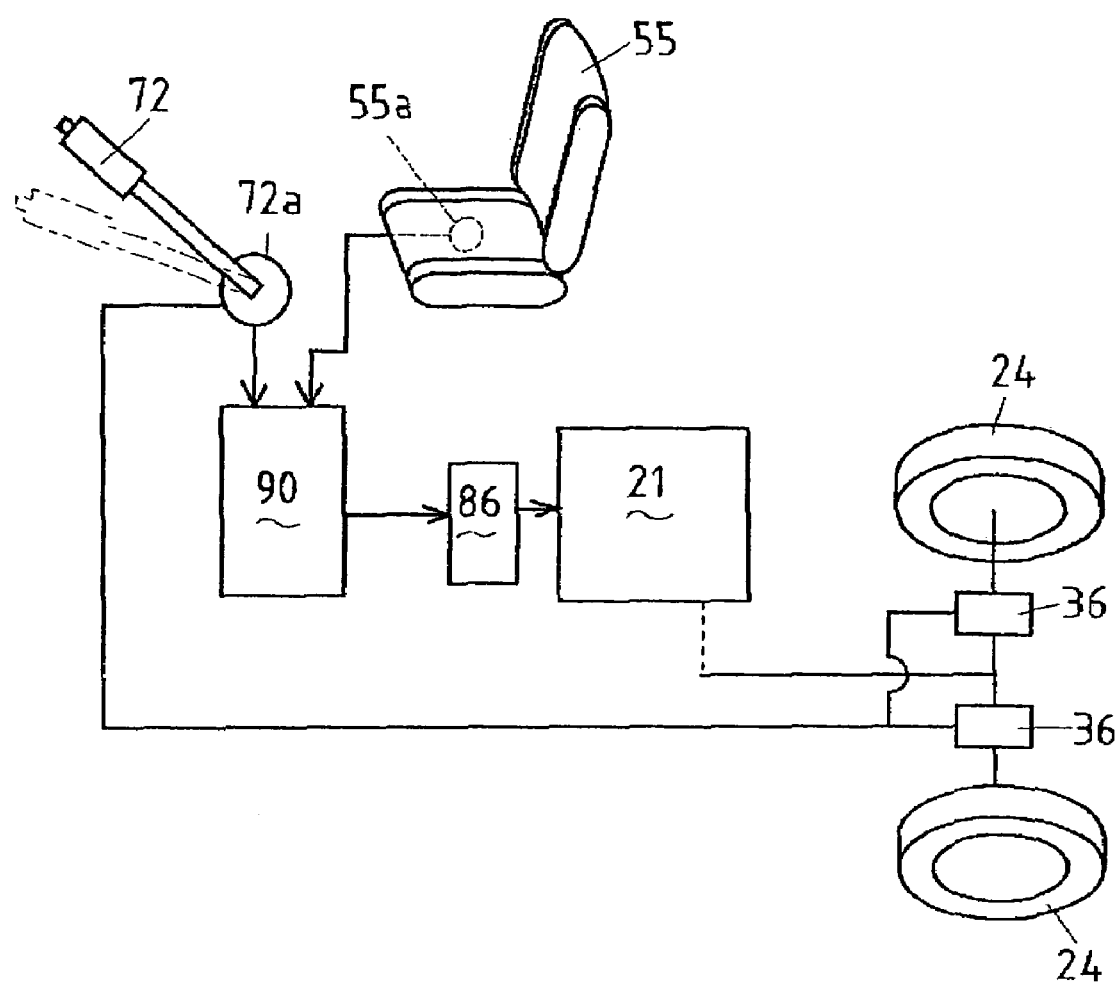

FIG. 63 is a schematic diagram of the parking brake mechanism of the vehicle.

Figure 64:
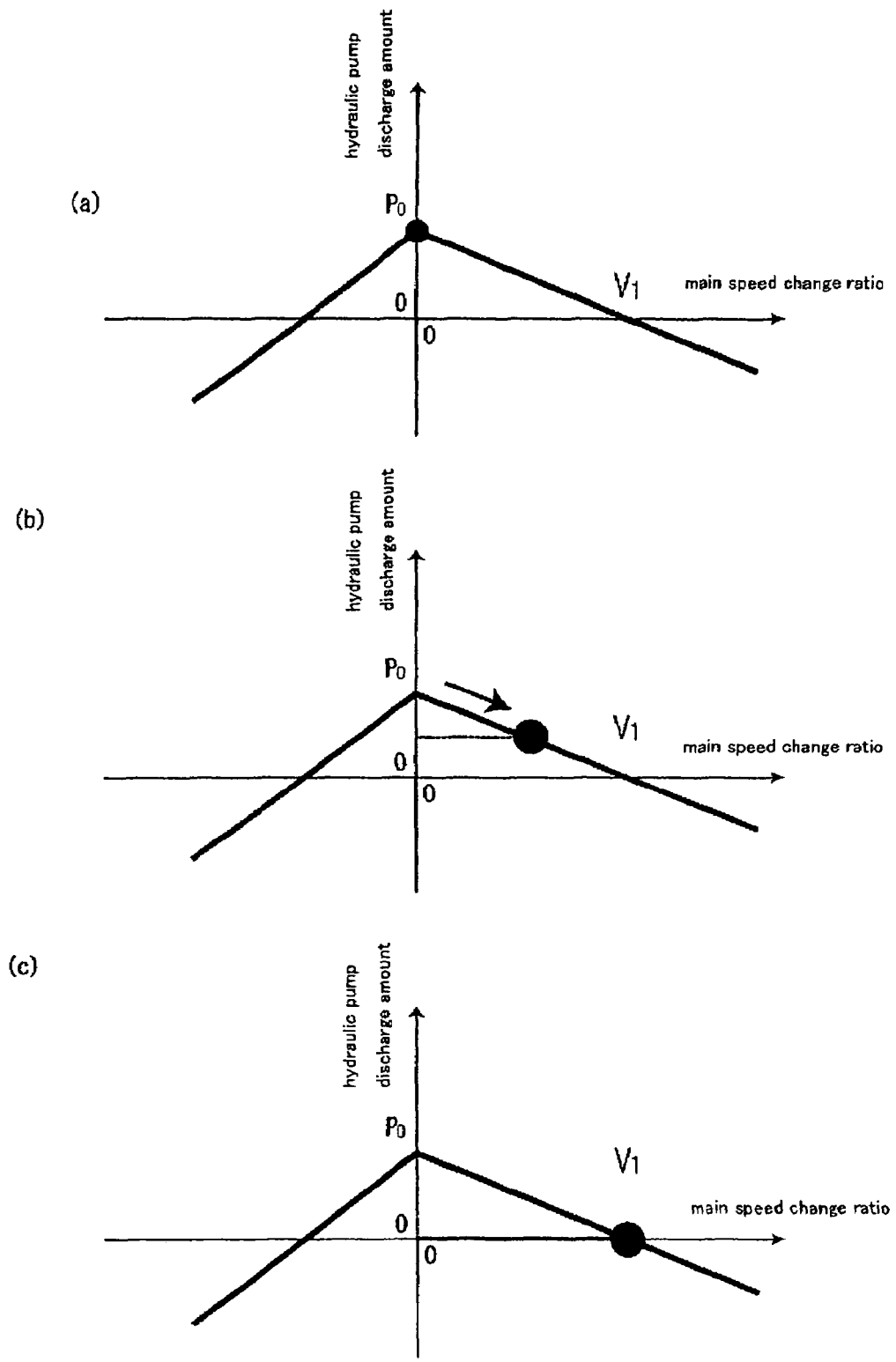

FIG. 64 is a correlation diagram of the HST pump discharge relative to the main speed change ratio, showing control of the HST swash plate when the parking brake is actuated.

Figure 65:
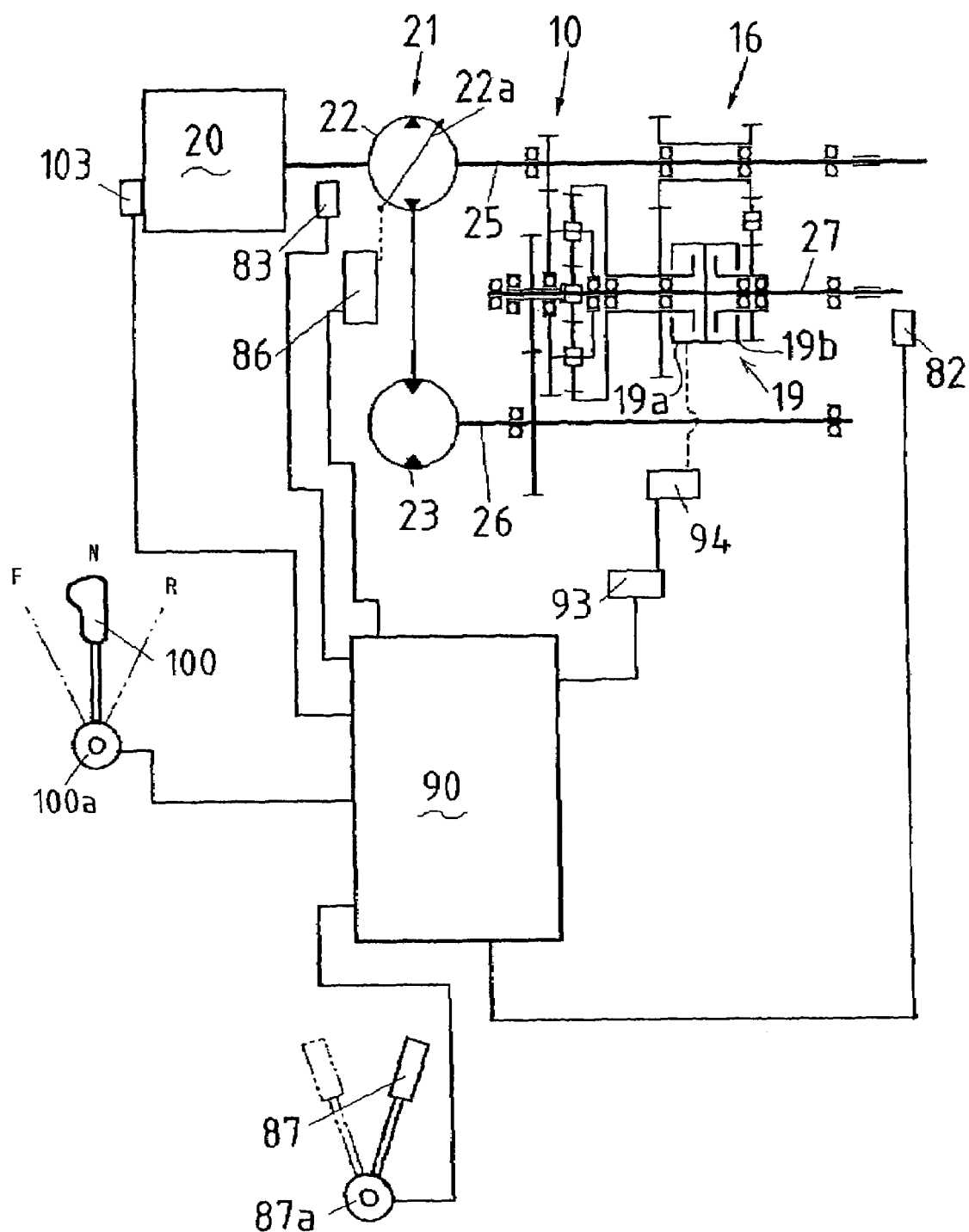

FIG. 65 is a block and skeleton diagram of the second transmission 102, showing a control construction of the transmission mechanism wherein a single lever 100 is provided for switching of forward/backward traveling and main speed changing operation.

Figure 66:
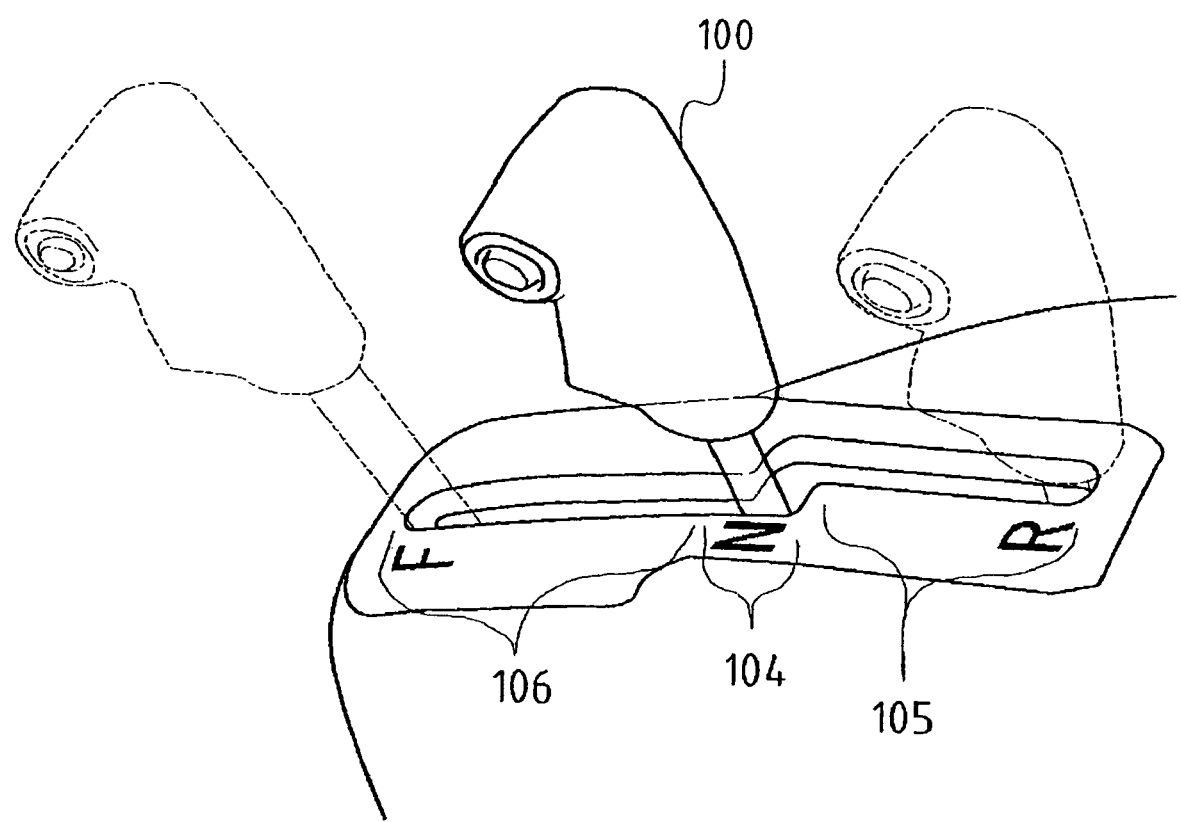

FIG. 66 is a perspective view of the lever 100 with a guide slot thereon.

BEST MODE FOR CARRYING OUT THE INVENTION

The invention will be described in detail according to attached drawings.

[1. Entire Construction of Vehicle]

Figure 1:
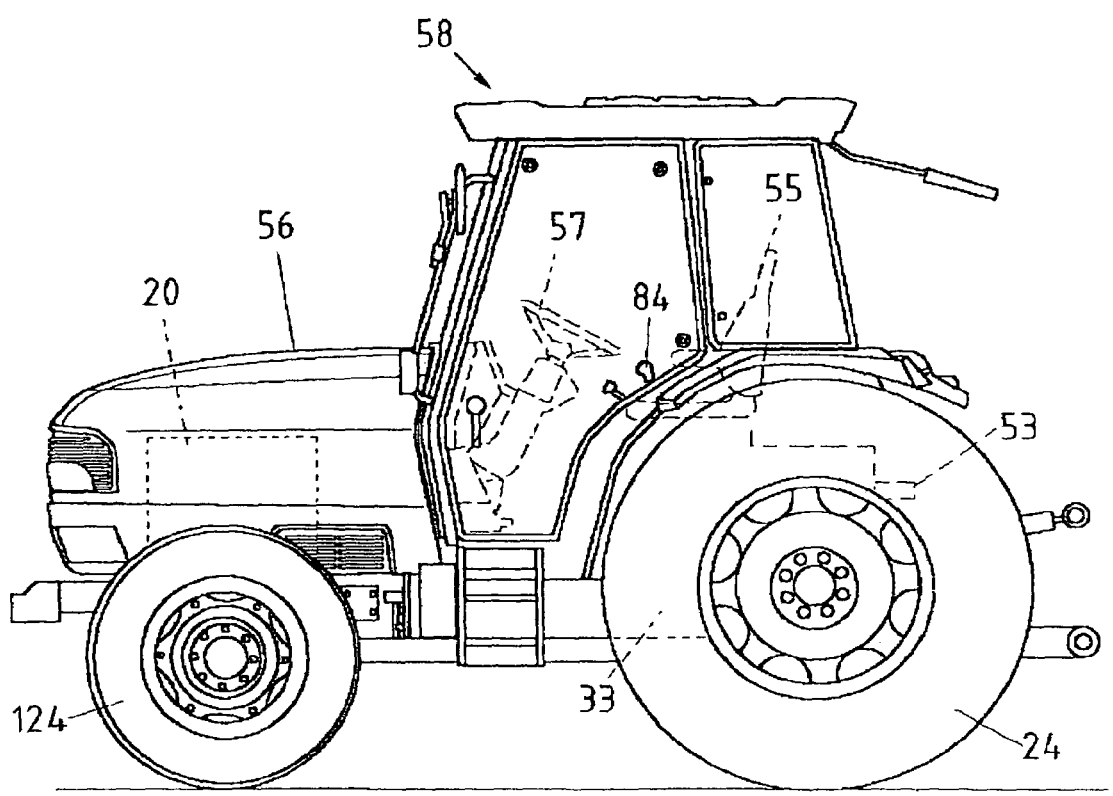
FIG. 1 is an entire side view of a tractor as a hydraulic drive vehicle according to the present invention.

Explanation will be given on an entire construction of a tractor as an embodiment of a vehicle equipped with an HST controlled by the present invention in accordance with FIG. 1 and others.

Front wheels 124 and rear wheels 24 are supported by front and rear end portions of the vehicle, respectively. An engine 20 is disposed in a bonnet 56 disposed at the front portion of the vehicle. A steering wheel 57 is provided behind the bonnet, and a seat 55 is disposed behind the steering wheel 57. A main speed change lever 84, a sub speed change switch 87, a lever for adjusting height of a working machine, and the like project from side portions of the seat 55. Pedals, such as a brake pedal, a main clutch pedal and a differential lock pedal, are disposed on a floor in lower front of the seat 55. The steering wheel 57, the seat 55, the levers and the pedals are disposed in a cabin 58.

As shown in FIG. 3, a flywheel housing is disposed on a rear portion of the engine 20, and a transmission casing 33 is disposed continuously backward from the flywheel housing. While the transmission casing 33 has a front portion 33a, and a middle portion 33b and a rear portion 33c, as shown in FIGS. 3 to 5, an HST 21 is contained in the front portion 33a, and a mechanical transmission 30 is contained between the middle portion 33b and the rear portion 33c. The HST 21 and the mechanical transmission 30 are combined so as to constitute a transmission mechanism comprising an HMT traveling drive system and a PTO drive system.

Drive axles are pivotally supported at right and left sides of the rear portion 33c of the transmission casing, and the rear wheels 24 are attached to outer ends of the axles. A traveling differential 70, which connects the right and left drive axles differentially, is contained in the rear portion 33c of the transmission casing. The HMT transfers power of the engine 20 to the rear wheels 24 through the differential 70. Under a four-wheel drive mode, the HMT also transfers power to the front wheels 21 simultaneously.

Power of the engine 20 is also transferred via the PTO drive system to a PTO shaft 53 projecting from a rear end of the transmission casing 33. Power of the PTO shaft 53 is transferred via universal joints (not shown) and the like to the working machine vertically movably connected to the rear end of the vehicle.

[2. Construction and Drive Control of First Transmission (Drive Mode Switching Type)]

A transmission constructed by combining the HST 20 with the mechanical transmission 30 is disposed in the transmission casing 33. The transmission comprises the traveling drive system for driving the rear wheels 24 (and the front wheels 124) and the PTO drive system for driving the PTO shaft 53.

The present application describes two types of transmissions, i.e., a first transmission 101 which can set either a HMT mode or a HST mode as a drive mode, and a second transmission 102 whose drive mode is only the HMT mode. The second transmission 102 has a reverser 19 provided in the mechanical transmission 30 so as to switch the traveling direction between forward and backward instead of output control of the HST. Hereinafter, a construction of the first transmission 101 and control of HST speed change ratio etc. of the first transmission 101 will be described, and then, a construction and control of the second transmission 102 will be described.

<2-1. Construction of First Transmission 101>

(2-1-1. Construction of HST 20)

Figure 2:
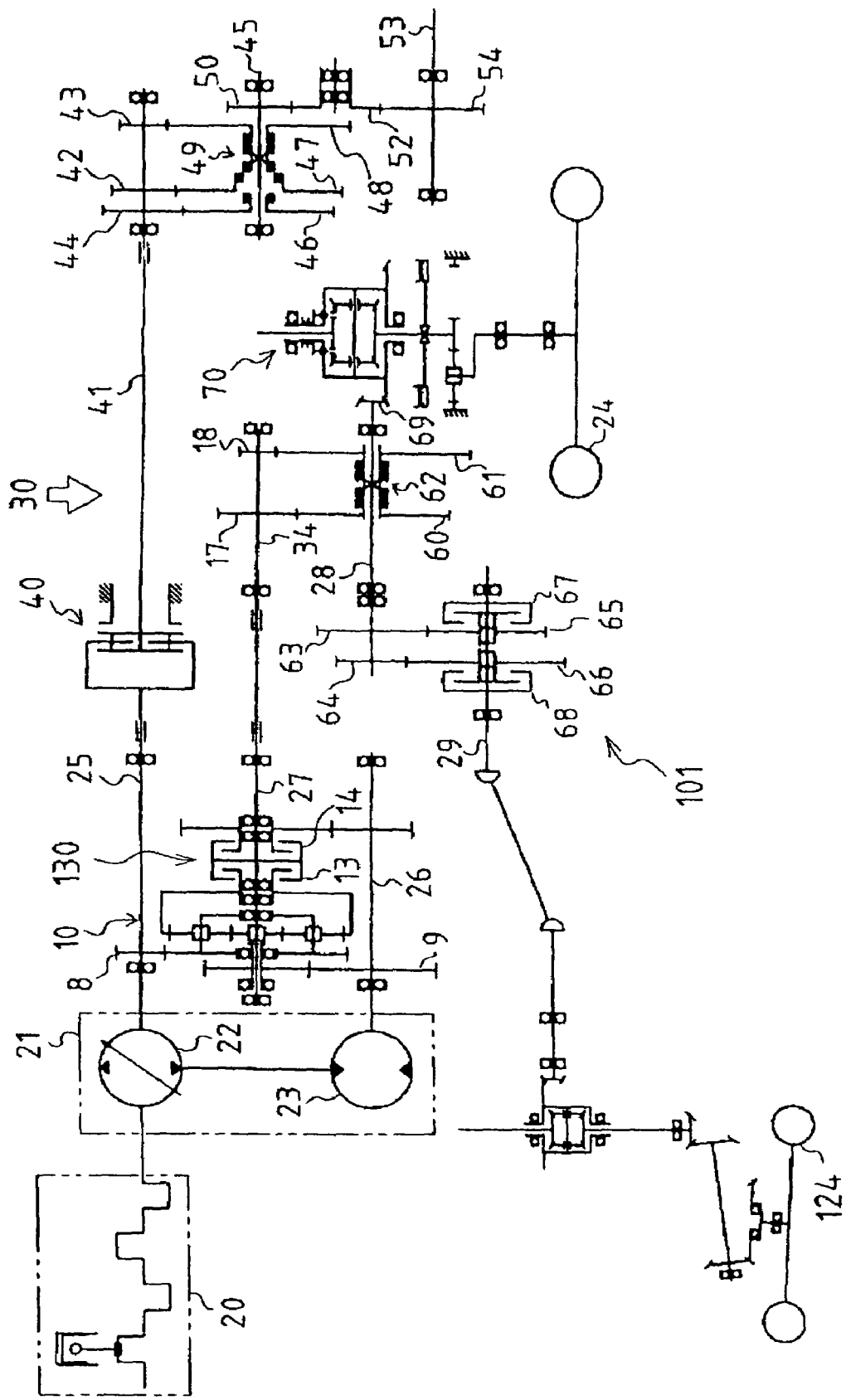
FIG. 2 is a diagram of a hydro-mechanical first transmission 101 whose drive mode can be changed between a HMT mode and a HST mode.

Explanation will be given on the HST 20 according to FIGS. 2 and 3.

A vertical plate-like center section 32 is fixed in the front portion 33a of the transmission casing formed as an HST container. A hydraulic pump 22 and a hydraulic motor 23 are attached to upper and lower front surfaces of the center section 32, and are connected mutually fluidly through an oil passage formed in the center section 32. An HST housing 31 encloses the pump 22 and the motor 23. The HST 21 constructed as the above is contained in the front portion 33a of the transmission casing.

In the HST 21, a pump shaft 25 penetrates the hydraulic pump 22 so as to serve as the rotation axis thereof. The pump shaft 25 transfers power of the engine 20 to the hydraulic pump 22, that is, functions as an input shaft of the HST. The power of the pump shaft 25 is transferred to a HMT differential mechanism 10 and to the PTO shaft 53 through the PTO drive system.

The pump shaft 25 not-relatively rotatably engages with a cylinder block 22b of the hydraulic pump 22. Plungers 22c are slidably disposed around the pump shaft 22 in the cylinder block 22b in parallel to the pump shaft 22. Heads of all of the plungers 22c abut against a movable swash plate 22a. The movable swash plate 22a is pivotally supported so that the slant angle of the movable swash plate 22a can be adjusted to change the capacity of the hydraulic pump 22.

Hereinafter, the slant angle of the movable swash plate 22a is referred to as "HST swash plate angle".

Pressure oil discharged from the hydraulic pump 22 is supplied to the hydraulic motor 23 (of the fixed displacement type, in this embodiment) through the oil passage formed in the center section 32. The HST swash plate angle is controlled so as to control the speed and direction of this oil supply, thereby controlling the rotational speed and direction of a motor shaft 26 serving as an output shaft of the hydraulic motor 23.

Hereinafter, the rotational speed and direction of the motor shaft 23 are referred to as "HST rotation speed" in this specification. As mentioned above, a ratio of the HST rotation speed to the engine rotation speed, that is, an output/input rotation speed ratio of the HST (rotation speed ratio of the motor shaft 26 to the pump shaft 25) is referred to as "HST speed change ratio".

In this embodiment, the HST 21 has the variable displacement type hydraulic pump 22 and the fixed displacement type hydraulic motor 23. However, the HST 21 is applicable in the following description of the present invention even if it has the pump 22 and motor 23 both of which are variable in displacement.

(2-1-2. Construction of Mechanical Transmission 30)

Explanation will be given on the construction of the mechanical transmission 30 according to FIGS. 2 to 6.

The pump shaft 25 and the motor shaft 26 are rotatably supported by the middle portion 33b of the transmission casing. A main transmission output shaft 27 is rotatably supported in parallel with the shafts 25 and 26. The HMT differential mechanism (in this embodiment, a planetary gear mechanism) 10 is disposed around the shaft 27. Torques of the shafts 25 and 26 are inputted to the differential mechanism 10, and resultant of the torques is outputted to the shaft 27.

As shown in FIG. 5, a sub transmission drive shaft 34 is extended from the main transmission output shaft 27 and pivotally supported by the rear portion 33c of the transmission casing. A later-discussed sub transmission mechanism is constructed between the shaft 34 and a sub transmission driven shaft 28. The sub transmission driven shaft 28 is drivingly connected to the rear wheel differential 70 differentially connecting the right and left rear wheels 24 to each other. The shaft 28 is also drivingly connected to a front wheel drive shaft 29 for transferring power to the front wheels 124. The traveling drive system is constructed in this way.

On the other hand, as shown in FIG. 5, the pump shaft 25 is extended further backward so as to serve as a PTO drive shaft 41, which is pivotally supported by the rear portion 33c of the transmission casing. The shaft 41 and a PTO counter shaft 45 are pivotally arranged in parallel so as to constitute the PTO drive system.

Explanation will be given on the transmission mechanism constructed in the traveling drive system for transferring power of the engine 20 to the rear wheels 24 (and the front wheels 124).

As shown in FIG. 4, in the middle portion 33b of the transmission casing, the planetary gear mechanism serving as the HMT differential mechanism 10 is disposed around a front portion of the main speed change output shaft 27, and a hydraulic main transmission clutch 130 is disposed around a rear portion of the shaft 27.

Explanation will be given on the HMT differential mechanism 10 according to FIGS. 4 and 6.

A sun gear 1, a carrier 5, and a ring gear 3 are concentrically disposed around the shaft 27, wherein the carrier 5 is disposed around the sun gear 1, and the ring gear 3 around the carrier 5a, and the gears 1, 5 and 3 are individually rotatable relative to the shaft 27. The ring gear 3 has an internal gear. Planetary gears 2 pivotally supported by the carrier 5 engage with the ring gear 3 and the sun gear 1.

An input gear 6 fixed around a front portion of the sun gear 1 engages with an output gear 9 fixed around the motor shaft 26, whereby the sun gear 1 transfers rotation of the motor shaft 26 to the planetary gears 2. On the other hand, an input gear 5a fixed on the carrier 5 engages with an output gear 8 fixed around the pump shaft 25, whereby the carrier 5 transfers rotation of the pump shaft 25 to the planetary gears 2.

Accordingly, planetary gears 2 revolve around the shaft 27 with the carrier 5 by the rotation of the pump shaft 25, and rotate by the rotation of the motor shaft 26 and the sun gear 1. The revolution and rotation of the planetary gears 2 are transferred to the ring gear 3. The resultant rotation of the ring gear 3 (the result of the rotation speed difference between the pump shaft 25 and the motor shaft 26) is transferred to the shaft 27 through the main transmission clutch 130 (via a later-discussed clutch 13, exactly).

Explanation will be given on the main transmission clutch 130 according to FIGS. 4 and 6.

A cylinder 14 is fixed around the shaft 27. An inside of the cylinder 14 is divided into a front chamber opening forward and a rear chamber opening backward by a partition disposed in a longitudinal middle portion thereof. A clutch gear 3a extended backward from the ring gear 3 is inserted into the front chamber, thereby constructing a multi-print wet clutch serving as the HMT output drive clutch 13 between the cylinder 14 and the gear 3a. When the clutch 13 is engaged, the rotation of the ring gear 3 caused by the rotation difference between the pump shaft 25 and the motor shaft 26, that is, the rotation difference between input and output of the HST 21 is transferred to the shaft 27.

A clutch gear 12 is disposed rotatably around the shaft 27 just behind the cylinder 14. The gear 12 engages with an output gear 15 fixed around the motor shaft 26. A front portion of the gear 12 is inserted into the rear chamber of the cylinder 14, thereby constructing the multi-print wet type HMT output drive clutch 14 between the gear 12 and the cylinder 14. When the clutch 14 is engaged, rotation of the motor shaft 26, that is, output of the HST 21 is transferred to the shaft 27 without interposition of the differential mechanism 10.

Either the clutch 13 or 14 is alternatively engaged. A drive mode of the traveling drive system of the first transmission 101 when the clutch 13 is engaged and the clutch 14 is disengaged is referred to as an "HMT mode", and a drive mode thereof when the clutch 13 is disengaged and the clutch 14 is engaged is referred to as an "HST mode".

Power transfer to the shaft 27 can be cut off completely by disengaging both of the clutches 13 and 14. That is to say, the clutches 13 and 14 serve as a main clutch of the vehicle.

As shown in FIG. 6, a brake mechanism 95 is disposed on the main speed change output shaft 27.

Explanation will be given on the sub transmission mechanism constructed by the rear portion of the main speed change output shaft 27 in the rear portion 33c of the transmission casing according to FIG. 5.

The sub transmission drive shaft 34 is connected at its front end to the rear end of the shaft 27 via a coupling, and is fixedly provided on its rear portion with two drive gears 17 and 18. On the other hand, driven gears 60 and 61 are loosely fitted on the sub transmission driven shaft 28 pivoted in parallel to the shaft 34 so as to engage with the respective drive gears 17 and 18. The reduction ratio of the gears 17 and 60 is smaller than that of the gears 18 and 61. Therefore, the gears 17 and 60 constitute a high-speed gear train, and the gears 18 and 61 constitute a low-speed gear train.

A sub transmission clutch 62 is circularly disposed around the shaft 28 between the gears 60 and 61 so as to engage either the gear 60 or 61 with the shaft 28. The sub transmission clutch 62 may also disengage both of the gears 60 and 61 from the shaft 28.

A bevel gear 69 formed on a rear end of the sub transmission driven shaft 28 engages with an input gear of the rear wheel differential 70 disposed behind the shaft 28 so as to transfer the rotation of the shaft 28 to the rear wheels 24.

On the other hand, two drive gears 63 and 64 are fixed on a front end of the shaft 28, and engage with respective gears 65 and 66 loosely fitted on the front wheel drive shaft 29. The reduction ratio of the gears 64 and 66 is smaller than that of the gears 63 and 65. Accordingly, the speed of the front wheels 124 driven via the gears 64 and 66 is higher than that driven via the gears 63 and 65.

A hydraulic clutch 67 is interposed between the gear 65 and the shaft 29, and a hydraulic clutch 68 is interposed between the gear 66 and the shaft 29. By alternatively engaging one of the clutches 67 and 68, either the gear 65 or 66 engages with the shaft 29 so as to select either a normal four-wheel drive mode or a four-wheel drive mode with front-wheel acceleration. In addition, a two-wheel drive mode can be set by disengaging both clutches 67 and 68.

Generally, due to the above-mentioned traveling drive system according to the present invention, the main transmission clutch 130 is switched to select either the output power of the HST 21 or the rotation difference between input and output of the HST 21 so as to cause the output torque of the differential mechanism 10, which is transferred to the main transmission output shaft 27, and to the rear wheels 24 and the front wheels 124 via the sub transmission mechanism comprising the gears 17, 18, 60 and 61 and the like.

Next, explanation will be given on a transmission mechanism in the PTO drive system according to FIGS. 2 and 5.

In the rear portion 33c of the transmission casing, the rear end of the extended pump shaft 25 is connected via a PTO clutch 40 to the PTO transmission shaft 41 extended backward from the pump shaft 25. Three drive gears 42, 43 and 44 are fixed on a rear end of the shaft 41 and engage with respective driven gears 46, 47 and 48 loosely fitted on the PTO counter shaft 45, thereby constituting three gear trains having different gear ratios. Furthermore, a gear 50 fixed on the shaft 45 engages with a gear 54 fixed on the PTO shaft 53 via a gear 52.

A PTO speed change clutch 49 is provided on the shaft 45 so as to selectively engage one of the gears 46, 37 and 48 with the shaft 45.

Accordingly, in the PTO drive system, which transfers the rotation of the pump shaft 25 together with a flywheel of the engine 20 to the PTO shaft 53, the PTO clutch 40a can be disengaged to cut off the transferring of engine power to the PTO shaft 53. The PTO speed change clutch 49 is operated to select one of three driving speed stages of the PTO shaft 53.

<2-2. Construction of Electric Control System of First Transmission 101>

(2-2-1. Various Detection Means)

With regard to this embodiment, as shown in FIG. 6, a detector 81 is provided close to the gear 9 engaged on the motor shaft 26 so as to change the rotation of the motor shaft 26 into pulse signals, thereby detecting the rotation speed and direction of the motor shaft 26. Furthermore, a detector 82 is provided close to a dummy gear 82a fixed on the main transmission shaft 27 and detects the rotation speed and direction of the main transmission shaft 27.

A detector 83 is provided on a crankshaft of the engine 20 so as to detect engine rotation speed (equivalent to the rotation speed of the pump shaft 25).

An actual HST speed change ratio, that is, actual output/input rotation speed ratio of the HST 21 can be calculated from the detection result of the detector 81 detecting the output rotation speed of the HST 21 and the detector 83 detecting the input rotation speed of the HST 21.

The output/input rotation speed ratio of the main transmission between the pump shaft 25 and the main speed change shaft 27 can be calculated from the detection result of the detectors 82 and 83 whether the drive mode is the HMT mode or the HST mode. Hereinafter, this ratio is referred to as "speed change ratio of the main transmission" or simply "main speed change ratio".

In the HST mode, the main speed change ratio is proportional to the HST speed change ratio. Namely, if the HST speed change ratio is called R and the main speed change ratio is called MR, their correlation is expressed that MR=k1*R (k1 is a constant). In the HMT mode, the correlation is expressed that MR=k2*(1−k3*R) (k2 and k3 are constants). Accordingly, at the time of traveling forward, the larger the HST speed change ratio R is, the smaller the main speed change ratio MR is. In any case, the main speed change ratio MR can be found with the HST speed change ratio R as a variable.

Furthermore, as mentioned above, the main speed change lever 84 for controlling HST swash plate angle and the sub speed change switch 87 for controlling the sub speed change clutch (62 in FIG. 2) are provided adjacent to the driver's seat of the vehicle. A detector 84a is disposed at the pivotal supporting portion of the lever 84 or another portion so as to detect the operational position of the lever 84, and a detector 87a is provided to the switch 87 so as to detect the position of the switch 87 (the detector 84a and 87a are potentiometer, for example). In addition, the sub speed change switch 87 can be switched among three positions, i.e., a low-speed position L, a middle-speed position M and a high-speed position H.

A clutch pedal 85 for operating the clutches 13 and 14 is provided adjacent to the driver's seat of the vehicle. A potentiometer or the like serving as a rotation angle detector 85a is provided on a pivotal supporting portion of the clutch pedal 85 so as to detect its depression degree.

The above-mentioned detection means 81, 82, 83, 84a, 85a and 87a are constructed so as to transmit generated electric signals to a controller 90.

Furthermore, with regard to another embodiment of the first transmission 101 shown in FIG. 9, a mode switch 136 is provided for especially setting the HMT mode at the time of slow forward traveling of the vehicle when the HST mode is essentially automatically set.

When the vehicle set in the "HST mode" travels forward in low speed (for example, less than 1 km/h), the slant angle of the swash plate 22a of the HST 21 is too small for high-load works such as traction of the vehicle to stabilize the output rotation of the HST, i.e., the rotation of the shafts 26 and 27. The first transmission of FIG. 9 can be set in the HMT mode by engaging the HMT clutch even if the speed of the vehicle corresponds to the HST mode.

Referring to FIG. 9, the switch 136 is a button switch disposed on the main speed change lever 84. Alternatively, it may be provided on a panel adjacent to the driver's seat of the vehicle, for example.

The switch 136 is electrically connected with the controller 90 so as to output an electric signal to the controller 90 when the switch 136 is turned "on". When the switch 136 is depressed and the main speed change lever 84 is positioned in a range of slow forward traveling, the switch 136 is turned "on" so as to establish a "low speed forward traveling HMT mode".

(2-2-2. Electric Control Construction of HST Speed Change Ratio)

An HST swash plate actuator 86 is provided to control the slant angle of the movable swash plate 22a of the hydraulic pump 22 of the HST 21, as shown in FIGS. 6 and 7. The actuator 86 mainly comprises two hydraulic servo cylinders 86b connected to both opposite slant sides of the movable swash plate 22a through links, and a control valve 86a for controlling pressure oil to the servo cylinders 86b.

The control valve 86a is an electromagnetic valve electrically connected to the controller 90. The control valve 86a controls the amount of pressure oil supplied to the servo cylinders 86b corresponding to current value issued from the controller 90 so as to telescope the servo cylinders 86b, thereby changing the slant angle of the movable swash plate 22a, i.e., the HST swash plate angle. According to the change of the swash plate angle, the rotation of the motor shaft 26, i.e., the direction and speed of output rotation of the HST 21 is changed.

As mentioned above, the HST speed change ratio corresponds to the output/input rotation speed ratio of the HST 21, and is controlled by controlling the HST swash plate angle.

The controller 90 controls the slant angle of the movable swash plate 22a of the hydraulic pump 22 via the HST swash plate actuator 86 based on a detection value of the detection mean 84a corresponding to a position of the main speed change lever 84 so as to make the vehicle speed agree with the speed set by the main speed change lever 84. Furthermore, the controller 90 gets feedback based on the detection value of the detection mean 82 so as to control the HST swash plate angle. This feedback control will be discussed later.

(2-2-3. Electric Control Construction of Main Speed Change Clutch)

A control system for switching a main drive mode, that is, for switching the clutches 13 and 14 of the main speed change clutch 130 will now be described according to FIG. 6.

As shown in FIG. 6, electromagnetic valves 91 and 92 which can supply and discharge pressure oil are connected to the respective clutches 13 and 14, and the controller 90 is electrically connected to the electromagnetic valves 91 and 92. The controller 90 excites one of the electromagnetic valves 91 and 92, and unexcites the other so as to establish each mode.

While the vehicle travels backward or at low speed forward, the clutch 13 is disengaged and the clutch 14 is engaged, thereby setting the "HST" mode so as to drive the rear wheels 24 (and the front wheel 124) by the output of the HST 21.

On the other hand, when the vehicle travels forward at middle or high speed, the clutch 13 is engaged and the clutch 14 is disengaged so that the "HMT" mode is established so as to transfer the rotation of the pump shaft 25 (input rotation of the HST 21) to the main transmission shaft 27, whereby the engine rotation is efficiently transferred to the rear wheels 24 (and the front wheels 124).

The actual HST speed change ratio realized as mentioned above by the actuator 86a based on the detection value of the detector 84a is calculated by the controller 90 based on detection values of the detectors 81, 82 and 83 and the like. When the calculated HST speed change ratio becomes a fixed value, the controller 90 unexcites the excited electromagnetic valve 91 or 92, and excites the other unexcited valve 92 or 91, thereby exchanging engagement and disengagement between the clutches 13 and 14. In this way, which mode is set between the HST mode and the HMT mode depends on the value of the HST speed change ratio.

Furthermore, the controller 90 inspects a detection value of the detector 85a, and if the clutch pedal 85 is depressed so that the detection value exceeds a predetermined threshold, the controller 90 controls the electromagnetic valves 91 and 92 so as to disengage both of the clutches 13 and 14 (namely, establish the state of main clutch off).

(2-2-4. Relation of HST Speed Change Ratio Control and Main Speed Change Clutch Control)

FIG. 8 shows the relation of the vehicle speed V to the actual HST speed change ratio R detected by the detectors 81, 82 and 83 or another in the above-mentioned way. One rotation direction of the motor shaft 26 is referred to as a forward rotation direction, and a value of the HST speed change ratio R when the motor shaft 26 rotates in this direction is set to be positive. On the other hand, the other rotation direction of the motor shaft 26 is referred to as a backward rotation direction, and a value of the HST speed change ratio R when the motor shaft 26 rotates in the backward direction is set to be negative. The vehicle speed at the time of forward traveling is set to positive, and the vehicle speed at the time of backward traveling is set to negative.

As shown in the graph, the "HST mode" is established when the vehicle travels backward in the whole speed range or forward in the low speed range (V≦V1). In this mode, only the rotation of the motor shaft 26 is transferred to the main transmission shaft 27. Therefore, when the HST speed change ratio R is 0, that is, when the motor shaft 26 is stationary, the shaft 27 is not driven, whereby the vehicle is stationary. When the motor shaft 26 is rotated forward, the vehicle travels forward, and when the motor shaft 26 is rotated backward, the vehicle travels backward.

The vehicle speed is proportional to the rotation speed of the motor shaft 26. Accordingly, the requirement for increasing the forward traveling vehicle speed in the "HST mode" is to increase the HST speed change ratio R.

On the other hand, the drive mode is put into the "HMT mode" when the vehicle travels forward in the middle or high speed range (V>V1). In this mode, the differential mechanism 10 combines the rotation power of the motor shaft 26 with the rotation power of the pump shaft 25, and outputs the resultant power to the shaft 27. Therefore, the requirement for increasing the forward traveling vehicle speed in the "HMT mode" is to decrease the actual HST speed change ratio R contrary to the above-mentioned "HST mode".

It is now assumed that the forward traveling vehicle is accelerated. The "HST mode" is set so that the HST speed change ratio R (>0) is increased until the HST speed change ratio R reaches a predetermined speed change ratio R1 for switching drive mode. The HST swash plate angle is increased in the forward rotation range. When the HST speed change ratio R reaches the speed change ratio R1 for switching drive mode, the clutches 13 and 14 of the main speed change clutch 130 are switched so as to establish the "HMT mode". For increasing the forward traveling vehicle speed from this point, the HST speed change ratio R is decreased. Namely, the HST swash plate angle is decreased in the forward rotation range and increased after shifting to the backward rotation range.

FIG. 10 is a correlation diagram of the HST speed change ratio R relative to the vehicle speed V with regard to the transmission 101 provided with the mode switch 136 as shown in FIG. 9 and enabled to travel forward in low speed in the HMT mode. In a low speed range of the forward traveling vehicle ($0 \leq V \leq V1$), the HST speed change ratio R in the HMT mode is larger than that in the HST mode. Accordingly, though the vehicle speed is low (the main speed change ratio is low), the HST speed change ratio is set large so that the output rotation of the HST 21 becomes faster and stable, thereby stabilizing traction work and the like.

Incidentally, if the switch 136 is turned on in the HST mode, the vehicle speed may be changed suddenly by the shift of the clutches 13 and 14. For example, when the HST speed change ratio R is 0, that is, the HST 21 is in neutral, the vehicle speed V in the HST mode is 0. However, at the moment of setting the HMT mode, the vehicle speed V is suddenly increased to Vm.

To avoid such the situation, the switch 136 is set to be turned on in the HMT mode when the vehicle speed V is larger than the speed V1 for switching drive mode. Alternatively, to prevent the vehicle speed V from changing when the switch 136 is turned on in the HST mode, when the switch 136 is turned on, the clutches 13 and 14 are disengaged so as to disengage the main clutch firstly, and the HST speed change ratio R is increased by controlling the swash plate angle so as to increase the vehicle speed in the HST mode to the level equal to a vehicle speed assumed to be realized if setting the HMT mode. For example, When the vehicle speed is 0 and the switch 136 is turned on, the clutches 13 and 14 are disengaged corresponding to the switching and the movable swash plate 21a is slanted so as to increase the HST speed change ratio R to its maximum, and then, the HMT clutch 13 is engaged. Accordingly, the vehicle speed is kept in zero after switching from the HST mode to the HMT mode.

<2-3. Control Flow of Main Speed Change Clutch and HST Swash Plate Angle>

A flow of processes by the controller 90 for controlling the main transmission 101 will now be described.

FIG. 11 shows a main flow of the HST swash plate angle control and the drive mode (main speed change clutch) switching control accompanying with the main speed change ratio control.

When a main speed change control loop is started, the present main speed change ratio of the transmission is calculated based on detection values of the rotation speed detectors 82 and 83 (S400). The present drive mode is judged whether it is the "HST mode" or the "HMT mode" (S401). If the mode is the "HST mode", a main speed change ratio when a time$\Delta T_{HMTon}$ is passed after calculating the main speed change ratio is estimated, and the estimated main speed change ratio is judged whether it is larger than a preset value (a speed change ratio $R_C$ for switching drive mode) or not (S402). If the estimated value is not larger than the value, a later-discussed HST swash plate angle control block is executed (S403), and the slant angle of the movable swash plate 22a is changed corresponding to the operation position of the main speed change lever 84. If the estimated value is larger than the value, a later-discussed drive mode switch block is executed so as to set the "HMT mode" (S404).

If the actual drive mode is the "HMT mode", a main speed change ratio after a time $\Delta T_{HSTon}$ after calculating the main speed change ratio is estimated, and the estimated main speed change ratio is judged whether it is smaller than the preset value (the speed change ratio $R_C$ for switching drive mode) or not (S405). If the estimated value is not smaller than the value, the HST swash plate angle control block is executed (S403), and the slant angle of the movable swash plate 22a is changed corresponding to the operation position of the main speed change lever 84. If the estimated value is smaller than the value, the drive mode switch block is executed so as to set the "HST mode" (S406).

When the drive mode is set to either the HMT mode or the HST mode, the HST swash plate angle control block (S403) based on the operation of the main speed change lever 84 (the main speed change operation) is executed. Programs of this block are done in a loop shown in FIG. 12.

Referring to FIG. 12, the controller 90 inspects the operation position of the main speed change lever 84 via the detector 84a and judge whether the main speed change lever 84 is in its neutral position (exactly, within a range in the vicinity of the neutral position) or not (S621). If the lever 84 is not in the vicinity of the neutral position, a later-discussed speed control program is executed so as to control the HST swash plate angle corresponding to the operation position of the lever 84.

If the lever 84 is within the range in the vicinity of the neutral position, the controller 90 calculates the speed change ratio R from the detection values of the detectors 82 and 83 so as to judge whether the HST speed change ratio R is in a preset range in the vicinity of 0 (from –U to +U) or not (S622). Incidentally, this loop does not consider the HMT mode at the time of low speed forward traveling, and it is premised on that the drive mode must be the HST mode when the main speed change lever 84 is in its neutral position or in the vicinity thereof (namely, the vehicle speed is 0 or near 0). If the HST speed change ratio R is out of the range (from –U to +U), the speed control block is executed. If the HST speed change ratio R is within the setting range (from –U to +U), a later-discussed neutral control block is executed and the HST swash plate angle is controlled so as to stop the vehicle.

After executing the corresponding control block, the controller 90 is returned to S621, thereby repeating the same processes.

A block shown in FIG. 13 and a block shown in FIG. 16 are proposed as the speed control block used in this flow.

If the HST 21 is loaded or influenced by another reason, the essential swash plate angle corresponding to the main speed change lever 84 causes a volume efficiency which is insufficient to ensure the desired output rotation speed, i.e., the desired vehicle speed. To deal with such a situation, the speed control block shown in FIG. 13 is programmed so as to obtain the target vehicle speed by compensating the HST swash plate angle.

In the first speed control block shown in FIG. 13, a pulse from the detector 81 or 82 is inspected so as to judge whether the actual vehicle speed V is 0 or not (in fact, whether the actual vehicle speed V is within a preset range in the vicinity of 0 or not) (S601). If the actual vehicle speed V is out of the range, the rotation direction of the motor shaft 26 is inspected based on the signal from the detector 81 so as to judge the relation of the traveling direction of the vehicle to the position of the operated main speed change lever (referred to as an operation direction) (S605). If the relation thereof is inverse (for example, a case that the main speed change lever 84 is set to traveling backward range while the vehicle travels forward), an HST swash plate target value P is set to a value corresponding to the neutral position (P=0) regardless of the operation position of the main speed change lever 84 (S606). By this processing, even if an operator operates the main speed change lever 84 to reverse over the neutral position suddenly, sudden speed change shock is suppressed. This process will be detailed later.

On the other hand, if it is judged at the conditional branch S601 that the actual vehicle speed is within the above-mentioned range in the vicinity of 0, or if it is judged at the conditional branch S605 that the traveling direction of the vehicle is in agreement with the operation direction of the main speed change lever 84, the controller 90 inspects the state of the sub speed change switch 87 via the detector 87a, and determines a response characterization factor k corresponding to the inspected operation state (S602). The response characterization factor k is lowered when the low speed stage is set in sub speed change. In this embodiment, k is set to be 0.3 when the sub speed change switch 87 is in the "low speed position" L, and to be 1 when the sub speed change switch 87 is in the "middle speed position" M or the "high speed position" H.

Next, the controller 90 inspects the operation position of the main speed change lever 84 (S603). The value of the inspected operation position of the main speed change lever 84 is substituted for the variable R. The variable R becomes positive when the main speed change lever 84 is operated in the forward traveling side, and becomes negative when the lever 84 is operated in the backward traveling side. When the main speed change lever 84 is set in the neutral position, the variable R is 0. The farther the operation position of the main speed change lever 84 is from the neutral position, the farther the variable R becomes from 0.

Next, the controller 90 determines a target angle of the movable swash plate 22a (the HST swash plate control target value P) based on a product of the value R indicating the operation position of the main speed change lever 84 multiplied by the response characterization factor k (S604). A function or map expressing the relation between the values P and R is preset in the controller 90 so as to be used for determining the value P.

By this processing, the response characterization of the HST speed change ratio against the operation value of the main speed change lever 84 can be switched based on the sub speed change switch 87 as mentioned above.

The HST swash plate control target value P computed in this way is expressed numerically. The value P is positive when the movable swash plate 22a is slanted so as to rotate the motor output shaft 26 forward, and it is negative when the movable swash plate 22a is slanted so as to rotate the shaft 26 backward. The value P is 0 when the movable swash plate 22a is set in its neutral position. The larger the target slant angle of the movable swash plate 22a is, the farther the value P becomes from 0.

Corresponding to that the value R is 0 when setting the main speed change lever 84 in its neutral position, the HST swash plate control target value P is 0.

After determining the HST swash plate control target value P in the above-mentioned flow, the controller 90 commands the HST swash plate angle actuator 86 based on the target value P (S607).

In this way, the HST swash plate angle actuator 86 actuates corresponding to the determined target value P, and then, the controller 90 reads a value of the detector 82, that is, an actual rotation speed M of the main speed change output shaft 27 is detected and its difference from a target rotation speed $M_P$ of the shaft 27 corresponding to the HST swash plate control target value P is measured. A found difference $\Delta M$ between the target rotation speed $M_P$ and the actual rotation speed M ($\Delta M = M_P - M$) is evaluated (S608) on the assumption that it is caused by the load applied onto the HST.

A function or map expressing the relation of the target rotation speed $M_P$ to the HST swash plate control target value P is preset in the controller 90 so as to be used for determining the target rotation speed $M_P$ corresponding to the target value P.

When the difference $\Delta M$ is 0, the HST swash plate angle actuator 86 is not controlled for compensation, whereby HST swash plate angle is kept contact. At this time, a memory memorizes the command value to the actuator 86 (S609), and the processing of this block is concluded.

In this embodiment, when it is said that "the difference $\Delta M$ is 0", the difference $\Delta M$ is not 0 strictly. When the difference $\Delta M$ is in an error allowance range from 0 (between $-M_\alpha$ to $+M_\alpha$), the difference $\Delta M$ is considered as 0. The error allowance range for the difference $\Delta M$ (between $-M_\alpha$ to $+M_\alpha$) is preset in the controller 90. The error limit $M\alpha$ is a value close to 0, and is preset corresponding to each HST.

When the difference $\Delta M$ is not 0 (strictly, out of the error allowance range between $-M_\alpha$ to $+M_\alpha$), the actual rotation speed M differs from the target rotation speed $M_P$. Therefore, the actuator 86 must be controlled to compensate the HST swash plate control target value P.

Thus, a compensatory value $\Delta r$ of the HST swash plate control corresponding to the difference $\Delta M$ is added to the HST swash plate control target value P so as to find a true HST swash plate control target value $P_S$ (S610). A function or map expressing relation of the compensatory value $\Delta r$ to the HST swash plate control target value P is preset in the controller 90 to be used for determining the true HST swash plate control target value $P_S$.

Then, a command value based on the newly determined true HST swash plate control target value $P_S$ is issued from the controller 90 to the actuator 86 (S611).

This compensational flow is repeated to obtain the target vehicle speed while the difference $\Delta M$ approaches 0 so that the actual rotation speed M becomes more close to the target rotation speed $M_P$. When the difference $\Delta M$ becomes 0, the memory memorizes the command value to the HST swash plate angle actuator 86 (S609), and the processing of this block is concluded.

In this way, by compensating the HST swash plate control target value P, the vehicle speed corresponding to the operation degree of the main speed change lever 84 can be conserved in consideration of oil temperature rise and change of the HST volume efficiency.

The compensatory value Δr is changed corresponding to the value of the load applied on the HST 21. Namely, the load applied on the HST 21 can be detected by detecting the compensatory value Δr. The controller 90 warns an operator of the abnormalities of the HST 21 requiring maintenance when the compensatory value Δr exceeds a predetermined value.

Alternatively, the load applied onto the HST 21 may be detected by finding a difference between a command value (current value) to the HST swash plate angle actuator 86 based on the HST swash plate control target value P and a command value (current value) to the HST swash plate angle actuator 86 based on the target HST swash plate control target value $P_S$.

When the actual HST speed change ratio differs from its value corresponding to the set position of the main speed change lever 84, the load on the HST 21 is assumed as the reason of the difference. To cancel the difference, the HST swash plate angle, i.e., the HST speed change ratio intermittently receives feedback to be controlled.

A control block shown in FIG. 13 is a flow for compensating the rotation speed M of the main speed change output shaft 27. However, whether the drive mode is the HST mode or the HMT mode, only the problem is large load on the HST 21 causing the rotation speed of the HST motor 23 to be smaller than the target value corresponding to the target value P of swash plate angle. A lower graph in FIG. 14 shows the swash plate angle of the movable swash plate 22a of the hydraulic pump 22 relative to the rotation speed per unit time of the hydraulic motor 23 when the load on the HST is small (or ignorable). A target motor rotation speed MVp can be obtained by setting a swash plate angle value P corresponding to the set position of the main speed change lever 84. The lower graph in FIG. 14 shows the same relation when the load on the HST is large. In this case, even if the swash plate angle value P is set, the motor rotation speed does not reach the target value MVp. Then, by the control of FIG. 13, the compensatory value Δr of the swash plate angle is calculated so as to find the swash plate angle value Ps, and the target motor rotation speed MVp is obtained based on the value Ps.

The data issued from the normal detection means (the position detection sensor 84a of the main speed change lever 84, and the rotation speed detectors 81, 82 and 83 for respective shafts) are used for detecting load on the HST 21. Accordingly, special detection means, such as a pressure sensor for detecting pressure in a HST circuit, is not required, thereby saving costs.

Furthermore, by being informed of the load applied on the HST 21 as mentioned above, load applied on the PTO shaft 53 can be calculated from the load applied on the engine 20 and the load applied on the HST 21 when power is taken off from the PTO shaft 53 to be used for work (FIG. 15).

Since the load applied on the PTO shaft 53 is a difference between the load applied on the engine 20 and the load applied on the HST 21, the controller 90 can automatically calculate the load applied on the PTO shaft 53 and easily inform an operator of the calculated value. In addition, a numerical value of the load applied on the engine 20 is detected by an electronic controlled governor 103 mounted to the engine 20, and transferred to the controller 90. A numerical value of the load applied on the HST 21 is also detected, and the controller 90 calculates a numerical value of the load applied on the PTO shaft 53 from the difference between the load applied on the engine 20 and the load applied on the HST 21.

Furthermore, the controller 90 warns about abnormalities of actuation if the value of load applied on the PTO shaft 53 exceeds a predetermined value, or if a load applied on the PTO shaft 53 is detected while a working machine is not connected to the PTO shaft 53.

Since the value of load applied on the PTO shaft 53 can be detected as mentioned above, the cultivation depth of the rotary cultivator may be changed corresponding to the load applied on the PTO shaft 53, and the vehicle speed may be changed to prevent overload.

With regard to lawn mowing work, it may be assumed that the amount of mowed grass is large when the load applied on the PTO shaft 53 becomes large, and that the amount of mowed grass is small when the load applied on the PTO shaft 53 becomes small. Therefore, the vehicle speed may be changed corresponding to the load applied on the PTO shaft 53 so as to keep the constant amount of mowed grass.

Explanation will be given on a block of FIG. 16 as another speed control block. This control block is for preventing the vehicle accelerated or decelerated by shifting the speed change lever 84 from being rapidly accelerated or decelerated.

Firstly, the operation position of the main speed change lever 84 is detected, and the target HST swash plate control value is set to a value corresponding to this operation position (S421). Then, the commanded value to the HST swash plate angle actuator 86 at the last control loop is subtracted from the target HST swash plate control value, and the calculated remainder is compared with a set value E (S422).

If the calculated remainder is less than the set value E, the command value to the HST swash plate angle actuator 86 is just the target control value (S423). If the calculated remainder is more than the set value E, the command value to the actuator 86 is made to approach the target control value by adding or subtracting the set value E to or from the last command value (S424). Accordingly, the change degree of the movable swash plate 22a every control loop is always kept less than the set value E, thereby preventing excessively sudden acceleration and deceleration and intense speed change shock.

Finally, a memory memorizes the present command value to the HST swash plate angle actuator 86 (S425), and the flow of the swash plate angle control block is concluded. This memory is an array memory, which can memorize the command values of the predetermined counts in reverse order from the present time.

The above speed control block shown in FIG. 16 can also be inserted into the speed control block shown in FIG. 13. Accordingly, the HST swash plate angle is determined while it is compensated to correspond to the load applied on the HST and to prevent sudden acceleration and deceleration.

A neutral control block shown in FIG. 17 used in the HST swash plate angle control block shown in FIG. 12 will be described.

Firstly, the neutral control program of the controller 90 is judged whether it is provided immediately after switching the last program to the neutral control program or not (that is to say, whether the processing of the speed control block has been done immediately before or not) (S631). If the neutral control program is just starting, an integrated count n is initialized, i.e., zeroed (S632).

Next, the rotation speed detector 81 provided on the motor shaft 26 counts pulses transmitted between the last control loop and the present control loop. The number of the pulses is referred to as a variable C, and the controller 90 memorizes the variable C (S633). The rotation speed detector 81 detects each pulse corresponding to rotation of one tooth of the gear 9. Therefore, the pulses count C is proportional to rotation speed of the motor shaft 26. The pulses count C is zero when the motor shaft 26 is perfectly stationary. Incidentally, the pulses count C is always positive regardless of rotation direction of the motor shaft 26.

Next, the controller 90 judges rotation direction of the motor shaft 26 based on the signal from the rotation detector 81 (S634).

If the motor shaft 26 rotates in the forward direction, the integrated count n of the last control loop is read from the memory and the pulses count C is added to the integrated count n (S635), and it is judged whether the calculated integrated count n exceeds a preset value plus N or not (S636). If the integrated count n does not exceed the preset value plus N, the actuator 86 is not controlled, whereby the HST swash plate angle is held. Otherwise, a command value, which is the last command value to the actuator 86 reduced by a set value S, is issued to the actuator 86 so as to shift the actuator 86 toward the backward rotation side (for decelerating the forward rotation speed of the motor shaft 26 or reversing the rotation of the motor shaft 26) (S637), and the integrated count n is reset to zero (S638), thereby zeroing the HST swash plate angle.

Furthermore, the memory memorizes the present command value to the actuator (S639).

On the other hand, if the motor 26 is judged to rotate backward in the conditional branch S634, the integrated count n of the last control loop is read from the memory and the pulse number C is subtracted from the integrated count n (S640), and it is judged whether the calculated integrated count n is less than a preset value minus N or not (S641). If the integrated count integrated value n is not less than the preset value minus N, the actuator 86 is not controlled, thereby holding the HST swash plate angle. Otherwise, a command value, which is the last command value to the actuator 86 reduced by the set value S, is issued to shift the actuator 86 toward the forward rotation side (for decelerating the backward rotation speed of the motor shaft 26 or reversing the rotation of the motor shaft 26) (S642), and the integrated count n is reset to zero (S643), thereby zeroing the HST swash plate angle.

Furthermore, the memory memorizes the present command value to the actuator (S639).

After the above-mentioned flow, the memory memorizes a new integrated count n (S643), and the flow of the neutral control block is concluded.

The above-mentioned neutral control block can also be used as a program of neutral control of HST swash plate angle in association with the later-discussed brake operation. In any case, according to the neutral control, when the command value based on the set of the main speed change lever 84 or the like is close to a value corresponding to zero of the swash plate angle, the command value is changed into the value for zeroing the swash plate angle, thereby forcibly zeroing the swash plate angle. Namely, as shown in FIG. 18, the swash plate angle and the HST output rotation speed are provided with a dead band against the command current value.

Further referring to FIG. 18, when the current applied to the actuator 86 is changed from zero in negative direction, the swash plate angle is not changed until the current value reaches a fixed value. However, if the current value exceeds the fixed value, the swash plate is rotated in its negative side. Also, if the current increased in positive direction exceeds the fixed value, the swash plate is rotated in its positive side.

Accordingly, the rotation speed of the output shaft, which is increased by rotating the swash plate 22a, is also zeroed when the current is within a certain range in the vicinity of zero.

Namely, the actuator 86 does not actuate when the current is within the certain range, that is, a dead band is provided in controlling current to the actuator 86 in proportion to the rotation degree of the main speed change lever 84.

It is assumed that the transmission is set in the HMT mode in the middle and high speed range of forward traveling. While the swash plate angle is reduced to as to increase the forward traveling vehicle speed from the speed V1 for switching drive mode, shown in FIG. 10, to the maximum forward traveling speed, for example, the swash plate is shifted from the positive side to the negative side through the zero point. FIG. 19 (a) illustrates the relation between a valve command value to the valves (for controlling the actuator 86) and the HST rotation speed. In the above situation that the swash plate angle in response to the command value is provided with the dead band where the swash plate is kept in the neutral position, the output rotation speed of the HST 21 is kept in almost zero for a while of change of the valve command value in the current range corresponding to the dead band range of HST swash plate angle. Therefore, while the vehicle is accelerated, the HMT output, that is, the rotation speed of the main transmission output shaft 27 is kept in a certain value for a certain period so as to interrupt the acceleration, whereby the acceleration of the vehicle becomes awkward. In this way, the setting of the dead band for keeping the HST 21 in its neutral state causes a dead time for keeping the certain vehicle speed so as to hinder smooth acceleration of the vehicle in the HMT mode.

Then, as shown in FIG. 19 (b), when the valve command value reaches the maximum value of its range corresponding to the dead band of the swash plate angle, the command value is changed to the minimum value thereof without a time lag. Namely, by changing the command value so as to pass the dead band of the swash plate angle without a time lag, the HST swash plate angle passes through the dead band in an instant on the way of its changing from the positive side to the negative side. Accordingly, the dead time keeping the HST output rotation speed in zero is canceled, thereby smoothing acceleration of the vehicle.

In addition, the controller 90 can estimate or recognize the command value range corresponding to the dead band of the swash plate angle.

Referring to FIG. 11, a flow of drive mode switch from the "HST mode" to the "HMT mode" of FIG. 20 will be described.

This control switches the drive mode when the vehicle speed is increased or reduced and the main speed change ratio MR reaches a switching speed change ratio $MR_C$ of the drive mode.

However, if a signal for switching the drive mode to the "HMT mode" is transmitted to the electromagnetic valves 91 and 92 after detecting that the main speed change ratio reaches the speed change ratio $MR_C$ for switching the drive mode, a time lag resulting from electric time delay and mechanical time delay (for operating the hydraulic device etc.) occurs between the issue of the signal from the controller and the actual operation of the clutches 13 and 14 for setting the "HMT mode", wherein the mechanical delay is more significant. At the time that the clutches 13 and 14 actuate actually, a gap occurs between rotation speed of the ring gear 3 and that of the gear 12 at the front and rear of the HMT clutch 13 and the HST clutch 14, thereby causing shock at the time of drive mode switch.

Then, for suppressing the gap of the rotation speed caused by the time lag, the controller 90 memorizes hydraulic and mechanical delay times $\Delta T_{HMTon}$, $\Delta T_{HMToff}$, $\Delta T_{HSTon}$ and $\Delta T_{HSToff}$ measured beforehand, and a signal for changing drive mode is transmitted to the controller 90 considering the times $\Delta T_{HMTon}$, $\Delta T_{HMToff}$, $\Delta T_{HSTon}$ and $\Delta T_{HSToff}$ earlier than the main speed change ratio reaching the value for switching drive mode. Therefore, the HMT clutch 13 or the HST clutch 14 is engaged or disengaged and the mode is switched actually at the time that the main speed change ratio reaches the value for switching drive mode.

For example, at the time of switching the drive mode from the "HST mode" to the "HMT mode" (or from the "HMT mode" to the "HST mode") as shown in FIG. 21, the controller 90 always analyze the actual main speed change ratio and the changing rate of the main speed change ratio so as to estimate a main speed change ratio after the time $\Delta T_{HMTon}$ passing (referred to as an estimated main speed change ratio). If the estimated main speed change ratio reaches the speed change ratio $R_C$ for switching drive mode, a signal is transmitted to the electromagnetic valve 91 (or the electromagnetic valve 92) so as to engage the HMT clutch 13 (or the HST clutch 14). As a result, at the time$\Delta T_{HMTon}$ later, the main speed change ratio reaches the switching speed change ratio $R_C$, and simultaneously, the HMT clutch 13 (or the HST clutch 14) is actually engaged.

In addition, for switching the drive mode, one of the HMT clutch 13 and the HST clutch 14 is engaged while the other is disengaged (in the case of acceleration of the forward traveling vehicle shown in FIG. 21, the HST clutch 14 is disengaged after engaging the HMT clutch 13). However, according to the present embodiment, a state that both the HMT clutch 13 and the HST clutch 14 are engaged is intervened for a short time $\Delta T_{Mton}$ while the drive mode is being switched, thereby smoothing the switching of drive mode.

Furthermore, at the time of starting disengage of the HMT clutch 14 after engaging the HST clutch 13, the HST speed change ratio is reduced by the compensatory value $\Delta r$ in consideration of the difference of load on the HST between the HMT mode and the HST mode. Namely, since the load applied on the HST 21 in the HMT mode is reduced compared with that in the HST mode, the HST reduction ratio is reduced in consideration of the difference of the HST loads so as not to increase the rotation speed of the motor shaft 26 and not to reduce the rotation speed of the main speed change output shaft 27. This will be described again in later explanation of FIG. 23.

With regard to a flow of switching drive mode from the "HST mode" to the "HMT mode" shown in FIG. 20, the controller 90 estimates the main speed change ratio the time $\Delta T_{HMTon}$ later than the actual main speed change ratio. If the estimated main speed change ratio reaches a set value (the speed change ratio $R_C$ for switching mode), a signal is transmitted to the magnetic valve 91 so as to engage the HMT clutch 13 (S431). In addition, with regard to this embodiment, the set time $\Delta T_{HMTon}$ is set to be equal to the response delay time of the HST clutch 14 ($\Delta T_{HMTon}=\Delta T_{HSToff}$). Accordingly, the actual main speed change ratio reaches the speed change ratio $R_C$ for switching mode the time $\Delta T_{HMTon}$ after transmitting the clutch on signal to the electromagnetic valve 92, and simultaneously, the HMT clutch 13 is engaged actually.

According to this construction, the rotation speed surplus of the HST output caused by the response delay of the HMT clutch 13 is absorbed by the above-mentioned control, thereby reducing shock at the time of switching the mode (specifically, at the time of engaging the HMT clutch 13 actually). Therefore, speeding up of the vehicle accompanying with the switching from the "HST mode" to the "HMT mode" can be done smoothly.

In addition, the above control of the slant angle of the movable swash plate 22a may also be done in the case of reducing the vehicle speed and switching the drive mode from the "HMT mode" to the "HST mode".

As shown in FIGS. 20 and 21, a command value $r_1$ to the HST swash plate angle actuator 86 the time $\Delta T_{HMTon}$ before is read from the memory and issued to the HST swash plate angle actuator 86 while the signal for engaging the HMT clutch 13 is transmitted to the electromagnetic valve 92 (S432). Namely, the command value $r_1$, which is provided for making a swash plate angle of the movable swash plate 22a corresponding to the speed change ratio $R_C$ for mode-switching, is issued the time $\Delta T_{HMTon}$ before transmitting the present signal to the magnetic valve 92 so as to engage the HST clutch 14. The command value $r_1$ is set to be a command value to the HST swash plate angle actuator 86 for setting an angle of the movable swash plate 22a.

Since the vehicle is in speeding up at this time, $r_1$ is close to the reduction side concerning to the HST output from $r_2$ which is commanded the HST swash plate angle actuator 86 at the control loop one time ago from the loop transmitting signal to the magnetic valve 92 so as to engage the HMT clutch 13. Namely, swash plate angle of the movable swash plate 22a is controlled to the reduction side while transmitting a signal to the magnetic valve 91 so as to engage the HMT clutch 13.

After the control of the HST swash plate angle actuator 86 as mentioned above, time measurement is started immediately (S433), and the loop is repeated without doing anything until the measured time reaches a time $\Delta T_{Mtos}-\Delta T_{HSToff}$ (S434). When the time $\Delta T_{Mtos}-\Delta T_{HSToff}$ passes, a signal is transmitted to the HST swash plate angle actuator 86 so as to gradually shift the HST speed change ratio to the reduction side, and this process is repeated until the measured time$\Delta T_{Mtos}$ passes (S435 and S436). When the time $\Delta T_{Mtos}$ passes, a signal is transmitted to the electromagnetic valve 92 so as to disengage the HST clutch 14 (S437). Then, a signal is immediately transmitted to the HST swash plate angle actuator 86 so as to move the movable swash plate 22a of the HST 21 at the angle $\Delta r$ toward its backward rotation side (S438), and the flow of this control block is concluded.

By the control of the controller 90 to transmit output signals to the HST swash plate angle actuator 86 and the main speed change clutch 130 as mentioned above, the slant angle of the movable swash plate 22a is kept constant for the fixed time ($\Delta T_{Mtos}-\Delta T_{HSToff}$) after transmitting the signal for engaging the HST clutch 14. After passing the time $\Delta T_{Mtos}-\Delta T_{HSToff}$, the actuator 86 gradually moves the HST swash plate angle toward the speed reduction side of the HST (toward the speed increasing side of the HMT).

Namely, at the time after transmitting a signal for engaging the HMT clutch 13 and before transmitting a signal for disengaging the HST clutch 14, the HST swash plate angle actuator 86 is controlled to reduce the HST 21 so that, when the HST clutch 14 is actually disengaged the time $\Delta T_{HSToff}$ after transmitting the signal for disengaging the HST clutch 14, the movable swash plate 22a of the hydraulic pump 22 in the HST 21 is moved at the angle difference $\Delta r_0$ toward the backward rotation side from the position of a target value $r_0$ determined by the operation of the main speed change lever 84.

A point X shown in FIG. 21 is the timing of switching from the "HST mode" to the "HMT mode" or from the "HMT mode" to the "HST mode". At this time, the load applied on the HST 21 is changed. This is caused by changing a way of applying power on the hydraulic pump 22 of the HST 21 at the time of changing the mode between the "HST mode" and the "HMT mode". Namely, the hydraulic pump 22 rotates the hydraulic motor 23 in the "HST mode" while the hydraulic pump 22 prevents the hydraulic motor 23 from rotating in the "HMT mode".

Accordingly, it is necessary for smooth speed change operation at the time of switching the drive mode to compensate the swash plate angle considering the load (compensation for a swash plate angle difference $\Delta r_c$).

Then, as shown in FIG. 23, the angle of the movable swash plate 22a of the hydraulic pump 22 is adjusted corresponding to the load applied on the HST 21, thereby enabling smooth speed change control. Namely, the swash plate angle difference $\Delta r_c$ is provided at the time of switching the drive mode, thereby enabling smooth speed change.

In more detail, the swash plate of the hydraulic pump is moved at the angle $\Delta r_c$ toward the neutral position at the time of switching from the "HST mode" to the "HMT mode", and the swash plate of the hydraulic pump is moved to add the angle $\Delta r_c$ to its angle in the forward rotation side at the time of switching from the "HMT mode" to the "HST mode".

The swash plate angle difference $\Delta r_c$ corresponds to the magnitude of load applied on the HST 21.

As mentioned above, the detector 83 detects the rotation of the output shaft of the engine 20, and the detector 81 detects the output rotation of the hydraulic pump of the HST 21. The actuator 86 detects the swash plate angle of the HST 21. According to these detection, the controller 90 is informed of the load applied on the HST 21, and calculates the swash plate angle difference $\Delta_r$ required to compensate the swash plate angle based on the informed load.

Namely, the controller 90 is always informed of the load applied on the HST 21 and compensate the angle of the movable swash plate 22a for the difference caused by the load at the time of switching the drive mode, thereby enabling smooth speed change.

Accordingly, at the time of switching the drive mode, the HST 21 is controlled toward the speed reduction side (toward the speed up side with respect to the HMT) so as to prevent the vehicle speed from decreasing temporarily by change of volume efficiency caused by change of load applied on the HST. Therefore, the shortage of rotation speed of the HMT output caused by the delay of response of the HMT clutch 13 is compensated so as to absorb the change of volume efficiency of the HST 21, thereby reducing shock at the time of switching the drive mode (specifically, at the time of disengaging the HMT clutch 13 actually).

Another control of the HST speed change ratio in association with the switching of the drive mode will now be described in accordance with FIGS. 24 and 25.

FIG. 24 (a) illustrates variations of target value and measured actual value of swash plate angle according to the conventional manner, and FIG. 24 (b) illustrates them by using the compensation of swash plate angle.

Referring to FIGS. 24 (a) and (b), the main speed change lever 84 is rotated for acceleration in fixed speed (in the forward traveling set range). The command value issued from the controller 90 corresponding to the lever position is the target value of the swash plate angle. The measured actual value is the actual swash plate angle at this time. The mode is switched from the HST mode to the HMT mode at a timing $t_1$.

As shown in FIG. 24 (a), when the swash plate 22a is operated from the zero position based on the target value by the conventional manner, the target value changes suddenly at the drive mode switch timing $t_1$. However, such a sudden change is difficult for a hydraulic device. Especially, if the hydraulic device receives feedback to be controlled, its movement for compensation is large. Namely, as shown in FIG. 24 (a), the angle is changed suddenly at a point where the measured actual value of the swash plate angle reverses.

Therefore, as shown in FIG. 24 (b), the change of target value is smoothed in the vicinity of the drive mode change timing, whereby the mode can be switched from the HST mode to the HMT mode smoothly.

Average of movement and functions are used for smoothing the change of the target value.

The creation of the target value will be described in accordance with FIG. 25.

When the main speed change lever 84 is rotated so as to switch the mode from the HST mode to the HMT mode, a signal 200 is inputted into the controller 90. The controller 90 analyzes the target swash plate angle of the HST 21 from the signal 200 and creates a signal 201 for realizing the target swash plate angle. The signal 201 of the target value is passed through a filter circuit 202 so as to change the signal 201 to a smoothed signal 203.

In this way, the change of target value at the mode switch timing is smoothed so as to realize a smooth mode switching from the HST mode to the HMT mode.

In this embodiment for creating the above-mentioned target value of the swash plate, a smoothing circuit smoothing a discontinuous part against the change of the signal of the electronic target value with passage of time (a part of differential load) can be used as the filter circuit 202.

Alternatively, a smoothing circuit constituted by a coil or a condenser may be provided so as to be actuated when the change rate of the swash plate 22a per unit time of the target value calculated in the controller 90 exceeds a fixed value. Further, the unit time can be counted by an operation clock, a timer or the like in the controller 90.

In this way, the controller 90 can calculate and output the signal 203 of the target value more smooth than the signal 201 of the target value, using the averaging of movement or functions for smoothing change of the target value.

Alternatively, the controller 90 may output the preset smoothed signal 203 of the target value instead of the signal 201 of the target value only when the change rate of the swash plate 22a per unit time of the target value exceeds a fixed value. In this case, the filter circuit 202 switches output signal of target value between the signal 201 and the signal 203.

An average of change of the target value (201) per unit time can be used for creating the signal 203 so as to smooth the sudden change of target value.

For example, the angle of the swash plate 22a can be controlled so as to change sigmately. In this regard, a sigmate changing section is allotted to the sudden changing range of the swash plate 22a, thereby smoothing the change of the HST speed change ratio. In addition, a sigmate acceleration designates such as a speed variation in which a beginning acceleration is moderate, the middle acceleration rate is gradually increased, and the acceleration rate is moderated again just before the maximum speed is reached.

The signal 203 of the target value can be calculated corresponding to every target value. The preset smoothed signal of target value can also be outputted corresponding to the change rate of the target value.

<2-4. Determination Method of Command Current Value for HST Swash Plate Actuator>

(2-4-1. Set of Dead Band)

As mentioned above, the HST swash plate angle actuator 86 for changing the slant angle of the movable swash plate 22a of the hydraulic pump 22 is controlled by controlling current value flowing into the actuator 86.

The actuator 86 is provided with a dead band in response to the current where the actuator 86 is not actuated while current flows thereto, thereby facilitating for finding the neutral point. The dead band for the actuator must be different corresponding to individual difference of the HST 21.

Explanation will be given on change of current and HST rotation speed with applying sweep-like current as shown in FIG. 27 on the HST swash plate angle actuator 86 in the state that the clutch between the motor output shaft 26 and the output shaft 27 is disengaged, that is, the state that both the HMT clutch 13 and the HST clutch 14 are disengaged, according to FIG. 26.

FIG. 26 shows a point A in which the hydraulic motor 23 starts rotating in current rise process, a point B in which the HST rotation speed stops increasing to be saturated regardless of further applying current, a point B' in which maximum current flows, a point C in which the HST rotation speed starts decreasing from the saturated state in current fall process, and a point D in which the HST rotation speed is zeroed.

When current is applied on the HST swash plate angle actuator 86, the HST rotation speed changes from the point A to the point D through the points B, B' and C.

The HST rotation speed increases nonlinearly from the point A to the point B. The HST rotation speed is kept constant, i.e., in the saturated state between the point B' and C through the point B. The HST rotation speed decreases nonlinearly from the point C to the point D. Herein, current value in the range between the point C and the point B' is referred to as saturated current value, and current value between the points A and C is referred to as initial current value.

At the time of determining the dead band, as shown in FIG. 28, the memory of the controller 90 memorizes the initial current value and the saturated current value, and an approximation straight line which approximates the current variation between the current values by linear interpolation approximation method is referred to as a setting line, whereby the dead band $\Delta I_0$ is determined based on the setting line. In this regard, an approximation line α, which approximates the nonlinear current falling process between the saturated current value $I_c$ at the point C for starting the decrease of HST rotation speed and the initial current value $I_d$ at the point D for zeroing the decreased HST rotation speed, is calculated by linear interpolation approximation method so as to be provided as the setting line for determining the dead band $\Delta I_0$.

The dead band $\Delta I_0$ is determined by the above mentioned manner corresponding to individual HST 21.

It may be thinkable that an approximation straight line, which approximates the current rising process between the initial current value $I_a$ at the point A where the HST rotation speed starts increasing and the saturated current value $I_b$ at the point B where the HST rotation speed is saturated by linear interpolation approximation method, is used as the setting line for determining the dead band. However, while the same initial current value $I_a$ is given at points A and A', and the HST rotation speed at the point A in the current rising process is kept zero, the HST rotation speed at the point A' in the current falling process is not zero, thereby unexpectedly rotating the output shaft of the HST 21. This is the reason why the approximation line a drawn between the points C and D in the current falling process is used as the setting line for determining the dead band.

(2-4-2. Determination Method of Command Current Value)

As understood from FIG. 26, even if the same sweep-like current is passed into the actuator 86, the HST rotation speed is different whether it is performed in the current rise process or in the current fall process. Namely, a hysteresis error W is generated between the sweep-like current and the HST rotation speed.

Therefore, when the current value is decreased so as to shift the HST rotation speed change process from increase process to decrease process, the HST rotation speed is held because the hysteresis error W, however, the gradual decrease of current delays the shift of process. Description will be given of first, second and third methods for determining an original command current value i' to the HST swash plate angle actuator 86 for canceling the delay.

According to the first method, the memory of the controller 90 memorizes the initial current value and the saturated current value, and the approximation line which approximates the current variation between the current values by linear interpolation approximation method is referred to as the setting line similarly to the setting method of the dead band $\Delta I_0$ of the HST swash plate angle actuator 86. The command current value to the actuator 86 is determined based on the setting line for obtaining a certain HST rotation speed.

Namely, as shown in FIG. 28, a linear interpolation approximation line α is drawn between the point C of saturated current value $I_c$ for starting change of the HST rotation speed in current falling process and the point D of the initial current value $I_d$ for zeroing the HST rotation speed in the current falling process, so as to serve as the setting line for determining the original command current value i' which is the command current value when load is not applied on the HST 21.

Therefore, for example, when an HST rotation speed H(n) is required, the original command current value i' to the HST swash plate angle actuator 86 is determined based on the approximation line α and the command value is to be I(n).

It may be thinkable that an approximation straight line, which approximates the current rising process between the initial current value $I_a$ at the point A where the HST rotation speed starts increasing and the saturated current value $I_b$ at the point B where the HST rotation speed is saturated by linear interpolation approximation method, is used as the setting line for determining the dead band. However, while the same initial current value $I_a$ is given at points A and A', and the HST rotation speed at the point A in the current rising process is kept zero, the HST rotation speed at the point A' in the current falling process is not zero, thereby unexpectedly rotating the output shaft of the HST 21. This is the reason why the approximation line a drawn between the points C and D in the current falling process is used as the setting line for determining the dead band.

The second method for determining the command current value for the HST swash plate angle actuator 86 takes the hysteresis error W generated between the command current value and the HST rotation speed into account.

A deviation of a linear interpolation approximation line β approximating the current rising process between the points A and B from the linear interpolation approximation line α approximating the current falling process between the points C and D serves as the hysteresis error W. For example, as shown in FIG. 29, hysteresis error W(f) corresponding to an HST rotation speed H(f) is deviation of a current value I(f) on a point f on the approximation line β from a current value I(f') on a point f' on the approximation line α.

$$R(f)=I(f)-I(f')$$

The memory of the controller 90 memorizes the hysteresis error W calculated about each current value as mentioned above, and determines the original command current value i' to the HST swash plate angle actuator 86 at the time that load is not applied on the HST 21 in consideration of the hysteresis error W.

For example, in the HST rotation speed increase process, the original command current value i' is determined based on the approximation line β, and the original command current value i' corresponding to HST rotation speed H(f) is to be I(f). In the HST rotation speed decrease process, the original command current value i' is determined based on the approximation line α, and the original command current value i' corresponding to the HST rotation speed H(f) is to be I(f').

Furthermore, at the time of switching from the HST rotation speed increase process to the HST rotation speed decrease process on a point F in which the HST rotation speed is H(f), the original command current value i' for the HST swash plate angle actuator 86 is changed suddenly with an amount of hysteresis error W(f) corresponding to the HST rotation speed H(f) from the point f to the point f'. Similarly, at the time of switching from the HST rotation speed decrease process to the HST rotation speed increase process on a point F in which the HST rotation speed is H(f), the original command current value i' for the HST swash plate angle actuator 86 is changed suddenly with an amount of the hysteresis error W(f) corresponding to the HST rotation speed H(f) from the point f' to the point f.

The HST rotation speed is kept constant between the points f and f' by the hysteresis error W(f). Accordingly, even if the HST rotation speed is changed from the increase process to the decrease process, or from the decrease process to the increase process, the HST swash plate angle is not suddenly changed, thereby smoothing the switching between acceleration and deceleration.

With regard to the third determination method, considering that the change of the HST rotation speed to the command current value to the actuator 86 relative to the HST rotation speed is nonlinear, a plural of HST rotation speed points between the point corresponding to initial current value and the point corresponding to saturated current value are plotted, and the memory of the controller 90 memorizes current values corresponding to the respective HST rotation speeds corresponding to the respective current points, and then, a linear interpolation approximation line is drawn between each adjoining points. Namely, instead of only one linear interpolation approximation line drawn between the two points, a plural of linear interpolation approximation lines each of which is drawn between each adjoining points of the plural points make a nonlinear approximate line between the two points.

For example, as shown in FIG. 30, in the current rise process, a plural of rotation speed detection points $S_1$, $S_2$ to $S_n$ are preset by steps (for example, every 100 rpm) between the point A for starting the increase of HST rotation speed and the point B for saturating the HST rotation speed. Linear interpolation approximation lines are drawn between the points A and $S_1$, between the points $S_1$ and $S_2$, . . . and between the points $S_n$ and B, respectively, thereby obtaining the entire approximation line β. Similarly, in the current fall process, the nonlinear approximation line α is obtained between the point C for starting the decrease of HST rotation speed and the point D for zeroing the HST rotation speed.

Based on the approximation lines α and β drawn as mentioned above, the hysteresis error W is calculated by the deviation between the approximation lines α and β so as to determine the original command current value i' to the HST swash plate angle actuator 86 in the state that load is not applied on the HST 21.

According to the third determination method, the approximation lines α and β become substantially nonlinear lines showing substantially actual relation between the current value and the HST rotation speed, thereby determining further accurate original command current value i' compared with the compensation by the first and second determination method.

For example, in the HST rotation speed increase process, the original command current value i' is determined based on the approximation line β, and the original command current value i' corresponding to HST rotation speed H(f) is to be I(f). In the HST rotation speed decrease process, the original command current value i' is determined based on the approximation line α, and the original command current value i' corresponding to the HST rotation speed H(f) is to be I(f').

Furthermore, at the time of switching from the HST rotation speed increase process to the HST rotation speed decrease process on a point F in which the HST rotation speed is H(f), the original command current value i' to the HST swash plate angle actuator 86 is changed suddenly by the degree of hysteresis error W(f) corresponding to the HST rotation speed H(f) from the point f to the point f'. Similarly, at the time of switching from the HST rotation speed decrease process to the HST rotation speed increase process about the HST rotation speed H(f), the original command current value i' to the HST swash plate angle actuator 86 is changed suddenly by the degree of the hysteresis error W(f) corresponding to the HST rotation speed H(f) from the point f' to the point f.

In addition, with regard to the third determination method, when the hysteresis error W between the approximation lines α and β is nonsignificantly small, the approximation line α may be used as the setting line so that a current value on the setting line serves as the original command current value i' to the HST swash plate angle actuator 86 so as to obtain a desired HST rotation speed. In this case, data to be memorized by the memory of the controller 90 can be reduced compared with the case that the two approximation lines α and β are set.

(2-4-3. Determination of Command Value for Rectifying HST Swash Plate Angle in Consideration of HST Load)

Feedback control of the compensatory value Δr for HST swash plate angle is done intermittently. While the original command current value i' to the actuator 86 for the HST 21 free from load is determined, load is applied on the HST 21 while the vehicle travels. Accordingly, the compensatory value Δr for HST swash plate angle receives feedback to be controlled corresponding to the load. Therefore, the command current value i to the actuator 86 while the vehicle travels is the result from the original command current value i' controlled by feedback of the compensatory value Δr.

The feedback control of HST swash plate angle will now be detailed.

In FIG. 31, an upper line shows the relation of rotation speed per unit time of the hydraulic motor 23 to HST swash plate angle of the hydraulic pump 22 when load applied on the HST 21 is large. A lower line shows relation thereof when load applied on the HST 21 is small. A difference $\Delta d_r$ is generated between the lines by the difference of load applied on the HST 21.

Namely, load applied on the HST 21 changes the volume efficiency of the HST so as to change the drive efficiency of the hydraulic motor 23. The volume efficiency of the HST is changed according to temperature and deterioration of hydraulic oil and the load applied on the HST 21. For example, leak and compression of oil caused by oil pressure rise in the circuit caused by the load applied on the HST 21 causes leak or compression of oil. Repeat of the leak or compression of oil further causes aged deterioration and change of temperature of oil of the HST 21, thereby reducing the volume efficiency thereof.

Increasing rate of rotation speed of the hydraulic motor 23 in response to movement of HST swash plate angle becomes small when load applied on the HST 21 is large. Increasing rate of rotation speed of the hydraulic motor 23 in response to movement of HST swash plate angle becomes large when load applied on the HST 21 is small. Namely, the HST swash plate angle of the hydraulic pump 22 is changed corresponding to the load applied on the HST 21 even if the rotation speed per unit time of the hydraulic motor 23 is fixed.

In the state that volume efficiency of the HST 21 is changed, the vehicle speed may not become a desired traveling speed even if the actuator 86 changes the HST swash plate angle by an operation degree corresponding to a main speed change ratio determined by operation of the main speed change lever 84. Therefore, the change of volume efficiency of the HST 21 is taken into account for determining the command current value i to the HST swash plate angle actuator 86. In this regard, the command current value i to the actuator 86 is compensated by a compensatory value Δi considering the load applied on the HST 21, thereby compensating the HST swash plate angle by the compensatory value Δ so as to correspond to the change of volume efficiency of the HST.

As shown in FIG. 32, for ensuring a constant HST rotation speed in either the HST mode or the HMT mode, the actuator 86 requires additional current Δi in the state that load on the HST 21 is considerably large (the HST 21 is loaded) by change of volume efficiency caused by leak and compression of oil, in comparison with the case that the load on the HST 21 is ignorably small (the HST 21 is unloaded).

Namely, the difference Δi of command current value to the HST swash plate angle actuator 86 between the original command current value i' for unloaded HST 21 and the command current value i for loaded HST 21. A value Q of load applied on the HST 21 is proportional to the difference between the command current value i for loaded HST and the original command current value i' for unloaded HST.

Therefore, the command current value i must be the original command current value i' compensated for the differenceΔi. On the assumption that the compensatory current Δi for the command current value i is generated by the load applied on the HST 21, the load applied on the HST 21 is detected based on the difference Δi.

The controller 90 calculates the target rotation speed $M_P$ of the output shaft 27 required for the main speed change ratio determined by data from the detector 83 detecting rotation speed of the engine, the detector 81 detecting rotation speed of the hydraulic motor 23 of the HST 21, and the detectors 84a and 87a detecting the positions of the main speed change lever 84 and the sub speed change switch 87. The controller 90 calculate the difference ΔM between the target rotation speed $M_P$ of the output shaft 27 and the actual rotation speed M of the output shaft 27 ($\Delta M = M_P - M$).

The command current value i to the HST swash plate angle actuator 86 is determined based on the difference ΔM calculated as the above mentioned. The command current value i is determined by the difference ΔM of the actual rotation speed M of the output shaft 27 from the target rotation speed $M_P$ of the output shaft 27, and the value Q of the load applied on the HST 21. The controller 90 previously memorizes a map showing the relation of the command current value i to the output rotation speed differenceΔM and the load value Q.

The command current value i is determined based on this map, and current equivalent to the determined command current value i is transmitted to the HST swash plate angle actuator 86, thereby actuating the actuator 86 so as to change the HST swash plate angle.

The command current value i to the actuator 86 is compared with the original command current value i', which is measured from a vehicle having unloaded HST in its test traveling and stored in the memory of the controller 90, so as to calculate the current difference Δi (Δi=i-i'), and then, the value Q of the load applied on the HST 21 is determined based on the map memorized in the controller 90 expressing the relation of the current difference Δi to the load Q.

The command current value i is the original command current value i' compensated by the compensatory differenceΔi corresponding to the value Q of load on the HST 21 detected in the last control loop. Namely, the command current value i to the actuator 86 for controlling the HST swash plate angle always receives feedback to be controlled.

In addition, as shown in FIG. 33, the compensatory value Δi for the command current value i is set so as to add or subtract an angle Δr to and from the HST swash plate angle of the unloaded HST, wherein, if the main speed change lever 84 is operated to increase the vehicle speed, the HST swash plate is moved for further increasing the vehicle speed by the compensatory angle Δr, and if the main speed change lever 84 is operated to decrease the vehicle speed, the HST swash plate is moved for further decreasing the vehicle speed by the compensatory angle Δr.

The above feedback control is intermittently performed so as to control the HST swash plate angle by the compensatory angle Δr, thereby ensuring proper control for smoothing and stabilizing acceleration in correspondence to various situations.

Explanation will be given on compensation control of HST swash plate angle at the time of switching the drive mode according to FIG. 33.

As the above mentioned, the command current value i to the actuator 86 always receives the feedback of compensatory valueΔi to be controlled so as to compensate the HST swash plate angle set about unloaded HST by the compensatory angle Δr. However, the load applied on the HST 21 is suddenly changed at the point X in which the drive mode is changed from the "HST mode" to the "HMT mode" or from the "HMT mode" to the "HST mode".

The reason is that the direction of power applied on the hydraulic pump 22 of the HST 21 is changed when the drive mode is switched between the "HST mode" and the "HMT mode". Namely, the hydraulic pump 22 rotates the hydraulic motor 23 in the "HST mode" while the hydraulic pump 22 hinders the hydraulic motor 23 from rotating in the "HMT mode".

Accordingly, when the compensatory angle just before the switching is referred to as $\Delta rx$, it is necessary for smooth speed change operation at the time of switching the drive mode to offset the swash plate by the angle $\Delta rx$ toward the corresponding speed decrease side in the HMT mode though the swash plate is offset by the angle $\Delta rx$ toward the corresponding speed increase side in the HST mode.

Namely, the controller 90 counts out the timings just before and after the switching of the drive mode, and, at the timing just after the mode-switching, it subtracts a compensatory value $\Delta i_x$, which has been added to the original command current value i', from the original command current value i'.

Accordingly, the HST 21 is decelerated (for accelerating the HMT) so as to prevent the temporal fall of vehicle traveling speed caused by reduction of volume efficiency of HST 21 by load applied on the HST 21. Therefore, the reduction of volume efficiency of the HST 21 is covered so as to reduce shock at the time of switching the drive mode.

Referring to FIG. 34, description will now be given of change of the command current value i to the HST swash plate angle actuator 86 when the vehicle is shifted from the "HST mode" in the low speed forward traveling range to the "HMT mode" in the middle or high speed forward traveling range, in consideration of the above-mentioned compensation of timing and the compensation against load applied on the HST 21.

With regard to graphs shown in FIG. 34, the axis of ordinates shows the main speed change ratio in a graph [1], the HST speed change ratio in a graph [2], an on/off signal outputted to the electromagnetic valve 91 for driving the HMT clutch 13 and pressure in the HMT clutch 13 in a graph [3], the on/off signal outputted to the electromagnetic valve 91 for driving the HMT clutch 14 and pressure in the HMT clutch 14 in a graph [4], and a current value outputted to the HST swash plate angle actuator 86 and the HST speed change ratio in a graph [5]. The graphs [1] to [5] share a common axis of abscissas about time passage.

Firstly, as shown in the graph [1] of FIG. 34, an original target main speed change ratio 391 is determined by lever operation by an operator. Then, the original target main speed change ratio 391 is restricted so as to product a target main speed change ratio 392 for preventing the vehicle from sudden accelerating or decelerating at the time of sudden operation of the lever by the operator.

To change the vehicle traveling speed, an angle of the movable swash plate 22a of the hydraulic pump 22 of the HST 21 (HST swash plate angle) is controlled actually. As shown in the graph [2] of FIG. 34, an original HST target speed change ratio 393 is determined based on the target main speed change ratio 392.

A value of the original HST target speed change ratio 393 in increasing process must essentially be switched to that in decrease process at a time $T_A$ when the target main speed change ratio 392 reaches the switching speed change ratio $R_C$ for switching the mechanically determined drive mode. However, if the original HST target speed change ratio 393 is switched to decrease at the time $T_A$, a time lag caused by response operation delay of the movable swash plate 22a of the HST 21 prevents the actual HST speed change ratio $R_{HST}$ from reaching the HST speed change ratio $R_{HSTC}$ for switching drive mode.

Therefore, a permissive value of target main speed change ratio $\Delta R$ at switching of the drive mode from the "HST mode" to the "HMT mode" is set so as to switch the drive mode at the time that actual speed change ratio $R_{now}$ reaches the switching speed change ratio $R_C$. The permissive value of target main speed change ratio $\Delta R$ is converted into a permissive value of HST speed change ratio $\Delta R_{HST}$. A true HST speed change ratio $Rt_{HSTC}$ for switching drive mode is set so that the original HST target speed change ratio 393 becomes the original HST speed change ratio $R_{HSTC}$ for switching drive mode plus the permissive value $\Delta R_{HST}$ ($Rt_{HSTC} = R_{HSTC} + \Delta R_{HST}$).

As shown in the graph [1] of FIG. 34, an actual main speed change ratio $R_{now}(n)$ at a certain timing $T(n)$, a change rate a of the actual main speed change ratio, and the time lag $\Delta T_{HMTon}$ between the timing of issuing a signal for engaging the HST clutch 14 and the timing of actual engaging of the clutch 14 are decided so as to presume a main speed change ratio $R_{Est}$ after passing of the time lag $\Delta T_{HMTon}$ since the timing $T(n)$ ($R_{Est} = R_{now}(n) + \alpha * \Delta T_{HMTon}$).

At the time of shifting the drive mode from the "HST mode" to the "HMT mode", if the main speed change ratio $R_{Est}$ calculated as mentioned above becomes larger than the speed change ratio $R_C$ for switching drive mode, the switching operation of the clutches is started.

At the time of starting the switching operation, the HST target speed change ratio is once returned to the switching HST speed change ratio $R_{HSTC}$ firstly. At this time, for preventing the HST target speed change ratio from changing rapidly, an HST target speed change ratio 394 is created by filtering and smoothing the original HST target speed change ratio 393, and the HST swash plate angle is controlled so as to realize the HST target speed change ratio 394.

A signal for engaging the HMT clutch 13 is outputted at a timing $T$. Then, the HMT clutch 13 is actually engaged after the time lag $\Delta T_{HMTon}$ as shown by the graph [3] in FIG. 34.

When the HMT clutch 13 is engaged, the drive mode is switched to the "HMT mode", whereby the HST speed change ratio must be decreased. If a signal for decreasing the HST swash plate angle is outputted after the actual engaging of the HMT clutch 13, the switching of clutches is not satisfactory because of the time lag $\Delta T_{HST}$ caused by operation delay of the HST 21.

Then, a signal for decreasing the HST swash plate angle is outputted when a time $\Delta T_{keep}$ ($\Delta T_{keep} = \Delta T_{HSTon} - \Delta T_{HST}$) passes since the timing $T$ so that the HST swash plate angle can be decreased when the time $\Delta T_{HSTon}$ passes from the timing $T$. In addition, if the signal is outputted before passing of the time $\Delta T_{keep}$ since the timing $T$, the HST speed change ratio is reduced before engaging the HMT clutch 13, thereby causing generating shock by the mode switching.

Then, a signal for disengaging the HST clutch 14 is outputted after passing of the preset time $\Delta T_{Mtos}$ since the timing $T$ when the signal for engaging the HMT clutch 13 is outputted.

The total time for actual disengaging of the HST clutch 14 since the timing $T$ is found by adding the time lag $\Delta T_{HSToff}$ since issue of the signal for disengaging the HST clutch 14 till actual disengaging of the HST clutch 14 to the time $\Delta T_{Mtos}$.

It is preferable for smoothing the switching of the clutches to disengage the HST clutch 14 simultaneously with the engagement of the HMT clutch 13. Namely, the time $\Delta T_{Mtos}$ is preferably determined so as to materialize that $\Delta T_{Mtos} + \Delta T_{HSToff} = \Delta T_{HMTon}$.

If the time $\Delta T_{Mtos}$ is determined so as to materialize that $\Delta T_{Mtos} + \Delta T_{THSToff} > \Delta T_{HMTon}$, a time $\Delta T_{simu}$ in which both clutches 13 and 14 are engaged simultaneously is generated. Corresponding to this case, the compensation of load at the time of switching the drive mode according to the present embodiment is preformed while the time $\Delta T_{simu}$.

When both clutches 13 and 14 are engaged, the HST speed change ratio is fixed to the HST speed change ratio $R_{HSTC}$ for switching drive mode. Even if the movable swash plate 22a is moved while this time, the vehicle speed is not influenced.

Description will now be given of change of the HST swash plate angle at the time of applying step-like current according to FIG. 35. In this drawing, a time since applying current by mechanical characteristic of the HST 21 till starting actual change of the HST swash plate angle is referred to as a time $\Delta T_{HST}$, and a time for making the moved HST swash plate stationary since starting of movement of the HST swash plate is referred to as a stabilization time $\Delta T_S$.

The moved HST swash plate is desired to become stationary state at the time of disengage the HST clutch 14. Therefore, the command current value i at the time of switching the drive mode is compensated after passing of the time $\Delta T_{keep}$ since the timing T, and the time $\Delta T_{simu}$ for engaging both the clutches 13 and 14 is set to be longer than the stabilization time $\Delta T_S$ of the HST 21. As mentioned above, a compensatory current value $\Delta i_C$ for compensating the command current value i at the time of switching drive mode is the twice of the current value $\Delta i_X$ determined from the original command current value i' just before compensation about the unloaded HST 21. Accordingly, the HST swash plate angle is changed widely, and then the HST clutch 14 is disengaged so as to make the moved HST swash plate stationary.

<2-5. HST Control Flow in Relation with Engine Control>

HST control in association with control of the governor of the engine in the first transmission 101 will now be described. As shown in FIG. 6, the engine 20 is provided with a fuel injection pump having the electronic controlled governor 103. The electronic controlled governor 103 calculates engine torque of the engine 20, and outputs the result of calculation to the controller 90 electrically connected thereto.

The electronic controlled governor 103 controls a control rack of the fuel injection pump (not shown) via a solenoid based on a signal of the controller 90 corresponding to the driving condition, and its its characteristic based on load can be arbitrarily set by the controller 90 within the permitted capacity range of the engine.

A rotation angle detector 88a detects the rotation angle of a steering shaft 88 and inputs its detected data into the controller 90, thereby informing of the rotation of the steering wheel 57 provided in a driver's part of the vehicle.

Furthermore, a working machine lift hydraulic cylinder 96 (not shown) is disposed on a rear portion of the vehicle body so as to vertically move a rotary cultivator. An electromagnetic valve 97 electrically connected to the controller 90 supplies oil to the cylinder 96 so as to telescope it. The cylinder 96 can be operated arbitrarily by operating a fingertip lift button 533 (shown in FIG. 6).

The engine rotation speed control (governor control) by the above-mentioned mechanism for controlling engine output rotation speed and the swash plate angle control by the mechanism for controlling HST swash plate will now be described according to FIGS. 36 to 42.

Firstly, explanation will be given of a uniform fuel consumption curve and a control flow according to FIGS. 36 and 37.

In FIG. 36, in setting the axis of abscissas about engine rotation speed and the axis of ordinates about torque, constant fuel consumption rate curves 592, 593 . . . are plotted with a maximum torque curve 591 serving as plotted maximum torque every engine rotation speed, so as to product a composite graph about fuel consumption rate.

A graph 590 expresses a range of optimal fuel consumption rate for driving the engine 20. The optimal fuel consumption line 590 is plotted by points of best fuel consumption efficiency rate of the engine. The engine 20 driven according to the optimal fuel consumption line 590 achieves the best fuel-efficiency.

The controller 90 memorizes a map on which the constant fuel consumption rate curves 592, 593 . . . are plotted. The optimal fuel consumption line 590 for driving the engine is calculated based on the map. In the case that the map on which the constant fuel consumption rate curves 592, 593 . . . are plotted is memorized, an engine control attaching importance to engine torque may be used as well as that using the optimal fuel consumption line 590.

Alternatively, the optimal fuel consumption line 590 for driving the engine may be mapped in the controller 90.

The drive of the engine 20 using the optimal fuel consumption line 590 is performed according to a control flow 500 shown in FIG. 37.

In this regard, a tractor is provided with the engine 20, the fuel injection pump having the electronic controlled governor 103, the engine rotation speed detector 83, and the electronically controlled hydraulic stepless transmission (HST). Referring to a method for controlling the tractor, the electronic controlled governor 103 calculates engine torque (501). The engine rotation speed detector 83 detects engine rotation speed (502). The controller 90 calculates the difference between the detected speed and a speed on the optimal fuel consumption line (503). If the difference exists, the controller controls the governor 103 so as to cancel the difference (504), or/and the HST swash plate angle actuator 86 adjusts the angle of the movable swash plate 22a so as to maintain the cultivation speed (505).

Namely, detected data from the electronic controlled governor 103 is compared with data memorized in the map, and then, the governor 103 controls fuel injection amount or/and the HST 21 controls its swash plate angle so as to adjust the HST speed change ratio.

The above control is always preformed so that, if the detected engine rotation speed and torque approach the optimal fuel consumption line 590, the controller 90 regards the fact as the state that the vehicle is driven while ensuring optimal fuel consumption rate (506). Consequently, fuel-efficient drive of the engine can be ensured while keeping predetermined cultivation speed. Incidentally, the predetermined cultivation speed is set by an operator at the time of starting work, and is so-called set speed of "auto cruise".

In this embodiment, the traveling speed of the vehicle is controlled by the HST 21 so as to keep the predetermined cultivation speed. However, it is also supposable that cultivation speed is unnecessary to be kept. Therefore, for this case, an operator can arbitrarily select whether the cultivation speed control is done or not.

Next, a control block 520 corresponding to the case that high load is applied on the working machine attached to the tractor (working load) will be described in accordance with FIGS. 38, 39 and 40. In this form, control is done so as to keep maximum torque of the engine. In addition, the torque can be set according to the above-mentioned optimal fuel consumption line.

While the rotary cultivator driven by the PTO shaft 53 is working, the cultivation speed (traveling speed of the tractor) is changed according to the control block 520 so as to correspond to load applied on the engine 20 caused by the work of the rotary cultivator.

The control block 520 corresponding to high load shown in FIG. 38 serve as an example of the method for controlling cultivation speed of a tractor provided with the engine 20, the fuel injection pump having the electronic controlled governor 103, the engine rotation speed detector 83, and the electronically controlled hydraulic stepless transmission (HST 21). According to the control method, the electronic controlled governor 103 detects engine load (521), and the engine rotation speed detector 83 detects engine rotation speed (522). The controller 90 calculates maximum torque equivalent to the detected engine rotation speed and calculates difference between the maximum torque and the engine load (523). If the engine load is higher than the maximum torque (if the engine rotation speed is decreased), the controller 90 controls the HST swash plate angle actuator 86 of the HST 21 so as to slant the movable swash plate 22a of the hydraulic pump 22 for deceleration (525). If the engine load is lower than the maximum torque (if the engine rotation speed is increased), the controller 90 controls the HST swash plate angle actuator 86 of the HST 21 so as to slant the movable swash plate 22a of the hydraulic pump 22 for acceleration (524).

Furthermore, the control flow 520 contains a control block 530. According to the control block 530, if the engine load exceeding the maximum torque is not decreased after decreasing cultivation speed, the controller 90 commands the electromagnetic valve 97 to actuate the working machine lift hydraulic cylinder 96 so as to raise the rotary cultivator (531). Afterward, if the engine load starts decreasing, the controller 90 commands the electromagnetic valve 97 to actuate the cylinder 96 so as to lower the rotary cultivator to a predetermined depth. The predetermined depth may be arbitrarily set by an operator at the time of starting cultivation work.

If the field is so hard as to reduce the rotation speed of the rotary cultivator and to increase engine load above the predetermined value (maximum torque), the cultivation speed is reduced so as to slow the movement of the rotary cultivator per unit time, thereby adjusting the amount of cultivated soil per unit time. Accordingly, a sufficiently long time is taken for cultivating a hard part of the field satisfactorily.

On the other hand, if the field condition is unproblem for cultivation by the rotary cultivator and engine load becomes less than the predetermined value (maximum torque), the cultivation speed is increased so as to speed up the movement of the rotary cultivator per unit time, thereby minimizing a time for cultivation.

Namely, if engine load caused by the rotary cultivator is high, the controller considers that the field is hard, and if engine load is low, the controller considers that the field can be cultivated easily, thereby automatically optimizing cultivation speed corresponding to each state.

Accordingly, the fineness of cultivation by the rotary cultivator is improved while displaying the best efficiency in correspondence to various field conditions.

Furthermore, the field is prevented from rough cultivation, i.e., the evenness of cultivation can be ensured over the cultivated field.

Since the cultivation speed is changed automatically, an operator can work easily without caring whether the field is hard or soft and without operating the main speed change lever 84.

Furthermore, when a state of the field is wrong (hard) and engine load is not reduced though cultivation speed is decreased, the cultivation depth is reduced so as to reduce the engine load by performing the control block 530, thereby preventing the engine from stopping.

The reduction of cultivation depth prevents the engine from stopping, whereby the vehicle can travel forward. When the engine load is reduced to the predetermined value (maximum torque) after reducing the cultivation depth, the hydraulic cylinder for lifting the working machine actuates to increase the cultivation depth, whereby cultivation can be done in the predetermined depth again.

In addition, an operator can arbitrarily select whether the control block 530 is performed or not.

Before starting cultivation, an operator presets a traveling speed of the vehicle with the rotary cultivator during cultivation, i.e., a cultivation speed. The control block 520 corresponding to high engine load caused by cultivation is performed with regarding the preset cultivation speed as the upper limit of cultivation speed.

Accordingly, even if cultivation speed is increased, the speed is made lower than the predetermined cultivation speed during the cultivation. Accordingly, when the cultivation speed starts reducing, shock of deceleration can be suppressed.

Accordingly, sudden speed down of the vehicle is prevented and cultivation speed is stabilized. Therefore, the cultivation work becomes comfortable. Also, impact on apparatuses of the drive system can be minimized so as to prevent their breakdown. Interval of maintenance work can be extended, and durability can be improved.

Description will now be given of control of the governor and the HST when the vehicle turns in accordance with FIG. 40.

A control block is provided for reducing rotation speed of tines of the raised rotary cultivator, which is driven by the PTO shaft 53 for cultivation, while the vehicle turns on a headland at constant or increased speed.

It is assumed that the vehicle turns on the headland according to the following control flow when the transmission is set in the HST mode so that, when the HST swash plate angle is increased, the main speed change ratio is increased.

A control block 540 shown in FIG. 40 serves as a method for controlling cultivation speed of the tractor, which is provided with the engine, the fuel injection pump having the electronic controlled governor, the engine rotation speed detector, and the electronically controlled hydraulic stepless transmission. When a detector for detecting rotation angle of the steering wheel detects that the turning angle of the vehicle reaches a predetermined turning angle, or when the fingertip lift button is switched for raising the cultivator, the rotary cultivator is commanded to be lifted up (541). At this time, the controller 90 reduces the engine rotation speed, moved the movable swash plate 22a in the direction for acceleration (increases the main speed change ratio), and starts lifting the rotary cultivator (542), whereby a predetermined vehicle speed is kept while the vehicle turns (543). When the vehicle finishes turning, i.e., when the detector detects that the turning angle of the vehicle becomes smaller than the predetermined angle, or when the fingertip lift button is switched for lowering the cultivator, the controller 90 commands to lower the rotary working machine (544). At this time, the controller 90 returns the engine rotation speed to a set value, moves the movable swash plate 22*a* in the direction for deceleration (decreases the main speed change ratio), and starts lowering the rotary cultivator (545), whereby the vehicle resumes cultivation (546). Incidentally, the predetermined turning angle of the vehicle is, for example, 180 degree for reversing the traveling direction of the vehicle.

By the above-mentioned control, when the vehicle comes to a turning point, the raising of the rotary cultivator is commanded according to detecting that the turning angle of the vehicle reaches the predetermined angle by the detector for detecting rotation angle of the steering wheel, or according to the switching of the fingertip lift button. Then, the vehicle starts turning, the rotary cultivator is raised and the engine rotation speed is reduced so as to reduce the rotation speed of the PTO shaft 53.

By reducing the rotation speed of the PTO shaft 53, "torsional moment" applied on the coupler (universal joints or the like) flexibly connecting the PTO shaft 53 to the rotary cultivator is reduced, thereby preventing the coupler from breakdown. When the rotary cultivator is raised, the rotation speed of its rotary tines is decreased so as to reduce scattering of soil to the circumference, and enhancing safety of the rotary tines compared with that rotated at high speed.

On the other hand, vehicle speed is increased by moving the movable swash plate to its acceleration side against reduction of engine rotation speed, thereby keeping the vehicle speed during the turning of the vehicle, and quickly completing the turning of the vehicle. In addition, the traveling speed of the vehicle predetermined before turning is set as the upper limit speed during the turning of the vehicle, whereby the vehicle can be stably balanced during its turning, and can smoothly resume cultivation after turning.

When the steering wheel is returned to forward traveling position or the fingertip lift button is switched for lowering the cultivator, the rotary cultivator is lowered to the predetermined depth for cultivation. Then, the predetermined cultivation speed is reestablished so as to resume cultivation.

Next, explanation will be given on a method of changing the speed change ratio of the vehicle (corresponding to the "main speed change ratio") in proportion to engine rotation speed according to FIGS. 41 and 42.

With regard to a vehicle having a conventional mechanical transmission, a target speed change ratio T is determined as the speed change stage appointed by an operator. The target speed change ratio T is fixed regardless of engine rotation speed, as shown in a dashed line of FIG. 41*a*. Therefore, the vehicle speed changes in proportion to the engine rotation speed. Since a small vehicle speed (V in FIG. 41*b*) is ensured even while the engine is idling, the clutch must be slid (i.e., half-clutched) at the time of inching for attachment or detachment of the working machine, thereby requiring complicated and practiced operation.

On the contrary, in the present transmission, the target speed change ratio can be arbitrarily set by the controller 90. For example, the speed change target value may be changed in proportion to the engine rotation speed as drawn in a full line of FIG. 41*a*. More specifically, if the engine is idling, the target speed change ratio is made to be a value T0, which is 10 percent of the target speed change ratio T determined by the main speed change lever 84 and the sub speed change switch 87. The target speed change ratio is set so as to increase in proportion to the engine rotation speed so as to reach the value T when the engine rotation speed reaches a value n. Accordingly, as shown in FIG. 41*b*, while the engine rotation speed is lower than the value n, the vehicle speed can be lower than that caused by a mechanical transmission, thereby facilitating for easy inching for attachment or detachment of the working machine.

However, if the speed change ratio changes immediately in reaction to change of the engine rotation speed, the speed change ratio changes sensitively in response to the operation of an accelerator pedal 38 for changing the engine rotation speed, whereby the vehicle awkwardly moves if the work by the machine requires frequent change of the engine rotation speed.

Therefore, the engine rotation speed controlled while the vehicle is traveling is provided with a dead band so that the speed change ratio is not changed if the increase or decrease of engine rotation speed is within a certain range, thereby smoothing traveling of the vehicle.

Namely, as shown in FIG. 41*a*, while the engine rotation speed of the traveling vehicle is decreased from a point A to a point B, the speed change ratio is not changed. While the engine rotation speed of the traveling vehicle is decreased from the point B to a point C corresponding to the engine idling, the speed change ratio is decreased at a certain gradient. In this case, the change of engine rotation speed between the points A and B serves as the dead band.

At the point C, the engine is kept idling at the low speed for a predetermined time. Then, the speed change ratio is reduced to a starting speed change ratio $T_0$ at a point E. Otherwise, the engine rotation speed is increased from the point C while keeping the constant speed change ratio during a predetermined time, and after the increased engine rotation speed reaches a point D so that the increase thereof corresponds to the dead band range, the speed change ratio is increased at the certain gradient from the point D.

As mentioned above, the engine rotation speed in relative to the speed change ratio is provided with the dead band so that, if the engine rotation speed is changed within the dead band, the speed change ratio is fixed, whereby the change of speed change ratio is prevented from being excessively sensitive to the operation of speed change operation means such as the accelerator pedal 38. Therefore, the frequent small change of engine rotation speed is prevented, whereby the vehicle travels smoothly.

Next, explanation will be given on control shown in FIG. 42. Conventionally, the accelerator pedal 38 is depressed so as to change the main speed change ratio to a value directed by the main speed change lever 84. For stopping the vehicle, the main speed change lever 84 and the clutch pedal 85 are operated so as to decrease the speed change ratio to the starting speed change ratio $T_0$, and then, the brake pedal 35 is depressed to stop the vehicle. In this way, the HST is set in neutral state when the vehicle becomes stationary.

Stopping of the vehicle requires such a complicated operation of the pedals and levers with feet and hands. Especially, if the vehicle is a tractor, the drive torque is larger than the brake torque applied on the output shaft 27, whereby the vehicle can not stopped even if the brake pedal 35 is depressed.

Then, as shown in FIG. 9, a switch 137 for switching normal traveling to "neutral mode" traveling is provided on the brake pedal 35. During idling of the engine, if the brake pedal 35 is depressed, the switch 137 is simultaneously switched to set the "neutral mode" traveling, whereby the HST is set into neutral state, i.e., the HST swash plate is moved to stop the motor output shaft 26 after a while.

Incidentally, the switch 137 is electrically connected to the controller 90 so as to output a signal of its "ON" state to the controller 90.

Instead of operation of the main speed change lever 84, the vehicle is stopped by depressing both the brake pedal 35 and the switch 137 while the engine is idling. In the stationary vehicle, if the brake pedal 35 and the switch 137 in the stationary vehicle are released from depression and the accelerator pedal 38 is depressed for increasing engine speed, the speed change ratio can be changed to the target value set by the main speed change lever 84.

In this way, the target speed change ratio can arbitrarily be changed from the neutral value to the value T only by operating the accelerator pedal 38 and the brake pedal 35. Especially, at the time of inching for attaching or detaching the working machine to and from the front or rear portion of the vehicle, the vehicle traveling forward or backward can be slowed so as to facilitate for an operator's operation of the steering wheel and a manipulator for the working machine with his/her hands, whereby the operator can concentrate his/her attention on directing the vehicle to a position suitable for attachment and detachment of the working machine.

[3. Construction and Control Structure of Second Transmission (Traveling Forward/Backward Clutch Switching Type)]

<3-1. Construction of Second Transmission>

Next, explanation will be given of a construction of a mechanical transmission 30B applied to a second transmission which is a hydro-mechanical transmission using a clutch for switching the traveling direction of the vehicle between forward and backward, the second transmission 102, in accordance with FIGS. 43 to 45. As for a different point of the transmission 30B from the above-mentioned transmission 30, the transmission 30B has a forward/backward traveling switching mechanism 16. More specifically, although the transmission 30 depends on the rotation direction of the motor shaft 26 of the HST 21 for selecting either forward or backward traveling of the vehicle, the transmission 30B has the HST 20, whose output rotation direction is fixed, and the rear wheels 24 (the front wheels 124) selectively driven forward or backward depending upon whether a forward traveling drive train or a backward traveling drive train transmits the rotation of the main transmission output shaft 27 to the wheels 24 (or 124).

The transmission 30B is combined with the HST 21 and covered with the transmission casing 33. The same points of the transmission 30B with the transmission 30 are arrangement of power transmitting rotary shafts, i.e., the pump shaft 25, the motor shaft 26, the main transmission output shaft 27, the sub speed change driven shaft 28 and the PTO shaft 53, the HMT differential mechanism 10 provided on the main transmission output shaft 27 so as to be driven by output/input rotation difference of the HST 21, the power train from the main transmission output shaft 27 to the rear wheels 24 and the front wheels 124, and the power train from the pump shaft 25 to the PTO shaft 53.

A forward traveling gear 11 and a backward traveling gear 12 are loosely fitted on the main transmission output shaft 27 behind the differential mechanism 10. The forward traveling gear 11 is formed integrally with the ring gear 3 of the differential mechanism 10 in front thereof. A forward/backward traveling switch clutch 190 is disposed around the shaft 27 for alternatively engaging one of the gears 11 and 12 with the shaft 27.

A sleeve 7 is relatively rotatably disposed around the pump shaft 25, and gears 7a and 7b are formed on front and rear portions of the sleeve 7, the gear 7a directly engages with the gear 11 on the shaft 27, and the gear 7b engages with the gear 12 on the shaft 27 through a reverse gear 15 provided on another shaft disposed in parallel to the shafts 25 and 27, thereby constituting the forward/backward traveling switch mechanism 16.

By sliding a slider 80 longitudinally, the forward/backward traveling switching clutch 190 can switch the main transmission output shaft 27 among a state of engaging with only the gear 11 (F), a state of engaging with only the gear 12 (R) and a state of engaging with neither the gear 11 nor the gear 12 (N).

In an alternative embodiment shown in FIGS. 46 to 48, instead of the slide clutch 190, a hydraulic clutch device 19 is disposed around the main transmission output shaft 27 so as to serve as a clutch of the forward/backward traveling switch mechanism 16. The clutch device 19 has a forward traveling hydraulic clutch 19a interposed between the forward traveling gear 11 and the shaft 27, and a backward traveling hydraulic clutch 19b interposed between the backward traveling gear 12 and the shaft 27. Electromagnetic valves 93a and 93b are connected to the controller 90 so as to hydraulically control the respective hydraulic clutches 19a and 19b so that either the hydraulic clutch 19a or 19b is engaged or both of them are disengaged. The control of the clutches 19a and 19b, that is, control of the electromagnetic valves 93a and 93b depends on detection of the position of the main speed change lever 84 by the detector 84a. When the vehicle travels forward, the clutch 19a is engaged and the clutch 19b is disengaged (this clutch state is referred to as a forward traveling mode). When the vehicle travels backward, the clutch 19a is disengaged and the clutch 19b is engaged (backward traveling mode). For stopping the vehicle or another purpose, both of the clutches 19a and 19b are disengaged to prevent power from being transmitted to the front and rear wheels 24 and 124.

As for the same point of this embodiment with the above-mentioned embodiment shown in FIGS. 43 to 45, the sleeve 7 having the gears 7a and 7b thereon is relatively rotatably disposed around the pump shaft 25, the gear 7a engages with the forward traveling gear 11, and the gear 7b engages with the backward traveling gear 12 through the reverse gear 15 so as to constitute the backward traveling gear train.

Additionally, in the embodiment shown in FIGS. 46 to 48, a clutch 26a is interposed between the motor shaft 26 and the gear 9 so as to establish a state whether power is transmitted from the hydraulic motor 23 of the HST 21 to the main transmission output shaft 27 or not.

In both of the embodiment shown in FIGS. 43 to 45 and the embodiment shown in FIGS. 46 to 48, the output rotation of the differential mechanism 10 caused by output/input rotation difference of the HST 21 (rotation of the ring gear 3) is transmitted to the main transmission output shaft 27. Namely, power is transmitted only when the HMT mode is established, i.e., power is not transmitted when the HST mode is established. Instead of the control of HST swash plate angle (that is, changing of rotation speed of the motor shaft 26), the forward/backward traveling switch mechanism 16 is provided in the mechanical transmission 30B so as to switch the traveling direction of the vehicle is switched between forward and backward. The means for controlling the HST swash plate angle for adjusting the HST speed change ratio is merely provided for controlling HMT output rotation speed in one direction.

Description will be given of power transmission in each of the forward traveling mode and the backward traveling mode established in the transmission 30B.

When the forward traveling mode is set, the forward traveling gear 11 integrated with the ring gear 3 of the differential mechanism 10 engages with the main transmission output shaft 27 so as to transmit rotation of the ring gear 3, i.e., output rotation of the differential mechanism 10 to the shaft 27. On the other hand, the backward traveling gear 12 is disengaged from the shaft 27. Accordingly, though the sleeve 7 engaging with the gear 11 is rotated integrally with the gear 11, the rotation is not transferred to the shaft 27. Therefore, the shaft 27 is rotated to drive the vehicle forward.

On the other hand, when the backward traveling mode is set, the gear 12 engages with the main transmission output shaft 27. At this time, the gear 11 is disengaged from the shaft 27, so that the rotation of the gear 11 integrated with the ring gear 3 is not directly transferred to the shaft 27, but is transferred to the sleeve 7 through the gear 7a. The rotation of the sleeve 7 is transmitted to the shaft 27 through the gears 7b, 15 and 12, thereby rotating the shaft 27 to drive the vehicle backward.

As mentioned above, according to this embodiment, the HST swash plate angle control is unrelated to switching of forward/backward traveling, and functions only for controlling the output rotation speed of the differential mechanism 10 (the ring gear 3) in one direction. Due to this, the main speed change lever 84 is provided with a shift range, which is extended in one direction to a maximum speed position MAX from the neutral position, as shown in FIG. 45. In addition, if the forward traveling rotation of the motor shaft 26 works for decelerating the ring gear 3 driven by the pump shaft 25 (on the contrary, the backward traveling rotation of the motor shaft 26 for accelerating the ring gear 3) similarly to the transmission 33, the neutral position of the main speed change lever 84 is set to a position corresponding to the maximum forward traveling speed position of the movable swash plate 22a, and the maximum speed position MAX is set to the maximum backward traveling speed position of the swash plate 22a.

A traveling direction switch lever 89 which can be switched among a forward traveling position F, a neutral position N and a backward traveling position R is provided for switching the traveling direction of the vehicle between forward and backward. When the lever 89 is set to the forward traveling position F, the gear 11 engages with the shaft 27 through the clutch 19 or 190. When the lever 89 is set to the backward traveling position R, the gear 12 engages the shaft 27. When the lever 89 is set to the neutral position N, both the gears 11 and 12 are disengaged from the shaft 27. A detector 89a such as a potentiometer is provided on the lever 89 so as to electrically detect the position of the lever 89. With regard to the embodiment of FIGS. 43 to 45, based on this detected electric signal, the electric valve 93 is controlled by output current from the controller 90 so as to drive a cylinder 94 as an actuator of the clutch slider 80, thereby engaging the clutch 19 with either the gear 11 or the gear 12 (or disengaging the clutch 19 from both the gear 11 and the gear 12). In addition, with regard to this embodiment, the speed change lever 89 may be connected to the clutch 19 via a mechanical link. With regard to the embodiment of FIGS. 46 to 47, the electromagnetic valves 93a and 93b are controlled so as to engage or disengage the respective clutch 19a and 19b, thereby establishing one of the forward traveling drive mode, the backward traveling drive mode and the neutral state. In this embodiment, the clutch pedal 85 similar to the above-mentioned pedal is also provided on the vehicle. By depressing the clutch pedal 85, the clutch 19a and 19b are disengaged and both the gears 11 and 12 are disengaged from the shaft 27, whereby the vehicle becomes neutral.

In both the embodiment of FIGS. 43 to 45 and the embodiment of FIGS. 46 to 48, the detectors 81, 82, 83, 87a, etc., similar to the above-mentioned detectors, are provided for the above-mentioned compensational control of HST speed change ratio and the like based on their detection.

<3-2. HST Output Control Following Forward/Backward Traveling Switch>

The relation of HST swash plate angle control in relative to vehicle speed will now be described in accordance with FIG. 49. In FIG. 49, the axis of abscissas designates vehicle speed V (for which rotation speed of the main transmission output shaft 27 may be substituted) with setting forward traveling speed into the positive and setting backward traveling speed into the negative. On the other hand, the axis of ordinates designates HST pump discharge amount (discharge amount of the hydraulic pump 22) substituted for HST swash plate angle. The pump discharge amount set for decelerating the output rotation of the differential mechanism 10 (with regard to the HST 21 combined with the transmission 30, the pump discharge direction for rotating the motor shaft 26 to drive the vehicle forward) is positive. The pump discharge amount set for accelerating output rotation of the differential mechanism 10 (with regard to the HST 21 combined with the transmission 30, the pump discharge direction for rotating the motor shaft 26 to drive the vehicle backward) is negative.

As shown in a graph of FIG. 49, in each of the forward traveling mode and the backward traveling mode, when the HST discharge amount is plus A, that is, when the movable swash plate 22a is set to a maximum degree position of one of both sides of the neutral position, that is to say furthermore, when the main speed change lever 84 is set to the neutral position, the vehicle speed V is zeroed. When the HST discharge amount is minus A, that is, when the movable swash plate 22a is set to a maximum degree position of the other side, that is to say furthermore, when the main speed change lever 84 is set to the maximum speed position, the vehicle speed V becomes a maximum value Vm.

FIG. 50 schematizes this control structure. FIG. 51 shows a flow of this control.

Explanation will be given on FIG. 50. The rotation angle detection means 84a recognizes rotation angle of the main speed change lever 84, and rotation speed of the main transmission output shaft 27 is set corresponding to the rotation angle of the main speed change lever 84.

The detector 82 detects actual rotation speed of the main transmission output shaft 27. Then, the controller 90 compares the rotation speed of the shaft 27 corresponding to the rotation angle of the main speed change lever 84 with the actual rotation speed of the shaft 27 detected by the detector 82.

If the comparison results in that the rotation speeds are not in agreement or out of threshold, the hydraulic pump 22 of the HST 21 is controlled by the actuator 86.

FIG. 51 shows a control flow of HST speed change ratio in the second transmission 102. Compared with that of the first transmission 101 shown in FIG. 11, the mode-switching between the HMT mode and the HST mode is not done, and the control flow of the second transmission 102 is similar to that of the first transmission 101 constantly set in the HMT mode. The relation between the speed change ratio and the HST speed change ratio is uniform (the HMT speed change ratio is decreased in proportion to increase of the HST speed change ratio). Therefore, the control is easy.

Firstly, the rotation angle detection means 84a detects rotation position of the main speed change lever 84. Electric signal (or voltage) as the detected angle is inputted into the controller 90.

The controller 90 memorizes a map of rotation speed of the main transmission output shaft 27 corresponding to the rotational position (target value a) of the main speed change lever 84. Accordingly, the controller 90 calculates a target speed A of the shaft 27 corresponding to the rotational position (target value a) of the main speed change lever 84, and is informed of a rotation speed B of the shaft 27 detected by the detector 82.

The speed A is compared with the speed B, and based on the result, the control direction of the actuator is determined. If the speed A is equal to the speed B (A=B), the swash plate 22a of the hydraulic pump 22 of the HST 21 is not controlled.

If the speed A is larger than the speed B (A>B), the actuator 86 moves the swash plate 22a so as to increase its angle. Namely, the HST speed change ratio is increased and the main speed change ratio is decreased, whereby the rotation speed of the main transmission output shaft 27 is decreased to approach the target speed A.

If the speed A is smaller than the speed B (A<B), the actuator 86 moves the swash plate 22a so as to decrease its angle. Namely, the HST speed change ratio is decreased and the main speed change ratio is increased, whereby the rotation of the main transmission output shaft 27 is increased so as to approach the target speed A.

The degree of movement of the swash plate 22a by the actuator 86 depends upon the command from the controller for increasing or decreasing its angle, and it may be fixed or a variable correspond to the difference between the speeds A and B.

If the movement degree of the swash plate 22a is fixed, the swash plate angle is changed at a constant degree every the comparison, and the control is continued until the speeds A and B become equal. In this case, the control system of swash plate angle is simple.

If the movement degree of the swash plate 22a is changed every time so as to correspond to the difference between the speeds A and B, the speed control is expedited and becomes more accurate.

In the controller 90 is mapped the relation of HST output rotation to vehicle speed, as shown in FIG. 49. The controller 90 controls the swash plate 22a of the HST pump 22 while monitoring actual rotation speed of the main transmission output shaft 27 for obtaining the speed set by the main speed change lever 84.

Description will now be given of control of the swash plate of the hydraulic pump 22 in association with operation of the forward/backward travel switch lever 89 in accordance with FIGS. 52 and 53.

FIG. 52 shows change of HST swash plate angle in the case of switching the forward/backward travel switch lever 89 between the neutral position and the forward traveling position while the main speed change lever 84 is held in a fixed position.

The main speed lever 84 is held in a fixed position $D_1$.

When the forward/backward travel switch lever 89 is located in the forward traveling position F, the HST swash plate angle is set to a degree $\theta_1$ so as to obtain a HST speed change ratio for obtaining a vehicle speed (main speed change ratio) corresponding to the set position $D_1$ of the lever 84. On the other hand, when the lever 89 is located in the neutral position N, the HST swash plate angle is set to a degree $\theta_0$ so as to obtain an HST speed change ratio for zeroing the vehicle speed (main speed change ratio), that is, so as to obtain an HST speed change ratio for stopping rotation of the main transmission output shaft 27. Namely, when the forward/backward travel switch lever 89 is set in the neutral position, the second transmission 102 does not only set the clutch 19 (190) into neutral, but also stops rotation of the main transmission output shaft 27 upstream of the clutch 19. Accordingly, when the lever 89 is turned from the neutral position N to the forward traveling position F and the clutch 19 is engaged, the friction disks fitting the main transmission output shaft 27 are braked or frictionally rotated at low speed, thereby moderating the engaging of the clutch. Therefore, shocking sudden change of torque is suppressed so as to smooth the speed change operation.

In FIG. 52, at the timing $t_1$, the forward/backward travel switch lever 89 is rotated from the neutral position N to the forward traveling position F, and the electromagnetic valve 93 engages the forward traveling clutch 19a. Simultaneously, by the actuator 86, the swash plate 22a is rotated from the predetermined angle $\theta_0$, and reaches the angle $\theta_1$ corresponding to the set position of the main speed change lever 84 at the timing $t_2$. In the meantime, the main speed change ratio is increased, and the vehicle speed is increased to the speed corresponding to the set position $D_1$.

At the timing $t_3$, the forward/backward travel switch lever 89 is rotated from the forward traveling position F to the neutral position N, whereby the electromagnetic valve 93 disengages the forward traveling clutch 19a. Simultaneously, by the actuator 86, the swash plate 22a is rotated from the predetermined angle $\theta_1$ corresponding to the set position of the main speed change lever 84, and reaches the angle $\theta_0$ for zeroing the main speed change ratio (zeroing the vehicle speed, and setting the pump discharge amount $P_0$ shown in FIG. 49) at the timing $t_4$.

The control flow of FIG. 51 facilitates for rotation of the swash plate of the HST 21.

The controller 90 may be so constructed as to calculate the times for controlling the swash plate between the timings $t_1$ and $t_2$ and between the timings $t_3$ and $t_4$ so as to correspond to the vehicle speed.

Accordingly, even if the forward/backward travel switch lever 89 is suddenly operated, load applied on the transmission mechanism can be reduced, and speed change operation can be smoothed.

When the lever 89 is turned between the neutral position N and the backward traveling position R, similar control is done so as to smooth speed change operation.

The switching the forward/backward travel switch lever 89 between the forward traveling position F and the backward traveling position R without setting the main speed change lever 84 to the neutral position is the most important thing to be considered.

For example, it is assumed that the lever 89 is switched from the forward traveling position F to the backward traveling position R when the vehicle travels at a speed Vn. At this time, the clutch 19 or 190 electrically controlled based on an electric signal about the detected position of the lever 89 is not suddenly switched to its backward traveling position. Firstly, the HST swash plate angle is controlled so as to increase the HST discharge amount (when the amount value is negative, it is substituted by a corresponding positive value) while keeping the forward traveling mode, thereby reducing the vehicle speed V. When the HST discharge amount reaches +A, the vehicle speed V is zeroed. At this time, the clutch 19 or 190 is switched to the backward traveling mode. The swash plate 22a is moved so as to decrease the pump discharge amount from the value +A for increasing the backward traveling vehicle speed −V, thereby obtaining a backward traveling vehicle speed −Vn.

Accordingly, if forward/backward travel switch lever 89 is operated to switch the traveling direction while keeping the main speed change lever 84 in a certain speed setting position, the clutch 19 or 190 is switched after output rotation of the HMT is stopped, and after the switching of clutch, the backward traveling speed of the vehicle is increased to the set value. Therefore, shocking sudden switching of traveling direction is prevented, thereby ensuring comfort and safety of the vehicle and preventing hydraulic oil from deteriorating. Conversely, smooth switching of traveling direction can be done only by switching operation of the forward/backward travel switch lever 89 without returning the main speed change lever 84 to the neutral position.

Referring to FIG. 53, speed change control when the forward/backward travel switch lever 89 is switched from the forward traveling position F to the backward traveling position R, or from the backward traveling position R to the forward traveling position F will now be described.

When the main speed change lever 84 is kept in a fixed position and the lever 89 is in the forward traveling position F, the forward traveling clutch 19*a* is engaged and the backward traveling clutch 19*b* is disengaged. The swash plate 22*a* of the hydraulic pump 22 of the HST 21 is kept in the angle $\theta_1$ corresponding to the set position of the main speed change lever 84.

When the forward/backward travel switch lever 89 is operated from the forward traveling position F to the backward traveling position R at the timing $t_1$, the swash plate 22*a* is rotated to the angle $\theta_0$ for zeroing the vehicle speed.

When the swash plate 22*a* reaches the swash plate angle $\theta_0$ and the main speed change ratio is zeroed (the vehicle speed is zeroed) at the timing $t_2$, the backward traveling clutch 19*b* is engaged.

Following this, the forward traveling clutch 19*a* is disengaged at the timing $t_3$. The swash plate 22*a* of the hydraulic pump 22 is rotated since the timing $t_3$ and reaches the angle $\theta_1$ corresponding to the set position of the main speed change lever 84.

The same is said about the case of switching the lever 89 from the backward traveling position R to the forward traveling position F.

When the forward/backward travel switch lever 89 is operated from the backward traveling position R to the forward traveling position F at the timing $t_4$, the swash plate 22*a* is rotated to the angle $\theta_0$ for zeroing the vehicle speed.

When the swash plate 22*a* of the hydraulic pump 22 reaches the angle $\theta_0$ and the main speed change ratio is zeroed (the vehicle speed is zeroed) at the timing $t_5$, the forward traveling clutch 19*a* is engaged.

The backward traveling clutch 19*b* is disengaged at the timing $t_5$. The swash plate 22*a* of the hydraulic pump 22 is rotated since the time $t_5$ and reaches the angle $\theta_1$ corresponding to the set position of the main speed change lever 84.

In the above construction, when the traveling direction is switched between forward and backward, a time for disengaging both of the forward traveling clutch 19*a* and the backward traveling clutch 19*b* (drawn as a hatched area in FIG. 53) is ensured.

Due to the above speed change control, speed change operation is smoothed and power isolation does not occur in the transmission when the switching of forward/backward traveling is done, and even if the switching is done for a vehicle staying on a slope.

<3-3. HST Swash Plate Angle Control Dealing with Stoppage of the Vehicle on Inclined Ground>

Description will now be given of control for stopping the vehicle when the forward/backward travel switch lever 89 is set in the neutral position N with reference to FIGS. 54 and 55.

According to the present invention, the vehicle is kept in stationary while the forward/backward travel switch lever 89 is set in the neutral position N.

The vehicle speed is found by monitoring rotation of a drive shaft connected to the HST 21 or rotation of shafts rotated following the rotating wheels. The vehicle speed is zeroed by operating the HST 21 of the HMT mechanism.

As shown in FIG. 54, it is necessary for keeping a stationary working vehicle on a slope to apply a driving force reacting against gravity.

To be held in stationary on a slope, an upward facing vehicle as shown in FIG. 54 (*a*) should have a forward driving force, and a downward facing vehicle as shown in FIG. 54 (*b*) should have a backward driving force.

Namely, for keeping a stationary vehicle, which tends to move by gravity, a driving force should be applied to the vehicle opposite to its movement direction by gravity.

As mentioned above, the detector 82 for detecting rotation speed of the output shaft 27 is provided in the vicinity of the output shaft 27 for transmitting driving force to the rear wheels 24 so as to inform the controller 90 of the rotational direction and speed of the output shaft 27.

FIG. 55 (*a*) shows relation of discharged oil amount to vehicle speed in normal traveling. FIG. 55 (*b*) shows relation of discharged oil amount to vehicle speed when engaging the forward traveling side clutch 19*a*. FIG. 55 (*c*) shows relation of discharged oil amount to vehicle speed when engaging the backward traveling side clutch 19*b*.

As mentioned above, according to the present invention, the main speed change ratio is controlled by controlling the speed change ratio of the HST 21.

When the vehicle normally travels, as shown in FIG. 55 (*a*), surplus oil discharged from the hydraulic pump 22 over an amount $P_0$ is not used, the forward/backward traveling switch clutch 19 is controlled for speed changing.

Namely, in the normal traveling, discharged oil in a quantity range $F_f$ is not used when the forward traveling clutch 19*a* is engaged, and discharged oil in a quantity range $F_r$ is not used when the backward traveling clutch 19*b* is engaged.

However, when the working vehicle is stopped on a slope, the swash plate of the hydraulic pump 22 of the HST 21 is controlled so as to use the discharged oil in the quantity range ranges $F_f$ or $F_r$, instead of operating the forward/backward traveling clutch.

When the forward traveling clutch 19*a* is engaged, the swash plate 22*a* of the hydraulic pump 22 of the HST 21 is controlled so as to follow a bold line shown in FIG. 55 (*b*), thereby applying a forward or backward driving force to the vehicle. A stationary vehicle can do well by using the range enclosed by the dotted lines in FIG. 55 (*b*), which is sufficient because the vehicle does not require large driving force.

Similarly, when the backward traveling clutch 19*b* is engaged, the HST is controlled so as to follow a bold line within a range enclosed by dotted lines in FIG. 55 (*c*), thereby causing a forward or backward driving force for keeping the vehicle on a slope in stationary.

Namely, while the forward/backward travel switch lever 89 is positioned in the neutral position and either the forward traveling clutch 19a or the backward traveling clutch 19b is engaged, the vehicle is stopped by controlling the swash plate 22a.

As mentioned above, based on the rotational direction and speed of the output shaft 27 detected by the detector 82 in the vicinity of the output shaft 27, a swash plate angle for causing the resistant driving force for stopping the vehicle is calculated by the controller 90 and established by controlling the actuator 86.

Due to the above, when the vehicle is stationary on a flat ground, the angle of the swash plate 22a is set for establishing an amount $P_0$ of discharged oil. When the vehicle is stopped on a slope, the angle of the swash plate 22a for causing a force required for stopping the vehicle on the slope is kept.

Unless the angle of the swash plate 22a is set for establishing the discharged oil amount $P_0$, the disengaging of the forward/backward traveling switch clutch 19 for stopping the vehicle may be canceled. Alternatively, either the forward traveling clutch 19a or the backward traveling clutch 19b may be engaged and the swash plate 22a is controlled so as to stop the output shaft 27 if the controller 90 constantly monitoring the rotation of the output shaft 27 detects that the output shaft 27 is rotated even while setting the forward/backward travel switch lever 89 in the neutral position.

Accordingly, the vehicle can be stopped easily on a slope without requiring complicated operation for an operator. It is unnecessary for starting the vehicle to engage the clutch 19, thereby improving responsibility of operation and smoothing start of the vehicle.

<3-4. HST Compulsive Neutral Return Mechanism for Urgent Escape with Regard to the Second Transmission>

When the controller 90 or at least one of the hydraulic pump 22 and the hydraulic motor 23 of the HST 21 breaks down and the HST 21 becomes uncontrollable, an emergency traveling mechanism for forcibly returning the HST to the neutral position can be actuated in association with operation of the forward/backward travel switch lever 89 and with controlling of engine speed so as to drive the vehicle temporary for its escaping from a field.

The emergency traveling mechanism will now be described.

Firstly, the rotating motor output shaft 26 extended backward from the hydraulic motor 23 of the HST 21 is forcibly braked so as not to transmit its rotation to the planetary gear mechanism 10 and the output shaft 27, and so as to brake the sun gear 1 of the planetary gear mechanism 10.

For example, as shown in FIG. 56, a rigid stick 102 replacing the detector 81 is inserted into a hole 33d bored on the transmission casing 33 and engaged with the gear 9 on the motor shaft 26, thereby forcibly braking the rotating gear 9. Thus, the sun gear 1 engaging with the gear 9 via the gear 6 is fixed. Incidentally, the stick 102 is made of material having resistance against the rotational force of the motor shaft 26 so as to be prevented from being broken or damaged during its emergency operation.

Corresponding to a vehicle speed (forward traveling speed) $V_1$ (or backward traveling speed $-V_1$) in FIG. 49, the amount of oil discharged by the hydraulic pump 22 is zeroed, that is, the angle of the movable swash plate 22a of the hydraulic pump 22 is zeroed. In the above-mentioned forcible neutral returning of the HST 21, the main speed change lever 84 and the sub speed change switch 87 are fixed to their positions for establishing the vehicle speed $V_1$ or $-V_1$ so as to prevent sudden change of the vehicle speed. Incidentally, the sub speed change switch 87 is fixed at a low speed position (Lo).

Alternatively, as shown in FIG. 57, an emergency electric circuit 99 may replace the controller 90. The emergency electric circuit 99 is provided with a connector 99a for closing the circuit 99 if needed. The emergency circuit 99 is ordinarily opened and electric signals flow without passing the circuit 99. When the connector 99a of the emergency circuit 99 is connected so as to close the electric circuit, electric signals preferentially flow through the emergency circuit 99.

When the gear 9 is forcibly braked as mentioned above, power of the engine 20 is transmitted to the transmission 30B only through the pump shaft 25 extended from the rear portion of the hydraulic pump 22. However, the angle of the movable swash plate 22a of the hydraulic pump 22 is zeroed, whereby power from the engine 20 is not changed in the HST 21.

On the other hand, power of the engine is inputted to the pump shaft 25 and transmitted to the differential mechanism 10 by engaging the input gear 8 disposed around the pump shaft with the gear 5a formed on the front portion of the carrier 5 loosely fitted on the main transmission output shaft 27. When the carrier 5 is rotated, the planetary gears 2 supported by the carrier 5 engaging with the sun gear 1 revolve around the braked sun gear 1. The ring gear 3 engaging with the planetary gears 2 transmits power to the forward traveling gear 11 rotating integrally with the ring gear 3.

When the forward/backward traveling switch clutch 19 (190) engages with the forward traveling gear 11, rotation of the forward traveling gear 11 is transmitted to the output shaft 27, and the output shaft 27 is rotated in the direction for driving the vehicle forward.

When the forward/backward traveling switch clutch 19 (190) engages with the backward traveling gear 12, the forward traveling gear 11 engages with the gear 7a formed on the front end of the sleeve 7 loosely fitted on the sleeve 25, thereby rotating the sleeve 7. The gear 7b formed on the rear end of the sleeve 7 transfers power to the backward traveling gear 12 through the reverse gear 15, thereby rotating the output shaft 27 in the direction for driving the vehicle backward.

As mentioned above, if the HST 21 becomes uncontrollable, the main transmission output shaft 27 is driven only by rotation force of the pump shaft 25 through the differential mechanism 10, whereby the vehicle can travel urgently. The forward or backward traveling direction can be selected by operating the forward/backward travel switch lever 89 for operating the forward/backward traveling switch clutch 19. Though the main speed change ratio (relative rotation speed of the shaft 27/the shaft 25) is fixed, the vehicle speed, that is, the rotation speed of the output shaft 27 can be adjusted by adjusting the rotation speed of the engine 20.

If the HST 21 or the controller 90 for controlling the HST 21 breaks down in the vehicle working in a field, it is difficult to disassemble and repair the transmission in the field. However, according to the present invention, the vehicle can be easily moved out from the field to a place facilitating for repair thereof, thereby improving working efficiency.

In addition, the above-mentioned HST compulsive neutral return mechanism may also be applied for the first transmission 101. In this case, the vehicle can travel similarly to the vehicle having the second transmission 102 in setting the HMT mode.

<3-5. Various Acceleration Rate Setting and Switches for Setting Modes Attached to the Main Speed Change Lever 84>

As shown in FIG. 58, a sub speed change switch 171 is provided on a thumb side of an upper portion of a grip 84b of the main speed change lever 84, and a four-wheel drive on/off switch 175 is provided on the opposite side thereof. An acceleration rate setting switch 173 is provided below the sub speed change switch 171 and comprises a switch 173a for increasing acceleration rate and a switch 173b for decreasing acceleration rate.

The switch 173a for increasing acceleration rate and the switch 173b for decreasing acceleration rate, which can automatically return to their initial position, are connected to the controller 90. Therefore, the controller 90 can arbitrarily adjust the set speed stage, i.e., the main speed change ratio.

By pushing the sub speed change switch 171, a signal is transmitted to the controller 90, whereby sub speed change is operated from low to high, or from high to low.

By pushing the switch 173a for increasing acceleration rate, the acceleration rate is increased shifted up to a higher step. By pushing the switch 173b for decreasing acceleration rate, the acceleration rate is shifted down to a lower step.

Namely, the main speed change lever 84 is also used for the switching and fine adjusting of the sub transmission speed, so that the operation part for traveling drive system is provided on only the main speed change lever 84, thereby improving operativity and work efficiency, and effectively using a space in the driver's section.

The acceleration rate setting switch 173 is not limited to the above. Instead of the switch 173a for increasing the set speed stage and the switch 173b for decreasing the set speed stage, a dial type switch 174 may be provided for adjusting the acceleration rate, as shown in FIG. 59. The dial type switch 174 outputs a signal to the controller 90 every degree of rotating the switch 174. The dial type switch 174 is rotated upward to a fixed degree for shifting up speed to one higher stage, and downward to a fixed degree for shifting down speed to one lower stage.

For example, as shown in FIG. 60, the acceleration rate setting switch 173 is provided with variation of acceleration rates 0 to 3. Values of main speed change ratios are assigned to the respective acceleration rates of the acceleration rate setting switch 173, and adjusted by the main speed change lever 84. For example, as shown in FIG. 60, the speed is increased in proportion to increase of the rotation angle of the main speed change lever 84. If the main speed change lever 84 is held at a position, the main speed change ratio is increased for increasing the speed by stepping up the acceleration rate from 0 to 3.

A mode switch is provided on a suitable position of the operation part so as to establish modes of the switches provided on the main speed change lever 84, thereby improving operativity. When the engine starts, the mode switch is pushed so as to establish an initial first mode, wherein the acceleration rate setting switch 173 is pushed to establish the minimum acceleration rate, the sub speed change switch 171 is pushed to establish the low speed stage, and the four-wheel drive on/off switch 175 is pushed to establish the two-wheel drive.

When the mode switch is set to establish a second mode, the switches 173, 171 and 175 are set to suit conditions just before the engine stops. The controller 90 has memorization means 172 for memorizing the set conditions of the switches 173, 171 and 175 so as to reproduce their set modes before stopping the engine. Therefore, resetting operation of the respective switches is not required for reproducing the set conditions of the switches used in the last work, thereby enhancing work efficiency.

It is now assumed that the mode switch is set to establish a third mode. Before a fixed time passes since the engine is stopped, the respective conditions set by the switches 173, 171 and 175 before stopping the engine can be reproduced by pushing the switches 173, 171 and 175 at the time of starting the engine. After passing the fixed time, the acceleration rate setting switch 173 is pushed to establish the minimum acceleration rate, the sub speed change switch 171 is pushed to establish the low speed stage, and the four-wheel drive on/off switch 175 is pushed to establish the two-wheel drive. Accordingly, if it is a short time for stopping the engine for recess or fuel supply, it is unnecessary to set respective conditions again at the time of restarting work, thereby enhancing work efficiency.

However, the set conditions of the switches 173, 171 and 175 are usually initialized at the time of stopping the engine. Therefore, even if any of the switches is operated accidentally at starting work, speed is set to its minimum so as to ensure safety.

Instead of the mode switch for changing the set conditions of the respective switches 173, 171 and 175, every mode may be assigned to by each of individual switches provided on the operation part to be controlled by the controller 90. Any mode is established by the switches. For example, in one mode, a switch is provided for resetting the initial conditions, another switch is for reproducing the set conditions at the last work, and another switch is for measuring a fixed time after engine stopping wherein the conditions set at the last work are held before passage of the fixed time, and the conditions are initialized after passage of the fixed time.

In another mode, the switches are assigned to different operators requiring different settings, respectively. In this mode, for example, a switch is provided for resetting the initial conditions, another switch suits a first operator, and another switch suits a second operator. In another mode, the switches are assigned to respective working machines requiring different settings. In this mode, for example, a switch is provided for resetting the initial conditions, another switch suits a rotary cultivator, and another switch suits a fertilizer. Alternatively, a switch similar to the above mode switch may be provided for selecting one of these modes, wherein the setting of the switches 173, 171 and 175 in each mode is different from the setting thereof in other mode.

<3-6. Interlock of Parking Brake with the Forward/Backward Traveling Switch Clutch>

Description will now be given of a parking brake device.

As shown in FIGS. 61 and 62, a parking brake mechanism 36 is constructed in a rear wheel drive system including the output shafts 75 so that, when a parking brake lever 72 is pulled up, a wire 78 is operated so as to make a brake pad 76 pinch a brake disc 75a fixed on each of the output shafts 75, thereby braking the corresponding rear wheel 24. Each set of the brake disc 75a and brake pad 76 is provided to each of the right and left output shafts 75, whereby the right and left rear wheels 24 are braked by the parking brake lever 72.

On the contrary, when the parking brake lever 72 is pushed down, the brake discs 75a are released from the respective brake pads 76 by biasing force of respective biasing members 77, thereby releasing brakeage on the rear wheels 24. Means for actuating the brake pads 76 for braking the rear wheels 24 is not limited to the wire 78. A hydraulic caliper controlled by an electromagnetic valve or the like may be alternatively used.

The parking brake lever 72 is provided in the vicinity of the driver's seat of the vehicle. A rotation angle detector (e.g., a potentiometer) 72a is disposed on a pivoted part of the parking brake lever 72 so as to detect an operation position of the parking brake lever 72.

The rotation angle detector 72a is connected to the controller 90. When the parking brake lever 72 is pulled up, a signal is transmitted from the rotation angle detector 72a to the controller 90, whereby the controller 90 disengages the clutch and lights up an indicator provided in the operation part so as to display the neutral state (the state that the clutch 19 or 190 is neutral).

Instead of detection of operation (rotational angle) of the parking brake lever 72 as mentioned above, display of the neutral state of the forward/backward traveling switch clutch 19 (190) may depend on detection of their state. Further alternatively, the display may depend upon detection of the state (positions or pressure) of the electromagnetic valves 93 and 94 for operating the clutch, or upon detection of the state (of disengaging the clutch by the electromagnetic valves 93 and 94) grasped by the controller 90.

Accordingly, power transmission is surely cut off at the time of actuating the parking brake, so that the vehicle is prevented from starting its traveling while applying the parking brake, and reduces abrasion of the brake disks 75a. The neutral returning operation of main speed change lever 84 or the like is not required, thereby improving operativity.

If the rotation angle of the raised parking brake lever 72 exceeds a fixed value, the rotation angle detector 72a transmits a signal to the controller 90 so as to disengage the clutch.

In this construction, the rotation angle of the raised parking brake lever 72 not more than the fixed value serves as its play for keeping the vehicle in neutral without brakeage.

Namely, while the parking brake lever 72 is rotated within the play range, the forward/backward traveling switch clutch 19 is disengaged so as to keep the vehicle in neutral without applying the parking brake.

Accordingly, an operation part, such as a switch, for keeping the vehicle in the neutral state is not required, thereby saving a parts count. The vehicle set in neutral without brakeage can be drawn for maintenance etc.

Alternatively, a main clutch may be provided in addition to the forward/backward traveling switch clutch 19 (190) so as to be engaged/disengaged in association with operation of the parking brake.

The parking brake may be also applied to the first transmission 101. If the above-mentioned neutral state corresponds to the neutral state of the main speed change clutch device 130 (the state that both of the clutches 13 and 14 are disengaged), the above-mentioned association of neutral control with operation of the parking brake is achieved in the first transmission 101. Further, the first transmission 101 may have a main clutch provided in addition to the main speed change clutch device 130 interlocked with the parking brake.

After the clutch is disengaged as mentioned above and a fixed time passes, the actuator 86 is controlled to zero the swash plate angle, thereby stopping the hydraulic motor 23 of the HST 21. With regard to the second transmission 102, the drive mode is always the HMT mode, whereby the swash plate angle of the hydraulic pump 22 is not zero when vehicle speed is zero. Namely, when the actuation of the parking mechanism 36 is informed of by detecting rotation of the parking brake lever 72, the clutch is disengaged, and then, drive of the HST 21 is stopped.

The construction of controlling HST swash plate angle at the time of parking will now be described in accordance with FIG. 64.

As shown in FIG. 64 (a), the hydraulic pump 22 of the HST 21 is kept in a position in which the amount of discharged pressure oil is $P_0$ while the vehicle is stationary. Namely, the hydraulic motor 23 of the HST 21 is driven while the swash plate 22a of the hydraulic pump 22 is held at a certain tilt angle.

In this state, the parking brake lever 72 is pulled up and after passage of a fixed time, the swash plate 22a is controlled so as to reduce the discharge amount of the hydraulic pump 22 of the HST 21 as shown in FIG. 64 (b). Finally, as shown in FIG. 64 (c), discharge amount of the hydraulic pump 22 reaches zero, whereby drive of the hydraulic motor 23 of the HST 21 is stopped.

A vehicle should be essentially driven with setting a main speed change ratio for establishing the vehicle speed $V_1$ (FIG. 49) in the state shown in FIG. 64 (c). However, the clutch is disengaged before controlling the swash plate 22a of the HST 21, whereby the wheels are not driven.

Accordingly, the HST 21 is stopped while parking, thereby reducing load applied on the HST 21. Furthermore, while parking, noise is reduced, fuel consumption is saved, and oil pressure rise in the hydraulic circuit of the HST 21 is reduced, thereby improving durability of the whole transmission.

In the above-mentioned construction, if the parking brake lever 72 is kept at the parking position for a certain time, it is presumed that no operation will be done in the vehicle for the time being. Based on this presumption, the HST 21 is controlled so as to reduce noise, load applied on the hydraulic circuit, and fuel consumption. In detail, if the parking brake lever 72 is turned on, a timer of the controller 90 functions (otherwise, non-operation time is integrated), and if operation is not done after fixed time, the clutch is disengaged and drive of the hydraulic motor 23 of the HST 21 is stopped.

As shown in FIG. 63, a seat switch 55a serving as means for presuming that no operation will be done in the vehicle for the time being is disposed in the seat 55. The seat switch 55a connected to the controller 90 is turned on/off depending on whether an operator is seated on the seat 55 or not, whereby existence/absence of an operator is cognized and drive of the hydraulic motor 23 of the HST 21 is stopped.

Namely, if the controller 90 cognizes continuation of the state that an operator is not seated for a fixed time by detecting the state of the seat switch 55a, the clutch is disengaged and drive of the hydraulic motor 23 of the HST 21 is stopped. The parking brake mechanism 36 may be also actuated simultaneously.

Instead of the seat switch 55a, an infrared sensor serving as means for cognizing existence/absence of an operator may be disposed in the vicinity of the seat 55.

Alternatively, if the controller 90 cognizes continuation of the state that the forward/backward travel switch lever 89 is in the neutral position (N) or the main speed change lever 84 is in the stop position (0) for the fixed time, the parking brake mechanisms 36 are actuated, the clutch is disengaged and drive of the hydraulic motor 23 of the HST 21 is stopped.

As mentioned above, while a working vehicle having the transmission, in which the differential mechanism 10 combines a driving force speed-changed by the HST 21 with a driving force through the differential mechanism 10 from the engine 20, is parked, loss of driving force, fuel consumption and load applied on a hydraulic circuit can be reduced.

<3-7. Construction of a Lever Used for Both Main Speed Change and Forward/Backward Travel Switching>

Description will now be given of a single speed change lever 100 serving as combination of the forward/backward travel switch lever 89 and the main speed change lever 84 with reference to FIGS. 65 and 66.

In this embodiment, the speed change lever 100 is used for both forward/backward travel switching and speed control. As shown in FIG. 65, a rotation angle detector 100a is disposed on a basal portion of the speed change lever 100, and the controller 90 is constructed to recognize the angle of the speed change lever 100.

As shown in FIG. 66, the speed change lever 100 is inserted into a guide slot consisting of a longitudinal forward traveling slot 106, a lateral neutral slot 104 and a longitudinal backward traveling slot 105. The guide slot restricts rotation direction of the speed change lever 100.

With respect to the vehicle body, the neutral slot 104 is connected at its inward side to the forward traveling slot 106, and at its outward side to the backward traveling slot 105. Accordingly, the speed change lever 100 is prevented from suddenly moving from a forward traveling position to a backward traveling position.

The position of the speed change lever 100 is cognized by the controller 90 so as to control the swash plate of the HST 21 and the clutch for switching forward/backward traveling direction.

If the speed change lever 100 is positioned in the neutral slot 104, the clutch 19 of the forward/backward traveling switch mechanism 16 is disengaged so as to cut off transmission of driving fore.

If the speed change lever 100 is positioned in the forward traveling slot 106, the clutch 19 of the forward/backward traveling switch mechanism 16 is engaged for forward traveling, and the actuator 86 controls the swash plate 22a of the HST 21 to an angle corresponding to position of the speed change lever 100. If the speed change lever 100 is positioned in the backward traveling slot 105, the clutch 19 of the forward/backward traveling switch mechanism 16 is engaged for backward traveling, and the actuator 86 controls the swash plate 22a of the HST 21 to an angle corresponding to position of the speed change lever 100.

Namely, the controller 90 finds a target value based on the position of the speed change lever 100 and electronically controls the HST swash plate 22a and the clutch 19 for forward or backward traveling of the vehicle.

Accordingly, speed change and forward/backward travel switching can be easily and smoothly done by operation of only a single lever (the speed change lever 100).

INDUSTRIAL APPLICABILITY

The present invention is suitable for a hydraulic drive vehicle having an HST, especially having a HMT, such as an agricultural tractor, and can control HST swash plate angle optimally corresponding to various conditions so as to improve fuel economy and durability of parts.

What is claimed is:

1. A hydraulic drive vehicle, comprising:
   speed change operation means;
   a hydraulic transmission having a swash plate;
   an actuator, wherein a slant angle of the swash plate is changed via the actuator corresponding to operation of the speed change operation means so as to change an output/input rotation speed ratio of the hydraulic transmission;
   an axle;
   a drive shaft interlocking with the axle; and
   rotation speed detection means for detecting a rotation speed of the drive shaft interlocking with the axle, wherein a target rotation speed of the drive shaft is set to a value corresponding to the slant angle of the swash plate set by operation of the speed change operation means, and wherein, if a rotation speed of the drive shaft detected by the rotation speed detection means differs from the target rotation speed, the slant angle of the swash plate is compensatively controlled via the actuator.

2. A hydraulic drive vehicle according to claim 1, wherein a compensational degree of the swash plate slant angle is detected as load applied on the hydraulic transmission.

3. A hydraulic drive vehicle according to claim 1, wherein a compensational operation degree of the actuator is detected as load applied on the hydraulic transmission.

4. A hydraulic drive vehicle according to claim 1, further comprising:
   a PTO shaft, wherein a value of load applied on the PTO shaft is calculated based on load applied on the hydraulic transmission and load applied on an engine.

5. A hydraulic drive vehicle according to claim 1, further comprising:
   a differential mechanism which combines rotation powers of input side and output side of the hydraulic transmission, wherein an output shaft of the differential mechanism serves as the drive shaft whose rotation speed is detected by the rotation speed detection means.

6. A hydraulic drive vehicle, comprising:
   speed change operation means;
   a hydraulic transmission having a swash plate;
   an actuator, wherein a slant angle of the swash plate is changed via the actuator corresponding to operation of the speed change operation means so as to change an output/input rotation speed ratio of the hydraulic transmission; and
   a differential mechanism which combines powers of input side and output side of the hydraulic transmission, wherein a drive mode of the vehicle can be switched between a mode setting output of the hydraulic transmission without passing the differential mechanism as traveling drive power and a mode setting output of the differential mechanism as traveling drive power, and the actuator is controlled so as to reduce a change rate of the swash plate position at the time of switching the drive mode while moving the movable swash plate to a set target position of the swash plate.

7. The hydraulic drive vehicle according to claim 1, wherein:
   the hydraulic transmission includes a hydraulic pump and a hydraulic motor provided with respective movable swash plates, and
   wherein the actuator is an electronic actuator for moving one of the movable swash plates of the hydraulic pump and the hydraulic motor so as to change an output/input rotation speed ratio of the hydraulic transmission, the electronic actuator being provided with a dead band against command current, wherein, when the actuator is moved across the dead band, the command current is changed between upper and lower thresholds demarcating the dead band without a time lag.

8. The hydraulic drive vehicle according to claim 1, further comprising:
an engine whose rotation speed is detected, wherein an output rotation of the hydraulic transmission is detected after the hydraulic transmission is operated for speed changing, wherein the output/input rotation speed ratio of the hydraulic transmission is changed in proportion to the rotation speed of the engine, and wherein the hydraulic transmission is provided with a dead band for preventing the output/input speed ratio of the hydraulic transmission from changing regardless of change of the rotation speed of the engine.

9. The hydraulic drive vehicle according to claim 1, wherein the output/input rotation speed ratio of the hydraulic transmission can be changed by electronic control, the vehicle further comprising:
an engine;
an electronic governor of the engine;
an engine rotation speed detector; and
a controller controlling the governor and the hydraulic transmission, and memorizing a map concerning torque and rotational speed of the engine for obtaining an optimal fuel consumption, wherein the controller compares engine torque detected by the governor and engine rotation speed detected by the engine rotation speed detector with torque and rotation speed on the map, and wherein, when the detected values differ from the values on the map, the controller controls one or both of the governor and the hydraulic transmission so as to cancel the difference.

10. The hydraulic drive vehicle according to claim 1, wherein the output/input rotation speed ratio of the hydraulic transmission can be changed by electronic control, the vehicle further comprising:
an engine;
an electronic governor provided to the engine and calculating engine load;
an engine rotation speed detector detecting a rotation speed of the engine; and
a controller controlling the output/input rotation speed ratio of the hydraulic transmission and memorizing a map of maximum engine torque corresponding to the detected engine rotation speed, wherein, when the engine load detected by the governor is higher than engine load equivalent to the maximum engine torque corresponding to the engine rotation speed detected by the engine rotation speed detector, the controller reduces the output/input rotation speed ratio of the hydraulic transmission, and when the former is lower than the later, the controller increases the output/input rotation speed ratio of the hydraulic transmission.

11. The hydraulic drive vehicle according to claim 1, wherein the output/input rotation speed ratio of the hydraulic transmission can be changed by electronic control, the vehicle further comprising:
a working machine vertically movably attached to the vehicle;
an engine;
an electronic governor of the engine;
an engine rotation speed detector; and
a controller controlling the governor and the hydraulic transmission, wherein, when the vehicle starts turning and a command signal for pulling the working machine up is emitted, the controller controls the governor so as to reduce the engine rotation speed and increases the output/input rotation speed ratio of the hydraulic transmission so as to compensate for the decrease of vehicle speed accompanying with the decrease of the engine rotation speed, and when the vehicle stops turning and a command signal for pulling the working machine down is emitted, the controller controls the governor so as to return the engine rotation speed to the set rotation speed and decreases the output/input rotation speed ratio of the hydraulic transmission so as to restrict the increase of vehicle speed accompanying with the increase of the engine rotation speed.

12. A hydraulic drive vehicle according to claim 2, further comprising:
a differential mechanism which combines rotation powers of input side and output side of the hydraulic transmission, wherein an output shaft of the differential mechanism serves as the drive shaft whose rotation speed is detected by the rotation speed detection means.

13. A hydraulic drive vehicle according to claim 3, further comprising:
a differential mechanism which combines rotation powers of input side and output side of the hydraulic transmission, wherein an output shaft of the differential mechanism serves as the drive shaft whose rotation speed is detected by the rotation speed detection means.

14. A hydraulic drive vehicle according to claim 4, further comprising:
a differential mechanism which combines rotation powers of input side and output side of the hydraulic transmission, wherein an output shaft of the differential mechanism serves as the drive shaft whose rotation speed is detected by the rotation speed detection means.

* * * * *

UNITED STATES PATENT AND TRADEMARK OFFICE
CERTIFICATE OF CORRECTION

PATENT NO.        : 7,344,473 B2
APPLICATION NO. : 11/391492
DATED             : March 18, 2008
INVENTOR(S)      : Ishibashi et al.

It is certified that error appears in the above-identified patent and that said Letters Patent is hereby corrected as shown below:

In the drawing, delete Figures 28 and 29 of Sheet 26, and insert the Figure 27 attached herewith.

Signed and Sealed this

Twenty-second Day of July, 2008

JON W. DUDAS
*Director of the United States Patent and Trademark Office*